United States Patent
Ajellal et al.

(10) Patent No.: US 11,643,427 B2
(45) Date of Patent: May 9, 2023

(54) CATALYSTS

(71) Applicant: BOREALIS AG, Vienna (AT)

(72) Inventors: Noureddine Ajellal, Porvoo (FI); Ville Virkkunen, Porvoo (FI); Luigi Maria Cristoforo Resconi, Linz (AT); Vyatcheslav V. Izmer, Moscow (RU); Dmitry S. Kononovich, Moscow (RU); Alexander Z. Voskoboynikov, Moscow (RU); Jingbo Wang, Linz (AT); Simon Schwarzenberger, Linz (AT); Wilfried Peter Töltsch, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

(21) Appl. No.: 17/253,770

(22) PCT Filed: Jun. 28, 2019

(86) PCT No.: PCT/EP2019/067435
§ 371 (c)(1),
(2) Date: Dec. 18, 2020

(87) PCT Pub. No.: WO2020/002654
PCT Pub. Date: Jan. 2, 2020

(65) Prior Publication Data
US 2021/0292355 A1    Sep. 23, 2021

(30) Foreign Application Priority Data

Jun. 28, 2018 (EP) ................................ 18180469

(51) Int. Cl.
*C07F 17/00* (2006.01)
*C08F 4/6592* (2006.01)
(Continued)

(52) U.S. Cl.
CPC .......... *C07F 17/00* (2013.01); *C08F 4/65916* (2013.01); *C08F 110/06* (2013.01)

(58) Field of Classification Search
CPC .... C07F 17/00; C08F 4/65927; C08F 110/06; C08F 210/06
See application file for complete search history.

(56) References Cited

U.S. PATENT DOCUMENTS

| 6,057,408 A | 5/2000 | Winter et al. |
| 6,252,019 B1 | 6/2001 | Ewen et al. |

(Continued)

FOREIGN PATENT DOCUMENTS

| EP | 1858907 B1 | 10/2008 |
| EP | 2532687 A2 | 12/2012 |

(Continued)

OTHER PUBLICATIONS

International Search Report and Written Opinion dated Sep. 24, 2019 in International Application No. PCT/EP2019/067435.
Extended European Search Report dated Dec. 12, 2018 in related EP Application 18180469.1 (9 pages).
Busico, V. et al., "Alk-1-ene polymerization in the presence of a monocyclipentadienyl zirconium (IV) acetamidinate catalyst Microstructural and mechanistic insights", Macromolecular Rapid Communications 2007, 28(10), 1128-1134.

(Continued)

*Primary Examiner* — Caixia Lu
(74) *Attorney, Agent, or Firm* — Meunier Carlin & Curfman LLC

(57) ABSTRACT

A complex of formula (I): (I') M is Hf; each X is a sigma ligand; L is a bridge of formula -$(ER^8{}_2)_y$—; y is 1 or 2; E is C or Si; each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl or L is an alkylene group such as methylene or ethylene; Ar and Ar' are each independently an aryl or heteroaryl group optionally substituted by 1 to 3 groups $R^1$ or $R^{1'}$ respectively; $R^1$ and $R^{1'}$ are each independently the same or can be different and are a linear or branched $C_1$-$C_6$-alkyl group, $C_{7\text{-}20}$ arylalkyl, $C_{7\text{-}20}$ alkylaryl group or $C_{6\text{-}20}$ aryl group with the proviso that if there are four or more $R^1$ and $R^{1'}$ groups present in total, one or more of $R^1$ and $R^{1'}$ is other than tert butyl; $R^2$ and $R^{2'}$ are the same or are different and are a $CH_2$—$R^9$ group, with $R^9$ being H or linear or branched $C_1$-$C_6$-alkyl group, $C_{3\text{-}8}$ cycloalkyl group, $C_{6\text{-}10}$ aryl group; each R is a —$CH_2$—, —CHRx- or $C(Rx)_2$- group wherein Rx is $C_{1\text{-}4}$ alkyl and where m is 2-6; $R^5$ is a linear or branched $C_1$-$C_6$-alkyl group, $C_{7\text{-}20}$ arylalkyl, $C_{7\text{-}20}$ alkylaryl group or $C_6$-$C_{20}$-aryl group; $R^6$ is a $C(R^{10})_3$ group, with $R^{10}$ being a linear or branched $C_1$-$C_6$ alkyl group; and $R^6$ and $R^{7'}$ are the same or are different and are H or a linear or branched $C_1$-$C_6$-alkyl group. Invention relates also to a catalyst in solid form comprising (i) a complex of formula (I) and (ii) a cocatalyst of an aluminium compound and (iii) a cocatalyst of a boron compound.

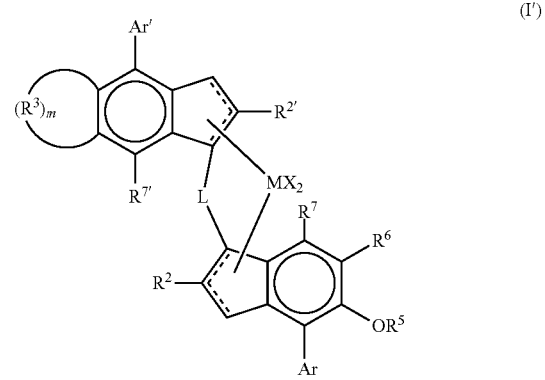

(I')

20 Claims, 1 Drawing Sheet

(51) Int. Cl.
  *C08F 110/06* (2006.01)
  *C08F 210/06* (2006.01)
  *C08F 4/659* (2006.01)

(56) References Cited

U.S. PATENT DOCUMENTS

| | | | |
|---|---|---|---|
| 10,167,355 | B2 | 1/2019 | Ajellal et al. |
| 10,301,411 | B2 | 5/2019 | Ajellal et al. |
| 2005/0288461 | A1 | 12/2005 | Jensen et al. |
| 2008/0081887 | A1 | 4/2008 | Wang et al. |
| 2012/0123078 | A1 | 5/2012 | Lee et al. |
| 2014/0206819 | A1 | 7/2014 | Hafner et al. |
| 2014/0221584 | A1* | 8/2014 | Hafner .................... C07C 41/01 556/11 |
| 2017/0037164 | A1 | 2/2017 | Ajellal et al. |
| 2017/0037165 | A1 | 2/2017 | Ajellal et al. |
| 2017/0342175 | A1 | 11/2017 | Hagadorn et al. |
| 2019/0308995 | A1 | 10/2019 | Ajellal et al. |

FOREIGN PATENT DOCUMENTS

| | | | |
|---|---|---|---|
| EP | 2657285 | A1 | 10/2013 |
| EP | 2722346 | A1 | 4/2014 |
| EP | 2933275 | A1 | 10/2015 |
| EP | 2933277 | A1 | 10/2015 |
| EP | 2729529 | B1 | 4/2016 |
| EP | 1548018 | B1 | 10/2018 |
| EP | 2511305 | B1 | 5/2019 |
| EP | 2813517 | B2 | 6/2019 |
| WO | 94/14856 | A1 | 7/1994 |
| WO | 95/12622 | A1 | 5/1995 |
| WO | 97/14727 | A1 | 4/1997 |
| WO | 98/40331 | A1 | 9/1998 |
| WO | 00/09515 | A1 | 2/2000 |
| WO | 00/24792 | A1 | 5/2000 |
| WO | 00/24793 | A1 | 5/2000 |
| WO | 02/02576 | A1 | 1/2002 |
| WO | 03/49856 | A1 | 6/2003 |
| WO | 03/051934 | A2 | 6/2003 |
| WO | 03050131 | A1 | 6/2003 |
| WO | 03/102042 | A1 | 12/2003 |
| WO | 2006069733 | A1 | 7/2006 |
| WO | 2006097497 | A1 | 9/2006 |
| WO | 2006100258 | A1 | 9/2006 |
| WO | 2007116034 | A1 | 10/2007 |
| WO | 2007122098 | A1 | 11/2007 |
| WO | 2009054831 | A1 | 4/2009 |
| WO | 2010052260 | A1 | 5/2010 |
| WO | 2010052263 | A1 | 5/2010 |
| WO | 2010052264 | A1 | 5/2010 |
| WO | 2011076443 | A1 | 6/2011 |
| WO | 2011076780 | A1 | 6/2011 |
| WO | 2011135004 | A2 | 11/2011 |
| WO | 2011135005 | A2 | 11/2011 |
| WO | 2012001051 | A1 | 1/2012 |
| WO | 2012001052 | A2 | 1/2012 |
| WO | 2012075560 | A1 | 6/2012 |
| WO | 2012084961 | A1 | 6/2012 |
| WO | 2013007650 | A1 | 1/2013 |
| WO | 2014060541 | A1 | 4/2014 |
| WO | 2014096171 | A1 | 6/2014 |
| WO | 2015011135 | A1 | 1/2015 |
| WO | 2015158790 | A2 | 10/2015 |
| WO | 2015158791 | A2 | 10/2015 |
| WO | 2016038210 | A1 | 3/2016 |
| WO | 2016038211 | A1 | 3/2016 |
| WO | 2018091684 | A1 | 5/2018 |
| WO | 2018108917 | A1 | 6/2018 |
| WO | 2018108918 | A1 | 6/2018 |
| WO | 2018122134 | A1 | 7/2018 |
| WO | 2019002345 | A1 | 1/2019 |
| WO | 2019052820 | A1 | 3/2019 |
| WO | 2019179959 | A1 | 9/2019 |

OTHER PUBLICATIONS

Busico, V. et al., "Full assignment of the 13C NMR spectra of regioregular polypropylenes: Methyl and methylene region", Macromolecules, 1997, 30(20), 6251-6263.
Busico, V. et al., "Microstructure of polypropylene", Progress in Polymer Science, 2001, 26(3), 443-533.
Castignolles, P. et al., "Detection and quntification of branching in polyacrylates by size-exclusion chromatography (SEC) and melt-state 13C NMR spectroscopy", Polymer 2009, 50(11), 2373-2383.
Cheng, "Carbon-13NMR analysis of ethylene-propylene rubbers", Macromolecules, 1984, 17, 1950-1955.
Chukanova, et al., "Polymerization of propylene using isospecific rac-Me2Si(2-Me,4-Phlnd)2ZrCI2 catalyst immobilized on polyethylene with grafted poly(acrylic acid)", Polymer science. Series A, Chemistry, physics 43.8 (2001): 787-792.
Del Hierro et al. Soluble Fraction analysis in propylene, The Column, Feb. 2014, 18-23.
Endres, et al., "Die fluorige Phase: Organische Chemie mit hochfluorierten Reagenzien und Lösungsmitteln", Chemie in unserer Zeit, 2000, 34(6), 382-393.
Ewen, et al., "Crystal structures and stereospecific propylene polymerizations with chiral hafnium metallocene catalysts", JACS, 1987, 109, 6544-6545.
Ewen, et al., "Evaluation of the dimethylsilyl-bis(2-methyl-4-phenyl-1-indenyl) ligand with group 4 triad metals in propene polymerizations with methylaluminoxane", Macromolecular Rapid Communications vol. 19, Issue 1, Jan. 1998, pp. 71-73.
Filip, et al., "Heteronuclear decoupling under fast MAS by a rotor-synchronized Hahn-echo pulse train", Journal of Magnetic Resonance, vol. 176, Issue 2, Oct. 2005, pp. 239-243.
Gahleitner, et al., "Crystallinity and mechanical properties of PPhomopolymers as influenced by molecular structure and nucleation", Journal of Applied Polymer Science, 1996, 61(4), 649-657.
Grein, et al., "Impact modified isotactic polypropylene with controlled rubber intrinsic viscosities: Some new aspects about morphology and fracture", Journal of Applied Polymer Science, 2003, 87(10), 1702-1712.
Griffin, et al., "Low-load rotor-synchronised Hahn-echo pulse train (RS-HEPT) 1H decoupling in solid-state NMR: factors affecting MAS spin-echo dephasing times.", Mag. Res. in Chem. 2007 45, S1, S198.
Hasegawa, et al., "High-temperature ethylene/alpha-olefin copolymerization with a zirconene catalyst: Effects of the zirconene ligand and polymerization conditions on copolymerization behavior", Journal of Polymer Science: Part A; Polymer Chemistry, 2000, 38, 4641-4648.
Hintermann, et al., "Expedient Syntheses of the N-hetercyclic carbene precursor imidazolium salts IPr•HCI and IXy•HCI," Beilstein J. Org. Chem. 2007, 3, 1-5.
Hopf, et al., "Highly syndiotactic polypropene with Cs-symmetric metallocene/MAO catalysts", Catalysis Communications, 2002, 2, 459.
Kaminsky, et al., "Polymerization of Ethene and Longer Chained Olefins by Metallocene Catalysis", Macromol Symp 2005, 226, 25.
Kim, et al., "Ethylene/1-Hexene Copolymerizations of Syndioselective Metallocenes: Direct Comparison of Me2C(Cp)(Flu)ZrMe2 with Et(Cp)(Flu)ZrMe2", J POlym Sci Part A Polym Chem, 1999, 37, 2763.
Klimke, et al., "Optimisation and Application of Polyolefin Branch Quantification by Melt-State 13C NMR Spectroscopy", Macromolecular Chemistry and Physics vol. 207, Issue 4 Feb. 24, 2006 pp. 382-395.
Kuklin, et al., "Quantitative structure-property relationships in propene polymerization by zirconenes with a rac-SiMe2[Ind]2 based ligand frameworks", Journal of Melcular Catalysis A: Chemical, 2016, 412, 39-46.
Liu, et al., "Poly(ethylene-co-1-octene) Characterization by High-Temperature Multidimensional NMR at 750 MHz", Macromolecules 2001, 34, 4757-4767.
Lo Nostro, , "Phase separation properties of fluorocarbons, hydrocarbons and their copolymers", Advances in Colloid and Interface Science, 1995, 56, 245-287.
Matsubara, et al., "Synthesis and Structures of Nickel Halide Complexes Bearing Mono- and Bis-coordinated N-Heterocyclic

(56) References Cited

OTHER PUBLICATIONS

Carbene Ligands, Catalyzing Grignard Cross-Coupling Reactions", Organometallics, 2006, 25 (14), pp. 3422-3427.

Parkinson, et al., "Effect of Branch Length on 13C NMR Relaxation Properties in Molten Poly[ethylene-co-(α-olefin)] Model Systems", Macromol. Chem. Phys. 2007;208:2128.-2133.

Hubner, et al., "Application of Melt-State NMR Spectroscopy for Polyolefin Characterization in Industry," NMR Spectroscopy of Polymers: Innovative Strategies for Complex Macromolecules, Chapter 24, 401 (2011).

Pollard, M. et al., "Observation of chain branching in polyethylene in the solid state and melt via 13C NMR spectroscopy and melt NMR relaxation time measurements", Macromolecules 2004, 37(3), 813-825.

Premphet, et al., "Polypropylene/metallocene ethylene-octene copolymer blends with a bimodal particle size distribution: Mechanical properties and their controlling factors", Journal of Applied Polymer Science, 2002, 85(11), 2412-2418.

Qui, et al., "Improved Peak Assignments for the 13C NMR Spectra of Poly(ethylene-co-1-octene)s", Macromolecules 2007, 40, 6879-6884.

Randall, J.C."A Review of High Resolution Liquid 13Carbon Nuclear Magnetic Resonance Characterizations of Ethylene-Based Polymers", Journal of Macromolecular Science, Part C: Polymer Reviews, vol. 29, Issues 2-3, 1989, pp. 201-317.

Resconi, L. et al., "Selectivity in propene polymerization with metallocene catalysis", Chemical Reviews 2000, 100(4), 1253-1346.

Singh, et al., "Triad sequence determination of ethylene-propylene copolymers—application of quantitative 13C NMR", Polymer Testing, 2009, 28(5), 475.

Song, "Synthesis of aryl-substituted indanones and indenes via a highly efficient ligand-free palladium-catalyzed Suzuki coupling process", ARKIOVIC, 2016, 4, 306-327.

Stadler, et al., "Influence of Type and Content of Various Comonomers on Long-Chain Branching of Ethene/alpha-olefin Copolymers", Macromolecules, 2006, 39, 1474.

Stork, et al., "The Stereochemistry of the SN2' Reaction. I. Preparation of Pure trans-6-Alkyl-2-cyclohexen-1-ols", J. Am. Chem. Soc. 1956, 78, 4604-4608.

Tynys, et al., "Propylene polymerisations with novel heterogeneous combination metallocene catalyst systems", Polymer, 2007, 48, 1893-1902.

Ushakova, et al., "Ethylene polymerization and ethylene-1-hexene copolymerization over immobilized metallocene catalysts", Kinetics and Catalysis, Feb. 2012, vol. 53, Issue 1, pp. 75-83.

Wang, et al., "Long Chain Branching in Ethylene Polymerization Using Binary Homogeneous Metallocene Catalyst System", Polymer Reaction Engineering, vol. 7, 1999—Issue 3, pp. 327-346.

Wang, et al., "Structural Analysis of Ethylene/Propylene Copolymers Synthesized with a Constrained Geometry Catalyst", Macromolecules, 2000, 33(4), 1157-1162.

Yano, et al., "Effect of ligand structures on high temperature homo- and copolymerization of ethylene by cationic hafnocene catalysts based on tetrakis(pentafluorophenyl)borate", Journal of Molecular Catalysis A: Chemical, 2000, 156(1-2), 133-141.

Yano, et al., "Ethylene/1-hexene copolymerization with Ph2C(Cp)(Flu)ZrCl2 derivatives: correlation between ligand structure and copolymerization behavior at high temperature", Macromolecular Chemistry and Physics, 1999, 200, 1542.

Yano, "Novel zirconocene catalysts for the production of high molecular weight LLDPE in high-temperature polymerization", Macromolecular Chemistry and Physics, 1999, 200(4), 933-941.

Zhou, et al., "A new decoupling method for accurate quantification of polyethylene copolymer composition and triad sequence distribution with 13C NMR.", J Magn Reson. Aug. 2007;187(2):225-33. Epub May 23, 2007.

Nifant'Ev, Ilya E. et al., "5-Methoxy-Substituted Zirconium Bisindenyl ansa-complexes: Synthesis, Structure, and Catalytic Activity in the Polymerization and Copolymerization of Alkenes," Organometallics, 2012, 31, 4962-4970.

* cited by examiner

CATALYSTS

This invention relates to new bisindenyl ligands, complexes thereof and catalysts comprising those complexes. The invention also relates to the use of the new bisindenyl metallocene catalysts for the production of propylene polymers, especially heterophasic propylene copolymers and propylene homopolymers with high molecular weight, and hence low MFR, with improved activity and with high melting points.

Metallocene catalysts have been used to manufacture polyolefins for many years. Countless academic and patent publications describe the use of these catalysts in olefin polymerisation. Metallocenes are used industrially and polyethylenes and polypropylenes in particular are often produced using cyclopentadienyl based catalyst systems with different substitution patterns.

The present inventors sought new metallocene catalysts, which are able to provide high melting temperature propylene polymers, especially in the case of propylene homopolymers. In addition, the desired catalysts should also have improved performance in the production of high molecular weight propylene homopolymers with good activity, and enable the production of propylene heterophasic copolymers with a high melting point of the polymer matrix and high molecular weight of the rubber phase. Various prior art references aim for one or more of these features.

$C_2$-symmetric metallocenes are disclosed for example in WO2007/116034. This document reports the synthesis and characterisation of, inter alia, the metallocene rac-Me$_2$Si(2-Me-4-Ph-5-OMe-6-tBuInd)$_2$ZrCl$_2$ and the use of it as a polymerisation catalyst after activation with MAO for the homopolymerisation of propylene and copolymerisation of propylene with ethylene and higher alpha-olefins in solution polymerisation.

WO02/02576 describes, inter alia, rac-Me$_2$Si[2-Me-4-(3,5-tBu$_2$Ph)Ind]$_2$ZrCl$_2$ and rac-Me$_2$Si[2-Me-4-(3,5-tBu$_2$Ph)Ind]$_2$ZrCl$_2$ (see also WO2014/096171) and its use in the manufacture of high Mw and high melting point polypropylene.

WO06/097497 describes, inter alia, rac-Me$_2$Si(2-Me-4-Ph-1,5,6,7-tetrahydro-s-indacen-1-yl)$_2$ZrCl$_2$ supported on silica and its use in the homo- and copolymerisation of propylene with ethylene.

WO2006100258 describes the use of a Q-symmetric metallocenes in the production of heterophasic ethylene/propylene copolymers.

WO2011/076780 describes the use of rac-Me$_2$Si(2-Me-4-Ph-1,5,6,7-tetrahydro-s-indacen-1-yl)$_2$ZrCl$_2$ activated with methylalumoxane in solid particulated form without an external carrier, for propylene homopolymerisation U.S. Pat. No. 6,057,408 describes the influence of the 4-aryl substituent on the molecular weight of ethylene-propylene copolymers produced in liquid slurry. Asymmetrical metallocenes able to produce isotactic polypropylene have been described in the literature. WO2013/007650, describes certain asymmetrical catalysts comprising alkoxy groups at the 5-position of one of the rings such as dimethylsilylene ($\eta^5$-6-tert-butyl-5-methoxy-2-methyl-4-phenyl-1H-inden-1-yl)-($\eta^5$-6-tert-butyl-2-methyl-4-phenyl-1H-inden-1-yl)zirconium dichloride. Despite its good performance, catalysts based on this reference are limited in terms of polypropylene homopolymer melting temperature, productivity at low MFR. In addition, the overall productivity of the catalyst still needs to be improved.

Improved polypropylene Tm with hafnocene over the corresponding zirconocene is described e.g. in Ewen et al. J. Am. Chem. Soc. 1987, 109, 6544-6545. Activation is done with MAO, and still Tm is low.

Further, most metallocenes whose structure has been optimized to produce high molecular weight isotactic PP show limitations in their molecular weight capability when used to produce ethylene-propylene copolymers in the gas phase. It is known that tensile and impact properties of a heterophasic PP/EPR blend, for a given rubber comonomer composition, can be improved by increasing the molecular weight of the rubber phase. Further, if the $T_m$ of the hPP matrix of the heterophasic copolymer is low, the material stiffness is not as high as desired.

Even if there are improvements described in the literature, there is still need to provide a metallocene catalyst being able to provide propylene polymers with improved activity high melting temperature polypropylene and with high molecular weight, i.e. low MFR values, and further to provide propylene heterophasic copolymers with a high melting point of the polymer matrix and high molecular weight of the rubber phase.

The catalysts of the invention should ideally be suited for use in conventional solid supported form, e.g. using silica or alumina supports, or can be used in solid form, however, being free of external support or carrier.

The present applicant has previously developed an alternative to conventional inorganic supports. In WO03/051934, the inventors proposed an alternative form of catalyst which is provided in solid form but does not require a conventional external carrier material such as silica. The invention is based on the finding that a homogeneous catalyst system containing an organometallic compound of a transition metal can be converted, in a controlled way, to solid, uniform catalyst particles by first forming a liquid/liquid emulsion system, which comprises as the dispersed phase, said solution of the homogeneous catalyst system, and as the continuous phase a solvent immiscible therewith, and then solidifying said dispersed droplets to form solid particles comprising the said catalyst.

The invention described in WO03/051934 enabled the formation of solid spherical catalyst particles of said organo transition metal catalyst without using e.g. external porous carrier particles, such as silica, normally required in the art. Catalysts of this invention should be able to utilise this method.

The inventors have developed new metallocene catalysts having improved polymerisation behaviour, higher catalyst productivity, improved performance in the production of high molecular weight and high melting temperature polypropylene polymers especially propylene homopolymers and propylene heterophasic copolymers as indicated above than are currently achievable using alternative $C_1$-symmetric metallocene based catalysts.

The known metallocene catalysts exhibit moderate activity, and provide moderate melting polypropylene. However, it would be desirable to provide catalysts which provide higher molecular weight of the polymer or higher molecular weight of the rubber phase of the heterophasic copolymer, and even higher melting temperature propylene homopolymer. The present invention solves this problem.

The inventors have now found that specific catalysts comprising specific $C_1$-symmetric metallocene provide improved performance in propylene polymerisation, especially in propylene homopolymerisation and in the production of propylene heterophasic copolymers.

In particular, the catalysts of the invention enable
  improved performance in production of high molecular
    weight propylene homopolymers;

improved, i.e. higher melting point propylene homopolymers;

improved, i.e. higher melting point of propylene homopolymer matrix of a heterophasic propylene copolymer improved, i.e. higher molecular weight of the rubber phase of a heterophasic propylene copolymer.

high catalyst activity for the production of high Mw propylene polymers,

It has now been surprisingly found that the improvements are achievable by using the catalysts of the invention comprising the specific metallocenes, as will be defined below, and at least two cocatalysts, namely an aluminium based and a boron based cocatalyst.

SUMMARY OF INVENTION

Viewed from one aspect the invention provides a complex of formula (I):

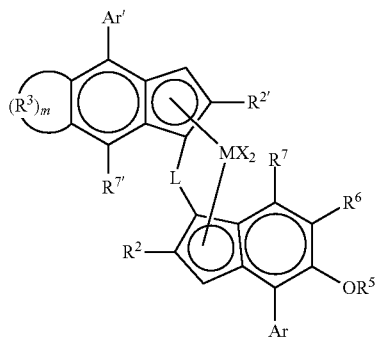

(I)

M is Hf each X is a sigma ligand;

L is a bridge of formula $-(ER^8{}_2)_y-$;

y is 1 or 2;

E is C or Si;

each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl or L is an alkylene group such as methylene or ethylene;

Ar and Ar' are each independently an aryl or heteroaryl group optionally substituted by 1 to 3 groups $R^1$ or $R^{1'}$ respectively;

$R^1$ and $R^{1'}$ are each independently the same or can be different and are a linear or branched $C_1$-$C_6$-alkyl group, $C_{7-20}$ arylalkyl, $C_{7-20}$ alkylaryl group or $C_{6-20}$ aryl group with the proviso that if there are four or more $R^1$ and $R^{1'}$ groups present in total, one or more of $R^1$ and $R^{1'}$ is other than tert butyl;

$R^2$ and $R^{2'}$ are the same or are different and are a $CH_2$—$R^9$ group, with $R^9$ being H or linear or branched $C_{1-6}$-alkyl group, $C_{3-8}$ cycloalkyl group, $C_{6-10}$ aryl group;

each $R^3$ is a —$CH_2$—, —CHRx- or $C(Rx)_2$- group wherein Rx is $C_{1-4}$ alkyl and where m is 2-6;

$R^5$ is a linear or branched $C_1$-$C_6$-alkyl group, $C_{7-20}$ arylalkyl, $C_{7-20}$ alkylaryl group or $C_{6-20}$-aryl group;

$R^6$ is a $C(R^{10})_3$ group, with $R^{10}$ being a linear or branched $C_4$-$C_6$ alkyl group; and $R^7$ and $R^{7'}$ are the same or are different and are H or a linear or branched $C_4$-$C_6$-alkyl group.

Viewed from another aspect the invention provides a complex of formula (Ia)

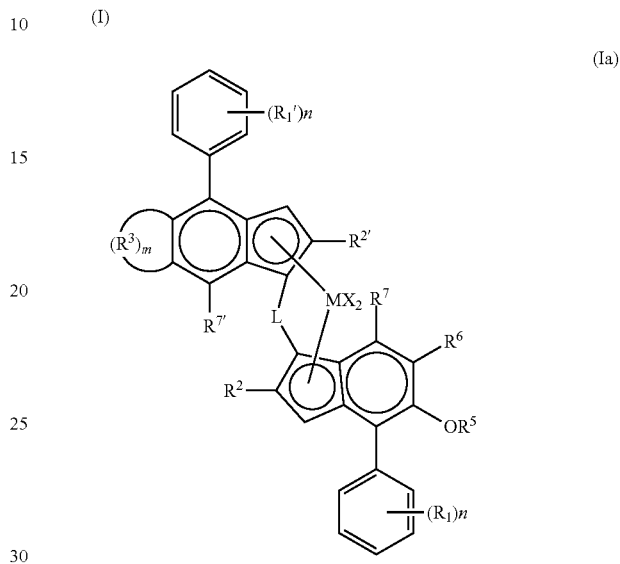

M is Hf;

each X is a sigma ligand;

L is a bridge of formula $-(ER^8{}_2)_y-$;

y is 1 or 2;

E is C or Si;

each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl or L is an alkylene group such as methylene or ethylene;

each n is independently 0, 1, 2 or 3;

$R^1$ and $R^{1'}$ are each independently the same or can be different and are a linear or branched $C_1$-$C_6$-alkyl group, $C_{7-20}$ arylalkyl, $C_{7-20}$ alkylaryl group or $C_{6-20}$ aryl group with the proviso that if there are four or more $R^1$ and $R^{1'}$ groups present in total, one or more of $R^1$ and $R^{1'}$ is other than tert butyl;

$R^2$ and $R^{2'}$ are the same or are different and are a $CH_2$—$R^9$ group, with $R^9$ being H or linear or branched $C_{1-6}$-alkyl group, $C_{3-8}$ cycloalkyl group, $C_{6-10}$ aryl group;

each $R^3$ is a —$CH_2$—, —CHRx- or $C(Rx)_2$- wherein Rx is $C_{1-4}$ alkyl and where m is 2-6; $R^5$ is a linear or branched $C_1$-$C_6$-alkyl group, $C_{7-20}$ arylalkyl, $C_{7-20}$ alkylaryl group or $C_6$-$C_{20}$-aryl group;

$R^6$ is a $C(R^{10})_3$ group, with $R^{10}$ being a linear or branched $C_4$-$C_6$ alkyl group; and $R^7$ and $R^{7'}$ are the same or are different and are H or a linear or branched $C_4$-$C_6$-alkyl group.

In a preferred embodiment of formula (Ia), L is of formula —$SiR^8{}_2$—, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl.

Viewed from another aspect the invention provides a complex of formula (Ib):

(I)

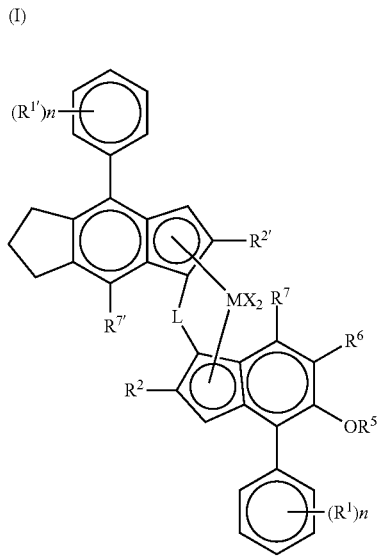

(Ib)

wherein

M is Hf;

each X is a sigma ligand;

L is an alkylene bridge (e.g. methylene or ethylene) or a bridge of the formula —SiR$^8_2$—, wherein each R$^8$ is independently a C$_1$-C$_{20}$-hydrocarbyl, tri(C$_1$-C$_{20}$-alkyl)silyl, C$_6$-C$_{20}$-aryl, C$_7$-C$_{20}$-arylalkyl or C$_7$-C$_{20}$-alkylaryl;

each n is independently 0, 1, 2 or 3;

R$^1$ and R$^{1'}$ are each independently the same or can be different and are a linear or branched C$_1$-C$_6$-alkyl group, C$_{7-20}$ arylalkyl, C$_{7-20}$ alkylaryl group or C$_{6-20}$ aryl group with the proviso that if there are four or more R$^1$ and R$^{1'}$ groups present in total, one or more of R$^1$ and R$^{1'}$ is other than tert butyl;

R$^2$ and R$^{2'}$ are the same or are different and are a CH$_2$—R$^9$ group, with R$^9$ being H or linear or branched C$_{1-6}$-alkyl group, C$_{3-8}$ cycloalkyl group, C$_{6-10}$ aryl group;

R$^5$ is a linear or branched C$_1$-C$_6$-alkyl group, C$_{7-20}$ arylalkyl, C$_{7-20}$ alkylaryl group or C$_6$-C$_{20}$-aryl group;

R$^6$ is a C(R$^{10}$)$_3$ group, with R$^{10}$ being a linear or branched C$_4$-C$_6$ alkyl group; and R$^7$ and R$^{7'}$ are the same or are different and are H or a linear or branched C$_1$-C$_6$-alkyl group.

Viewed from another aspect the invention provides a catalyst in solid form comprising (i) a complex of formula (I) as hereinbefore defined and (ii) a cocatalyst comprising an aluminium based compound and (iii) a cocatalyst comprising a boron based compound.

The catalyst of the invention is thus used as heterogeneous catalyst.

The catalyst of the invention is used in solid form, preferably in solid particulate form, and can be used either supported on an external carrier material, like silica or alumina, or is free from an external carrier, however still being in solid form. For example, the solid catalyst is obtainable by a process in which (a) a liquid/liquid emulsion system is formed, said liquid/liquid emulsion system comprising a solution of the catalyst components (i), (ii) and (iii) dispersed in a solvent so as to form dispersed droplets; and (b) solid particles are formed by solidifying said dispersed droplets.

Viewed from another aspect the invention provides a process for the manufacture of a catalyst as hereinbefore defined comprising obtaining a complex of formula (I) and at least two cocatalysts as hereinbefore described;

forming a liquid/liquid emulsion system, which comprises a solution of catalyst components (i), (ii) and (iii) dispersed in a solvent, and solidifying said dispersed droplets to form solid particles.

Viewed from another aspect the invention provides the use in propylene polymerisation of a catalyst as hereinbefore defined, especially for the formation of a propylene polymers, optionally with comonomers selected from ethylene or a C4 to C10 alpha olefin or mixtures thereof, especially polypropylene homopolymer, and propylene heterophasic copolymer.

Viewed from another aspect the invention provides a process for the polymerisation propylene comprising reacting propylene and optional comonomers with a catalyst as hereinbefore described, e.g. for the formation propylene homopolymer or propylene copolymer, e.g. with ethylene, especially propylene homopolymer, and propylene heterophasic copolymer.

Definitions

Throughout the description the following definitions are employed.

By "free from an external carrier" is meant that the catalyst does not contain an external support, such as an inorganic support, for example, silica or alumina, or an organic polymeric support material.

The term "C$_{1-20}$ hydrocarbyl group" includes C$_{1-20}$ alkyl, C$_{2-20}$ alkenyl, C$_{2-20}$ alkynyl, C$_{3-20}$ cycloalkyl, C$_{3-20}$ cycloalkenyl, C$_{6-20}$ aryl groups, C$_{7-20}$ alkylaryl groups or C$_{7-20}$ arylalkyl groups or of course mixtures of these groups such as cycloalkyl substituted by alkyl. Linear and branched hydrocarbyl groups cannot contain cyclic units. Aliphatic hydrocarbyl groups cannot contain aryl rings.

Unless otherwise stated, preferred C$_{1-20}$ hydrocarbyl groups are C$_{1-20}$ alkyl, C$_{4-20}$ cycloalkyl, C$_{5-20}$ cycloalkylalkyl groups, C$_{7-20}$ alkylaryl groups, C$_{7-20}$ arylalkyl groups or C$_{6-20}$ aryl groups, especially C$_{1-10}$ alkyl groups, C$_{6-10}$ aryl groups, or C$_{7-12}$ arylalkyl groups, e.g. C$_{1-8}$ alkyl groups. Most especially preferred hydrocarbyl groups are methyl, ethyl, propyl, isopropyl, tert-butyl, isobutyl, C$_{5-6}$-cycloalkyl, cyclohexylmethyl, phenyl or benzyl.

The term "halo" includes fluoro, chloro, bromo and iodo groups, especially chloro or fluoro groups, when relating to the complex definition.

The oxidation state of the metal ion is governed primarily by the nature of the metal ion in question and the stability of the individual oxidation states of each metal ion.

It will be appreciated that in the complexes of the invention, the metal ion M, which is a Hf ion, is coordinated by ligands X so as to satisfy the valency of the metal ion and to fill its available coordination sites. The nature of these σ-ligands can vary greatly.

The terms "C4 phenyl ring" and "C4' phenyl ring" relate to the substituted phenyl rings attached to the 4 and 4' positions of the indenyl and indacenyl rings, respectively. The numbering of these rings will be evident from the structures indicated herein.

Catalyst activity is defined in this application to be the amount of polymer produced/g catalyst/h. Catalyst metal activity is defined here to be the amount of polymer produced/g Metal/h. The term productivity is also sometimes used to indicate the catalyst activity although herein it designates the amount of polymer produced per unit weight of catalyst.

The term "molecular weight" is used herein to refer to weight average molecular weight Mw unless otherwise stated.

There can be up to 6 $R^1$ and $R^{1'}$ groups combined in the complex of formula (I). It is required that if there are four or more $R^1$ and $R^{1'}$ groups, at least one is not tert butyl. There may be 0, 1, 2 or 3 tert butyl groups on the complex but no more.

DETAILED DESCRIPTION OF INVENTION

This invention relates to a series of new complexes and hence catalysts that are ideal for the polymerisation of propylene. The complexes of the invention are asymmetrical. Asymmetrical means simply that the two ligands forming the metallocene are different, that is, each ligand bears a set of substituents that are chemically different.

The complexes of the invention are preferably chiral, racemic bridged bisindenyl $C_1$-symmetric metallocenes. Although the complexes of the invention are formally $C_1$-symmetric, the complexes ideally retain a pseudo-$C_2$-symmetry since they maintain $C_2$-symmetry in close proximity of the metal center although not at the ligand periphery. By nature of their chemistry both anti and syn enantiomer pairs (in case of $C_1$-symmetric complexes) are formed during the synthesis of the complexes. For the purpose of this invention, racemic-anti means that the two indenyl ligands are oriented in opposite directions with respect to the cyclopentadienyl-metal-cyclopentadienyl plane, while racemic-syn means that the two indenyl ligands are oriented in the same direction with respect to the cyclopentadienyl-metal-cyclopentadienyl plane, as shown in the scheme below.

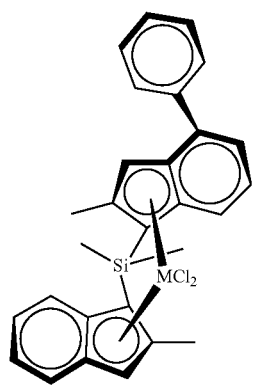

Racemic Anti

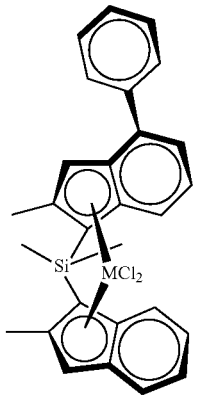

Racemic Syn

Formula (I), and any sub formulae, are intended to cover both syn- and anti-configurations. Preferred complexes are in the anti configuration. In the Formula 1 the metal ion is always Hf.

It is preferred if the metallocenes of the invention are employed as the racemic or racemic-anti isomers. Ideally therefore at least 95% mol, such as at least 98% mol, especially at least 99% mol of the metallocene is in the racemic or racemic-anti isomeric form.

In the catalysts of the invention the following preferences apply. Catalysts according to the invention are of formula (I):

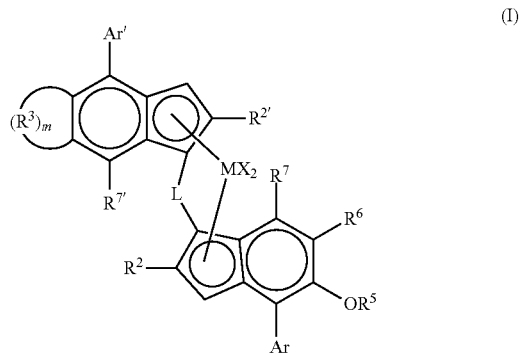

In a complex of formula (I) M is Hf.

Each X is a sigma ligand. Most preferably each X is independently a hydrogen atom, a halogen atom, $C_{1-6}$ alkoxy group or an R group, where R is a $C_{1-6}$ alkyl, phenyl or benzyl group. Most preferably X is chlorine, benzyl or a methyl group. Preferably both X groups are the same. The most preferred options are two chlorides, two methyl or two benzyl groups, especially two chlorides.

L is $-(ER^8_2)_y-$. It is preferred if E is Si. It is preferred if y is 1. $-(ER^8_2)_y-$ is preferably a methylene or ethylene linker or L is a bridge of the formula $-SiR^8_2-$, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl or $C_7$-$C_{20}$-alkylaryl. The term $C_{1-20}$ hydrocarbyl group therefore includes $C_{1-20}$ alkyl, $C_{2-20}$ alkenyl, $C_{2-20}$ alkynyl, $C_{3-20}$ cycloalkyl, $C_{3-20}$ cycloalkenyl, $C_{6-20}$ aryl groups, $C_{7-20}$ alkylaryl groups or $C_{7-20}$ arylalkyl groups or of course mixtures of these groups such as cycloalkyl substituted by alkyl. Unless otherwise stated, preferred $C_{1-20}$ hydrocarbyl groups are $C_{1-20}$ alkyl, $C_{4-20}$ cycloalkyl, $C_{5-20}$ cycloalkyl-alkyl groups, $C_{7-20}$ alkylaryl groups, $C_{7-20}$ arylalkyl groups or $C_{6-20}$ aryl groups. If L is an alkylene linker group, ethylene and methylene are preferred.

Preferably both $R^8$ groups are the same. It is preferred if $R^8$ is a $C_1$-$C_{10}$-hydrocarbyl or $C_6$-$C_{10}$-aryl group, such as methyl, ethyl, propyl, isopropyl, tertbutyl, isobutyl, $C_{5-6}$-cycloalkyl, cyclohexylmethyl, phenyl or benzyl, more preferably both $R^8$ are a $C_1$-$C_6$-alkyl, $C_{3-8}$ cycloalkyl or $C_6$-aryl group, such as a $C_1$-$C_4$-alkyl, $C_{5-6}$ cycloalkyl or $C_6$-aryl group and most preferably both $R^8$ are methyl or one is methyl and another cyclohexyl. Alkylene linkers are preferably methylene or ethylene. L is most preferably —Si$(CH_3)_2$—.

Ar and Ar' are preferably phenyl rings.

Each substituent $R^1$ and $R^{1'}$ are independently the same or different, and are preferably a linear or branched $C_1$-$C_6$-alkyl group or $C_{6-20}$ aryl groups, more preferably a linear or branched $C_4$-$C_4$ alkyl group. Preferably each $R^1$ and each $R^{1'}$ are independently methyl, ethyl, isopropyl or —$CMe_3$, especially methyl or —$CMe_3$. Preferably each $R^1$ is the same and each $R^{1'}$ is the same.

Each n is independently 0, 1, 2 or 3, preferably 1 or 2. The total of the two "n" values is ideally 2, 3 or 4. When n is 1 the ring is preferably substituted with the group $R^1$ or $R^{1'}$ at the para position (4 or 4' position). When n is 2 the ring is preferably substituted with the groups $R^1$ or $R^{1'}$ at the ortho positions (3 and 5, or 3' and 5' positions).

In all embodiments of the invention the substitution of the C(4) and C(4') phenyl groups are subject to the proviso that the complex is substituted in total with 0, 1, 2 or 3 $CMe_3$ groups across the C(4) and C(4') phenyl rings combined, preferably 0, 1 or 2 $CMe_3$ groups across the C(4) and C(4') phenyl rings combined. Alternatively stated, if the two n values sum to 4 or more, at least one $R^1$ or $R^{1'}$ group present cannot represent tert butyl.

Ideally, no C(4) or C(4') ring will comprise two branched substituents. If a C(4) or C(4') ring contains two substituents (i.e. n is 2) then it is preferred if $R^1$ or $R^{1'}$ is $C_{1-4}$ linear alkyl, e.g. methyl.

If a C(4) or C(4') ring contains one substituent (i.e. n is 1) then it is preferred that $R^1$ or $R^{1'}$ is a branched $C_{4-6}$ alkyl, e.g. tert butyl.

In a particular embodiment, Ar and Ar' in formula I (or any formula below) are independently selected from phenyl rings substituted in the 3,5- or 4-positions with a linear or branched $C_4$-$C_4$ alkyl group; i.e. corresponding to 3,5 or 4-position substitutions with $R^1$ and Rr being a $C_1$-$C_4$ alkyl group and n being 1 or 2. In a particular embodiment, Ar and Ar' in formula I are independently selected from 3,5-dimethyl phenyl, 3,5-ditertbutyl and 4-(tert-butyl)-phenyl. Therefore, in a particular embodiment, in the complex of formula I, both Ar and Ar' are 3,5-dimethyl phenyl, both Ar and Ar' are 4-(tert-butyl)-phenyl, or one of Ar and Ar' is 3,5-dimethyl phenyl and the other is 4-(tert-butyl)-phenyl. Other preferred options include one of Ar or Ar' being 3,5-ditertbutylphenyl with the other being 3,5-dimethylphenyl or 4-tertbutylphenyl. These particular embodiments may be applied to all of the structures II-VIII described herein, where technically viable. In other words, in a particular embodiment, $R^1$, $R^{1'}$ and each independent value of n are selected such that the C(4) or C(4') phenyl rings are 3,5-dimethyl phenyl, 3,5-ditertbutylphenyl and/or 4-(tert-butyl)-phenyl.

In an embodiment at least one of the C(4) or C(4') phenyl rings is 3,5-dimethyl phenyl.

In an embodiment at least one of the C(4) or C(4') phenyl rings is 4-(tert-butyl)-phenyl.

$R^2$ and $R^{2'}$ are each the same or different, and are a $CH_2$—$R^9$ group, with $R^9$ being H or linear or branched $C_1$-$C_6$-alkyl group, like methyl, ethyl, n-propyl, i-propyl, n-butyl, i-butyl, sec.-butyl and tert.-butyl or $C_{3-8}$ cycloalkyl (e.g. cyclohexyl) or $C_{6-10}$ aryl (pref phenyl). Preferably $R^2$ and $R^{2'}$ are the same and are a $CH_2$—$R^9$ group, with $R^9$ being H or linear or branched $C_1$-$C_4$-alkyl group, more preferably $R^2$ and $R^{2'}$ are the same and are a $CH_2$—$R^9$ group, with $R^9$ being H or linear or branched $C_1$-$C_3$-alkyl group. Most preferably $R^2$ and $R^{2'}$ are both methyl.

$R^3$ is preferably —$CH_2$—. The subscript m is preferably 2 to 4, such as 3 (thus forming a 5 membered ring).

$R^5$ is a preferably linear or branched $C_1$-$C_6$-alkyl group or $C_{6-20}$ aryl group, such as methyl, ethyl, n-propyl, i-propyl, n-butyl, i-butyl, sec.-butyl and tert.-butyl, preferably a linear $C_1$-$C_4$-alkyl group, more preferably a $C_1$-$C_2$-alkyl group and most preferably methyl.

$R^6$ is a $C(R^{10})_3$ group, with each $R^{10}$ being the same or different and being a linear or branched $C_1$-$C_6$-alkyl group. Preferably each $R^{10}$ are the same or different with $R^{10}$ being a linear or branched $C_1$-$C_4$-alkyl group, more preferably with $R^{10}$ being the same and being a $C_1$-$C_2$-alkyl group. Most preferably $R^6$ is a tert.-butyl group and hence all $R^{10}$ groups are methyl.

$R^7$ and $R^{7'}$ are each the same or different, and are H or a linear or branched $C_1$-$C_6$-alkyl group, preferably H or a linear or branched $C_1$-$C_4$-alkyl group, and more preferably H or a $C_1$-$C_2$-alkyl group. In some embodiments one of $R^7$ or $R^{7'}$ is H and the other is a linear or branched $C_1$-$C_6$-alkyl group, preferably a linear or branched $C_1$-$C_4$-alkyl group and more preferably a $C_1$-$C_2$-alkyl group. It is especially preferred that $R^7$ and $R^{7'}$ are the same. It is most preferred that both $R^7$ and $R^{7'}$ are H.

In a preferred embodiment, the invention provides a complex of formula (II)

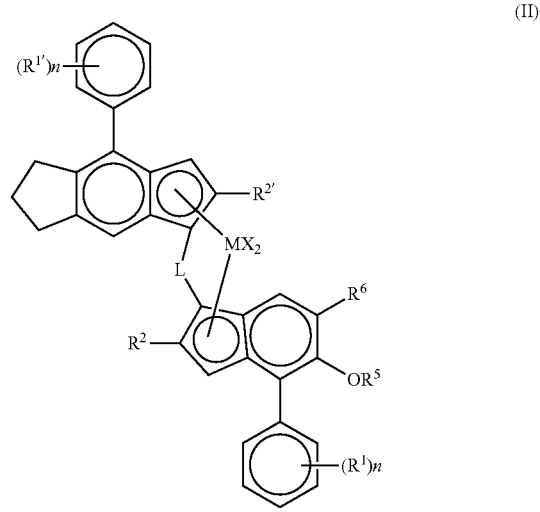

(II)

wherein

M is Hf;

X is a sigma ligand, preferably each X is independently a hydrogen atom, a halogen atom, $C_{1-6}$ alkoxy group, $C_{1-6}$ alkyl, phenyl or benzyl group;

L is an alkylene bridge or a bridge of the formula —$SiR^8_2$—, wherein each $R^8$ is independently $C_1$-$C_6$-alkyl, $C_{3-8}$ cycloalkyl or $C_6$-aryl group;

each n is independently 1 or 2;

$R^1$ and $R^{1'}$ are each independently the same or can be different and are a linear or branched $C_1$-$C_6$-alkyl group with the proviso that if there are four $R^1$ and $R^{1'}$ groups present, all 4 cannot simultaneously be tert butyl;

$R^2$ and $R^{2'}$ are the same or are different and are a $CH_2$—$R^9$ group, with $R^9$ being H or linear or branched $C_{1-6}$-alkyl group;

$R^5$ is a linear or branched $C_1$-$C_6$-alkyl group; and $R^6$ is a $C(R^{10})_3$ group, with $R^{10}$ being a linear or branched $C_4$-$C_6$ alkyl group.

In a further preferred embodiment, the invention provides a complex of formula (III)

(III)

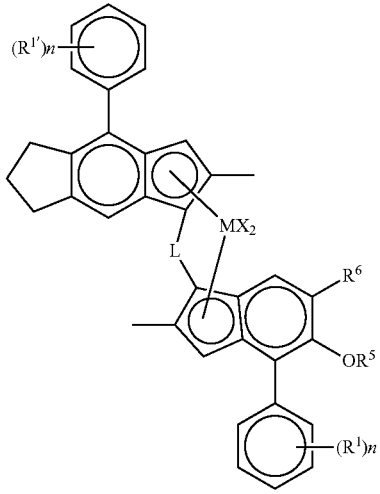

(IV)

wherein

M is Hf;

each X is a sigma ligand, preferably each X is independently a hydrogen atom, a halogen atom, $C_{1-6}$ alkoxy group, $C_{1-6}$ alkyl, phenyl or benzyl group;

L is —$SiR^8_2$—, wherein each $R^8$ is $C_{1-6}$ alkyl or $C_{3-8}$ cycloalkyl;

each n is independently 1 or 2;

$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl;

$R^5$ is a linear or branched $C_1$-$C_6$-alkyl group; and $R^6$ is a $C(R^{10})_3$ group, with $R^{10}$ being a linear or branched $C_4$-$C_6$ alkyl group.

In a further preferred embodiment, the invention provides a complex of formula (IV)

wherein

M is Hf each X is a hydrogen atom, a halogen atom, $C_{1-6}$ alkoxy group, $C_{1-6}$ alkyl, phenyl or benzyl group;

L is —$SiR^8_2$—, wherein each $R^8$ is $C_{1-4}$ alkyl or $C_{5-6}$ cycloalkyl;

each n is independently 1 or 2;

$R^1$ and $R^{1'}$ are each independently the same or can be different and are a linear or branched $C_1$-$C_6$-alkyl group with the proviso that if there are four $R^1$ and $R^{1'}$ groups present, all 4 cannot simultaneously be tert butyl, $R^5$ is a linear or branched $C_1$-$C_6$-alkyl group; and $R^6$ is a $C(R^{10})_3$ group, with $R^{10}$ being a linear or branched $C_4$-$C_6$ alkyl group.

In a further preferred embodiment, the invention provides a complex of formula (V)

(V)

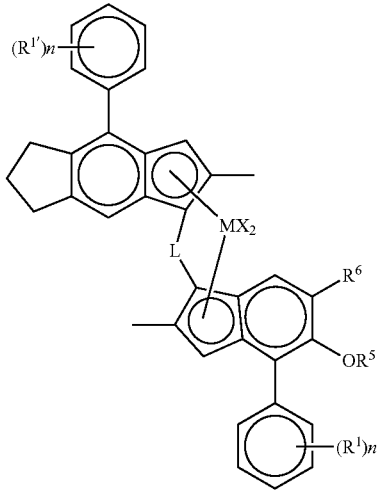

wherein

M is Hf;

X is a hydrogen atom, a halogen atom, $C_{1-6}$ alkoxy group, $C_{1-6}$ alkyl, phenyl or benzyl group;

L is —SiMe$_2$;

each n is independently 1 or 2;

$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl, $R^5$ is a linear or branched $C_1$-$C_4$-alkyl group; and $R^6$ is a $C(R^{10})_3$ group, with $R^{10}$ being a linear or branched $C_4$-$C_4$ alkyl group.

In a further preferred embodiment, the invention provides a complex of formula (VI)

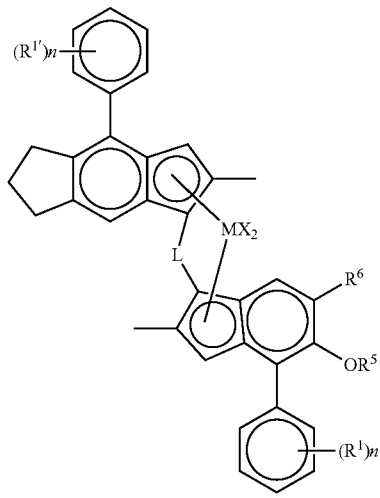

(VI)

wherein

M is Hf;

X is a hydrogen atom, a halogen atom, $C_{1-6}$ alkoxy group, $C_{1-6}$ alkyl, phenyl or benzyl group;

L is —SiMe$_2$;

each n is independently 1 or 2;

$R^1$ and $R^{1'}$ are each independently the same or can be different and are a linear or branched $C_1$-$C_6$-alkyl group, group with the proviso that if there are four $R^1$ and $R^{1'}$ groups present, all 4 cannot simultaneously be tert butyl;

$R^5$ is a linear $C_1$-$C_4$-alkyl group such as methyl; and $R^6$ is tert butyl.

In a further preferred embodiment, the invention provides a complex of formula (VII)

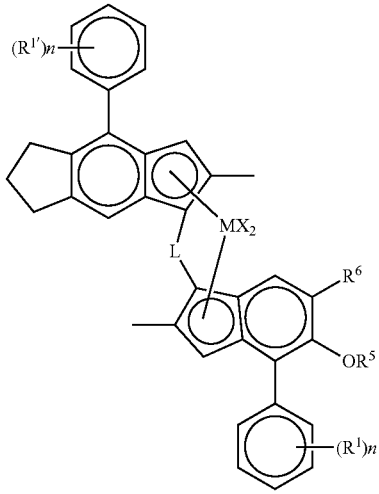

(VII)

wherein

M is Hf

X is a hydrogen atom, a halogen atom, $C_{1-6}$ alkoxy group, $C_{1-6}$ alkyl, phenyl or benzyl group, especially chlorine;

L is —SiMe$_2$;

each n is independently 1 or 2;

$R^1$ and $R^{1'}$ are each independently the same or can be different and are a linear or branched $C_1$-$C_4$-alkyl group with the proviso that if there are four $R^1$ and $R^{1'}$ groups present, all 4 cannot simultaneously be tert butyl;

$R^5$ is methyl; and $R^6$ is tert butyl.

In a preferred embodiment, the invention provides a complex of formula (VIII)

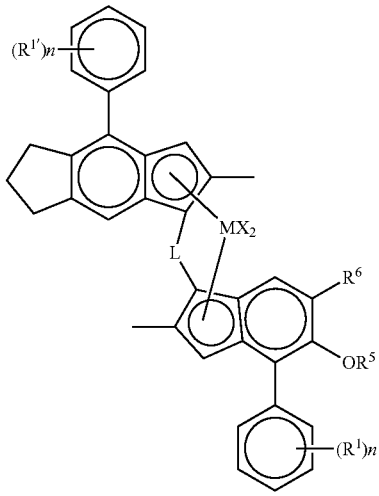

(VIII)

wherein

M is Hf;

X is Cl;

L is —SiMe$_2$;

each n is independently 1 or 2;

R$^1$ and R$^{1'}$ are each independently methyl or tert butyl with the proviso that if there are four R$^1$ and R$^{1'}$ groups present, all 4 cannot simultaneously be tert butyl, R$^5$ is methyl; and R$^6$ is tert butyl.

In any of formula (I) to (VIII) it is preferred if the 4-position substituent on either indenyl or indacenyl ring is a 3,5-dimethylphenyl- or 4-tBu-phenyl group.

In any of formula (I) to (VIII) it is preferred if the 4-position substituent on one of the indenyl or indacenyl ring is a 3,5-ditertbutyl and the other indenyl or indacenyl ring carries a 4-position 3,5-dimethylphenyl- or 4-tBu-phenyl group. In such a structure it is preferred if the ditertbutylphenyl is present on the indenyl ring.

In any of formula (I) to (VIII) it is preferred that if n=2 then both R$^1$ groups are the same.

In any of formula (I) to (VIII) it is preferred that if n=2 then both R$^1$ groups are the same.

In any of formula (I) to (VIII) it is preferred that if n=2 then R$^1$ groups are on the 3,5-position.

In any of formula (I) to (VIII) it is preferred that if n=2 then R$^1$ groups are on the 3,5-position.

In any of formula (I) to (VIII) it is preferred that if n=1 then R$^1$ is on the 4-position.

In any of formula (I) to (VIII) it is preferred that if n=1 then R$^1$ is on the 4-position.

Particular complexes of the invention include:

Racemic-anti-dimethylsilanediyl[2-methyl-4-(4-tert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-iso-butyl-4-(4-tert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-neo-pentyl-4-(4-tert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-benzyl-4-(4-tert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-cyclohexylmethyl-4-(4-tert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-methyl-4-(3,5-dimethylphenyl)-5,6,7-trihydro-s-indacen-1-yl][2-methyl-4-(3,5-dimethylphenyl)-5-methoxy-6-tert-butylindenyl hafnium dichloride or dimethyl, Racemic-anti-dimethylsilanediyl[2-iso-butyl-4-(3,5-dimethylphenyl)-5,6,7-trihydro-s-indacen-1-yl][2-methyl-4-(3,5-dimethylphenyl)-5-methoxy-6-tert-butylindenyl hafnium dichloride or dimethyl, Racemic-anti-dimethylsilanediyl[2-neo-pentyl-4-(3,5-dimethylphenyl)-5,6,7-trihydro-s-indacen-1-yl][2-methyl-4-(3,5-dimethylphenyl)-5-methoxy-6-tert-butylindenyl hafnium dichloride or dimethyl, Racemic-anti-dimethylsilanediyl[2-benzyl-4-(3,5-dimethylphenyl)-5,6,7-trihydro-5-indacen-1-yl][2-methyl-4-(3,5-dimethylphenyl)-5-methoxy-6-tert-butylindenyl hafnium dichloride or dimethyl, Racemic-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl hafnium dichloride or dimethyl, Racemic-anti-dimethylsilanediyl[2-cyclohexylmethyl-4-(3,5-dimethylphenyl)-5,6,7-trihydro-s-indacen-1-yl][2-methyl-4-(3,5-dimethylphenyl)-5-methoxy-6-tert-butylindenyl hafnium dichloride or dimethyl, Racemic-anti-dimethylsilanediyl[2-methyl-4-(4-tert-butylphenyl)-5,6,7-trihydro-5-indacen-1-yl][2-methyl-4-(3,5-ditert-butylphenyl)-5-methoxy-6-tert-butylindenyl hafnium dichloride or dimethyl, Racemic-anti-dimethylsilanediyl[2-methyl-4-(3,5-ditert-butylphenyl)-5,6,7-trihydro-s-indacen-1-yl][2-methyl-4-(4-tert-butylphenyl)-5-methoxy-6-tert-butylindenyl hafnium dichloride or dimethyl, Racemic-anti-dimethylsilanediyl[2-methyl-4-(3,5-dimethylphenyl)-5,6,7-trihydro-5-indacen-1-yl][2-methyl-4-(4-tertbutylphenyl)-5-methoxy-6-tert-butylindenyl hafnium dichloride or dimethyl, Racemic-anti-dimethylsilanediyl[2-methyl-4-(4-tert-butylphenyl)-5,6,7-trihydro-s-indacen-1-yl][2-methyl-4-(3,5-dimethylphenyl)-5-methoxy-6-tert-butylindenyl hafnium dichloride or dimethyl, Especially preferred complexes are as below, marked as MC-IE1 and MC-IE2.

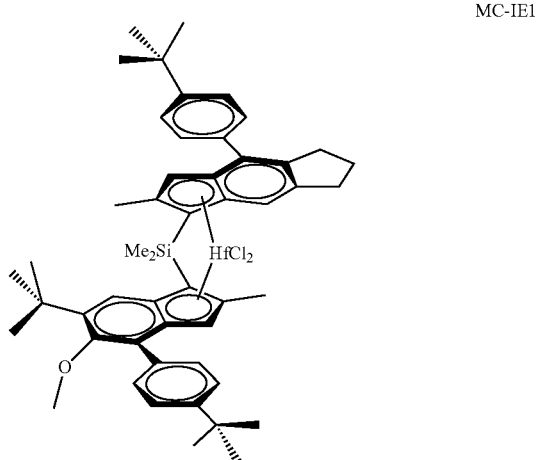

MC-IE1 rac-anti-dimethylsilanediyl
[2-methyl-4-(4'-tert-butylphenyl)-1,5,6,7-tetrahydro-s-indacen-1-yl][2-methyl-4-(4'-tert-butylphenyl)-5-methoxy-6-tert-butylinden-1-yl]
hafnium dichloride

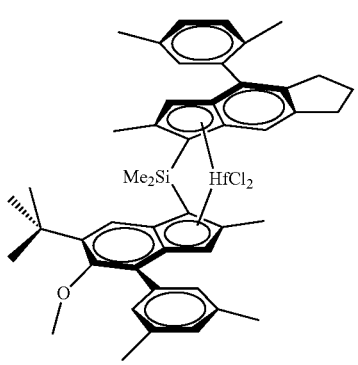

rac-anti-dimethylsilanediyl
[2-methyl-4-(3',5'-
dimethylphenyl)-1,5,6,7-
tetrahydro-s-indacen-1-yl][2-
methyl-4-(3',5'-
dimethylphenyl)-5-methoxy-
6-tert-butylinden-1-yl]
hafnium dichloride

MC-IE2

For the avoidance of doubt, any narrower definition of a substituent offered above can be combined with any other broad or narrowed definition of any other substituent.

Throughout the disclosure above, where a narrower definition of a substituent is presented, that narrower definition is deemed disclosed in conjunction with all broader and narrower definitions of other substituents in the application.

Synthesis

The ligands required to form the metallocenes of the invention can be synthesised by any process and the skilled organic chemist would be able to devise various synthetic protocols for the manufacture of the necessary ligand materials.

WO2007/116034 discloses the necessary chemistry and is herein incorporated by reference. Synthetic protocols can also generally be found in WO2002/02576, WO2011/135004, WO2012/084961, WO2012/001052, WO2011/076780 and WO2015/158790. The examples section also provides the skilled person with sufficient direction.

Intermediates

The invention primarily relates to hafnium complexes and catalysts thereof. According to the invention, the complexes have ligands of formula (F)

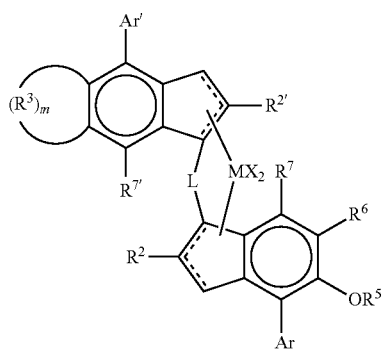

(I')

Preferably of formula (Ib'):

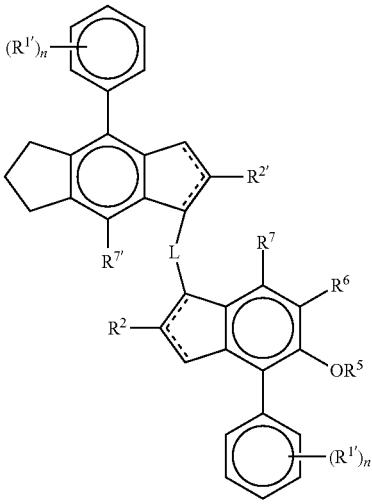

(Ib')

wherein the substituents are as hereinbefore defined and the dotted lines represent a double bond present either between carbons 1 and 2 or 2 and 3 of the indenyl ring, and either between carbons 1' and 2' or 2' and 3' of the indacenyl ring. It will be appreciated therefore that this molecule contains double bond isomers. By double bond isomers is meant the compounds where the double bond is positioned between the 2 and 3 atoms rather than 1 and 2 atoms of the bicyclic ring. It may be that more than one double bond isomer is present in a sample. Preferred ligands are analogues of the complexes (II) to (VIII) described above from which HfX$_2$ coordination has been removed and the proton returned to the indenyl.

Cocatalyst

To form an active catalytic species it is normally necessary to employ a cocatalyst as is well known in the art. Typically cocatalysts comprise a compound of Group 13 metal, like organoaluminium compounds. According to the present invention cocatalysts comprising two type of compounds of Group 13 metals, i.e. an organoaluminium compound and a boron based compound, are used to activate metallocene catalysts in this invention.

The olefin polymerisation catalyst system of the invention comprises (i) a complex as defined herein; and (ii) an aluminium alkyl compound, or the reaction product thereof, and (iii) a boron based cocatalyst Preferably the aluminium containing cocatalyst is an alumoxane, like MAO or an alumoxane other than MAO, and the boron containing cocatalyst is a borate. I.e. the catalyst comprises both Al and B containing compounds as cocatalysts. Boron containing cocatalyst is preferably a borate.

Thus, borate cocatalysts are employed in the catalyst of the present invention together with an Al containing cocatalyst.

The aluminoxane cocatalyst can be one of formula (X):

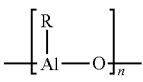

(X)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, C1-C10 alkyl, preferably C1-C5 alkyl, or C3-10-cycloalkyl, C7-C12-arylalkyl or alkylaryl and/or phenyl or naphthyl, and where Y can be hydrogen, halogen, preferably chlorine or bromine, or C1-C10 alkoxy, preferably methoxy or ethoxy. The resulting oxygen-containing aluminoxanes are not in general pure compounds but mixtures of oligomers of the formula (X).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

It has been surprisingly found however that, in the context of heterogeneous catalysis, in specific cases higher activities, higher melting temperatures and higher molecular weight can be achieved if a boron-based cocatalyst is also employed as a cocatalyst together with an aluminium cocatalyst, and if the metal M in the metallocene is hafnium.

Boron based cocatalysts used in the present invention include boron compounds containing preferably a borate anion, i.e. borate compounds. These compounds generally contain an anion of formula:

$(Z)_4B^-$ (XI)

where Z is an optionally substituted phenyl derivative, said substituent being a halo-$C_{1-6}$-alkyl or halo group. Preferred options are fluoro or trifluoromethyl. Most preferably, the phenyl group is perfluorinated. Such ionic cocatalysts preferably contain a non-coordinating anion such as tetrakis(pentafluorophenyl)borate.

Suitable counterions are protonated amine or aniline derivatives or phosphonium ions. These may have the general formula (XII) or (XIII):

$NQ_4^+$(XI) or $PQ_4^+$ (XIII)

where Q is independently H, $C_{1-6}$-alkyl, $C_{3-8}$ cycloalkyl, phenyl$C_{1-6}$-alkyl or optionally substituted phenyl. Optional substituents may be $C_{1-6}$-alkyl, halo or nitro. There may be one or more than one such substituent. Preferred substituted phenyl groups include therefore para-substituted phenyl, preferably tolyl or dimethylphenyl.

It is preferred if at least one Q group is H, thus preferred compounds are those of formula:

$NHQ_3^+$(VI) or $PHQ_3^+$ (XIV)

Preferred phenyl-$C_{1-6}$-alkyl- groups include benzyl.

Suitable counterions therefore include: methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, p-bromo-N,N-dimethylanilinium or p-nitro-N,N-dimethylanilinium, especially dimethylammonium or N,N-dimethylanilinium. The use of pyridinium as an ion is a further option.

Phosphonium ions of interest include triphenylphosphonium, triethylphosphonium, diphenylphosphonium, tri(methylphenyl)phosphonium and tri(dimethylphenyl)phosphonium.

A more preferred counterion is trityl ($CPh_3$) or analogues thereof in which the Ph group is functionalised to carry one or more alkyl groups. Highly preferred borates of use in the invention therefore comprise the tetrakis(pentafluorophenyl)borate ion.

Preferred ionic compounds which can be used according to the present invention include:
tributylammoniumtetra(pentafluorophenyl)borate,
tributylammoniumtetra(trifluoromethylphenyl)borate,
tributylammoniumtetra-(4-fluorophenyl)borate,
N,N-dimethylcyclohexylammoniumtetrakis-(pentafluorophenyl)borate,
N,N-dimethylbenzylammoniumtetrakis(pentafluorophenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakis(pentafluorophenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate, N,N-dimethylbenzylammoniumtetrakis(pentafluorophenyl)borate or N,N-dimethylaniliniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

Suitable amounts of cocatalyst will be well known to the skilled man.

The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

Catalyst Manufacture

The metallocene complex of the present invention is used in combination with the suitable Al and B containing cocatalysts as defined above as a catalyst for the polymerization of propylene, as it is well known in the art. Preferably, polymerization of propylene takes place in the condensed phase or in gas phase.

The catalyst of the invention can be used in supported on an external carrier or support material. The particulate support material used is preferably an organic or inorganic material, such as silica, alumina or zirconia or a mixed oxide such as silica-alumina, in particular silica, alumina or silica-alumina. The use of a silica support is preferred. The skilled man is aware of the procedures required to support a metallocene catalyst.

Especially preferably the support is a porous material so that the complex may be loaded into the pores of the support, e.g. using a process analogous to those described in WO94/14856 (Mobil), WO95/12622 (Borealis) and WO2006/097497. The particle size is not critical but is preferably in the range 5 to 200 μm, more preferably 20 to 80 μm. The use of these supports is routine in the art.

In one preferred embodiment, no external carrier is used but the catalyst is still presented in solid particulate form. Thus, no external support material, such as inert organic or inorganic carrier, for example silica as described above is employed.

In order to provide the catalyst of the invention in solid form but without using an external carrier, it is preferred if a liquid/liquid emulsion system is used. The process involves forming dispersing catalyst components (i) and (ii) in a solvent, and solidifying said dispersed droplets to form solid particles.

In particular, the method involves preparing a solution of one or more catalyst components; dispersing said solution in an solvent to form an emulsion in which said one or more catalyst components are present in the droplets of the dispersed phase; immobilising the catalyst components in the dispersed droplets, in the absence of an external particulate porous support, to form solid particles comprising the said catalyst, and optionally recovering said particles.

This process enables the manufacture of active catalyst particles with improved morphology, e.g. with a predetermined spherical shape, surface properties and particle size and without using any added external porous support material, such as an inorganic oxide, e.g. silica. By the term "preparing a solution of one or more catalyst components" is meant that the catalyst forming compounds may be combined in one solution which is dispersed to the immiscible solvent, or, alternatively, at least two separate catalyst solutions for each part of the catalyst forming compounds may be prepared, which are then dispersed successively to the solvent.

In a preferred method for forming the catalyst at least two separate solutions for each or part of said catalyst may be prepared, which are then dispersed successively to the immiscible solvent.

More preferably, a solution of the complex comprising the transition metal compound and the cocatalysts is combined with the solvent to form an emulsion wherein that inert solvent forms the continuous liquid phase and the solution comprising the catalyst components forms the dispersed phase (discontinuous phase) in the form of dispersed droplets. The droplets are then solidified to form solid catalyst particles, and the solid particles are separated from the liquid and optionally washed and/or dried. The solvent forming the continuous phase may be immiscible to the catalyst solution at least at the conditions (e. g. temperatures) used during the dispersing step.

The term "immiscible with the catalyst solution" means that the solvent (continuous phase) is fully immiscible or partly immiscible i.e. not fully miscible with the dispersed phase solution.

Preferably said solvent is inert in relation to the compounds of the catalyst system to be produced. Full disclosure of the necessary process can be found in WO03/051934 which is herein incorporated by reference.

The inert solvent must be chemically inert at least at the conditions (e.g. temperature) used during the dispersing step. Preferably, the solvent of said continuous phase does not contain dissolved therein any significant amounts of catalyst forming compounds. Thus, the solid particles of the catalyst are formed in the droplets from the compounds which originate from the dispersed phase (i.e. are provided to the emulsion in a solution dispersed into the continuous phase).

The terms "immobilisation" and "solidification" are used herein interchangeably for the same purpose, i.e. for forming free flowing solid catalyst particles in the absence of an external porous particulate carrier, such as silica. The solidification happens thus within the droplets. Said step can be effected in various ways as disclosed in said WO03/051934 Preferably solidification is caused by an external stimulus to the emulsion system such as a temperature change to cause the solidification. Thus in said step the catalyst component (s) remain "fixed" within the formed solid particles. It is also possible that one or more of the catalyst components may take part in the solidification/immobilisation reaction.

Accordingly, solid, compositionally uniform particles having a predetermined particle size range can be obtained.

Furthermore, the particle size of the catalyst particles of the invention can be controlled by the size of the droplets in the solution, and spherical particles with a uniform particle size distribution can be obtained.

The invention is also industrially advantageous, since it enables the preparation of the solid particles to be carried out as a one-pot procedure. Continuous or semicontinuous processes are also possible for producing the catalyst.

Dispersed Phase

The principles for preparing two phase emulsion systems are known in the chemical field. Thus, in order to form the two phase liquid system, the solution of the catalyst component (s) and the solvent used as the continuous liquid phase have to be essentially immiscible at least during the dispersing step. This can be achieved in a known manner e.g. by choosing said two liquids and/or the temperature of the dispersing step/solidifying step accordingly.

A solvent may be employed to form the solution of the catalyst component (s). Said solvent is chosen so that it dissolves said catalyst component (s). The solvent can be preferably an organic solvent such as used in the field, comprising an optionally substituted hydrocarbon such as linear or branched aliphatic, alicyclic or aromatic hydrocarbon, such as a linear or cyclic alkane, an aromatic hydrocarbon and/or a halogen containing hydrocarbon.

Examples of aromatic hydrocarbons are toluene, benzene, ethylbenzene, propylbenzene, butylbenzene and xylene. Toluene is a preferred solvent. The solution may comprise one or more solvents. Such a solvent can thus be used to facilitate the emulsion formation, and usually does not form part of the solidified particles, but e.g. is removed after the solidification step together with the continuous phase.

Alternatively, a solvent may take part in the solidification, e.g. an inert hydrocarbon having a high melting point (waxes), such as above 40° C., suitably above 70° C., e. g. above 80° C. or 90° C., may be used as solvents of the dispersed phase to immobilise the catalyst compounds within the formed droplets.

In another embodiment, the solvent consists partly or completely of a liquid monomer, e.g. liquid olefin monomer designed to be polymerised in a "prepolymerisation" immobilisation step.

Continuous Phase

The solvent used to form the continuous liquid phase is a single solvent or a mixture of different solvents and may be immiscible with the solution of the catalyst components at least at the conditions (e.g. temperatures) used during the dispersing step. Preferably said solvent is inert in relation to said compounds.

The term "inert in relation to said compounds" means herein that the solvent of the continuous phase is chemically inert, i.e. undergoes no chemical reaction with any catalyst forming component. Thus, the solid particles of the catalyst are formed in the droplets from the compounds which originate from the dispersed phase, i.e. are provided to the emulsion in a solution dispersed into the continuous phase.

It is preferred that the catalyst components used for forming the solid catalyst will not be soluble in the solvent of the continuous liquid phase. Preferably, said catalyst components are essentially insoluble in said continuous phase forming solvent.

Solidification takes place essentially after the droplets are formed, i.e. the solidification is effected within the droplets e.g. by causing a solidifying reaction among the compounds present in the droplets. Furthermore, even if some solidifying agent is added to the system separately, it reacts within the droplet phase and no catalyst forming components go into the continuous phase.

The term "emulsion" used herein covers both bi- and multiphasic systems.

In a preferred embodiment said solvent forming the continuous phase is an inert solvent including a halogenated organic solvent or mixtures thereof, preferably fluorinated organic solvents and particularly semi, highly or perfluorinated organic solvents and functionalised derivatives thereof. Examples of the above-mentioned solvents are semi, highly or perfluorinated hydrocarbons, such as alkanes, alkenes and cycloalkanes, ethers, e.g. perfluorinated ethers and amines, particularly tertiary amines, and functionalised derivatives thereof. Preferred are semi, highly or perfluorinated, particularly perfluorinated hydrocarbons, e.g. perfluorohydrocarbons of e.g. C3-C30, such as C4-C10. Specific examples of suitable perfluoroalkanes and perfluorocycloalkanes include perfluoro-hexane, -heptane, -octane and -(methylcyclohexane). Semi fluorinated hydrocarbons relates particularly to semifluorinated n-alkanes, such as perfluoroalkyl-alkane.

"Semi fluorinated" hydrocarbons also include such hydrocarbons wherein blocks of —C—F and —C—H alternate. "Highly fluorinated" means that the majority of the —C—H units are replaced with —C—F units. "Perfluorinated" means that all —C—H units are replaced with —C—F units. See the articles of A. Enders and G. Maas in "Chemie in unserer Zeit", 34. Jahrg. 2000, Nr. 6, and of Pierandrea Fo Nostro in "Advances in Colloid and Interface Science", 56 (1995) 245-287, Elsevier Science.

Dispersing Step

The emulsion can be formed by any means known in the art: by mixing, such as by stirring said solution vigorously to said solvent forming the continuous phase or by means of mixing mills, or by means of ultra sonic wave, or by using a so called phase change method for preparing the emulsion by first forming a homogeneous system which is then transferred by changing the temperature of the system to a biphasic system so that droplets will be formed.

The two phase state is maintained during the emulsion formation step and the solidification step, as, for example, by appropriate stirring.

Additionally, emulsifying agents/emulsion stabilisers can be used, preferably in a manner known in the art, for facilitating the formation and/or stability of the emulsion. For the said purposes e.g. surfactants, e.g. a class based on hydrocarbons (including polymeric hydrocarbons with a molecular weight e.g. up to 10 000 and optionally interrupted with a heteroatom(s)), preferably halogenated hydrocarbons, such as semi- or highly fluorinated hydrocarbons optionally having a functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers and/or any reactive derivative of these groups, like alkoxy, or carboxylic acid alkyl ester groups, or, preferably semi-, highly- or perfluorinated hydrocarbons having a functionalised terminal, can be used. The surfactants can be added to the catalyst solution, which forms the dispersed phase of the emulsion, to facilitate the forming of the emulsion and to stabilize the emulsion.

Alternatively, an emulsifying and/or emulsion stabilising aid can also be formed by reacting a surfactant precursor bearing at least one functional group with a compound reactive with said functional group and present in the catalyst solution or in the solvent forming the continuous phase. The obtained reaction product acts as the actual emulsifying aid and or stabiliser in the formed emulsion system.

Examples of the surfactant precursors usable for forming said reaction product include e.g. known surfactants which bear at least one functional group selected e.g. from —OH, —SH, $NH_2$, $NR''_2$. —COOH, —$COONH_2$, oxides of alkenes, —CR''=$CH_2$, where R" is hydrogen, or C1-C20 alkyl, C2-20-alkenyl or C2-20-alkynyl group, oxo-groups, cyclic ethers with 3 to 5 ring atoms, and/or any reactive derivative of these groups, like alkoxy or carboxylic acid alkyl ester groups; e.g. semi-, highly or perfluorinated hydrocarbons bearing one or more of said functional groups. Preferably, the surfactant precursor has a terminal functionality as defined above.

The compound reacting with such surfactant precursor is preferably contained in the catalyst solution and may be a further additive or one or more of the catalyst forming compounds. Such compound is e.g. a compound of group 13 (e.g. MAO and/or an aluminium alkyl compound and/or a transition metal compound).

If a surfactant precursor is used, it is preferably first reacted with a compound of the catalyst solution before the addition of the transition metal compound. In one embodiment e.g. a highly fluorinated C1-n (suitably C4-30- or C5-15) alcohol (e.g. highly fluorinated heptanol, octanol or nonanol), oxide (e.g. propenoxide) or acrylate ester is reacted with a cocatalyst to form the "actual" surfactant. Then, an additional amount of cocatalyst and the transition metal compound is added to said solution and the obtained solution is dispersed to the solvent forming the continuous phase. The "actual" surfactant solution may be prepared before the dispersing step or in the dispersed system. If said solution is made before the dispersing step, then the prepared "actual" surfactant solution and the transition metal solution may be dispersed successively (e. g. the surfactant solution first) to the immiscible solvent, or be combined together before the dispersing step.

Solidification

The solidification of the catalyst component(s) in the dispersed droplets can be effected in various ways, e.g. by causing or accelerating the formation of said solid catalyst forming reaction products of the compounds present in the droplets. This can be effected, depending on the used compounds and/or the desired solidification rate, with or without an external stimulus, such as a temperature change of the system.

In a particularly preferred embodiment, the solidification is effected after the emulsion system is formed by subjecting the system to an external stimulus, such as a temperature change. Temperature differences of e.g. 5 to 100° C., such as 10 to 100° C., or 20 to 90° C., such as 50 to 90° C.

The emulsion system may be subjected to a rapid temperature change to cause a fast solidification in the dispersed system. The dispersed phase may e. g. be subjected to an immediate (within milliseconds to few seconds) temperature change in order to achieve an instant solidification of the component (s) within the droplets. The appropriate temperature change, i. e. an increase or a decrease in the temperature of an emulsion system, required for the desired solidification rate of the components cannot be limited to any specific range, but naturally depends on the emulsion system, i. a. on the used compounds and the concentrations/ratios thereof, as well as on the used solvents, and is chosen accordingly. It is also evident that any techniques may be used to provide sufficient heating or cooling effect to the dispersed system to cause the desired solidification.

In one embodiment the heating or cooling effect is obtained by bringing the emulsion system with a certain temperature to an inert receiving medium with significantly different temperature, e. g. as stated above, whereby said temperature change of the emulsion system is sufficient to cause the rapid solidification of the droplets. The receiving medium can be gaseous, e. g. air, or a liquid, preferably a solvent, or a mixture of two or more solvents, wherein the catalyst component (s) is (are) immiscible and which is inert in relation to the catalyst component (s). For instance, the receiving medium comprises the same immiscible solvent used as the continuous phase in the first emulsion formation step.

Said solvents can be used alone or as a mixture with other solvents, such as aliphatic or aromatic hydrocarbons, such as alkanes. Preferably a fluorinated solvent as the receiving medium is used, which may be the same as the continuous phase in the emulsion formation, e. g. perfluorinated hydrocarbon.

Alternatively, the temperature difference may be effected by gradual heating of the emulsion system, e. g. up to 10° C. per minute, preferably 0.5 to 6° C. per minute and more preferably in 1 to 5° C. per minute.

In case a melt of e. g. a hydrocarbon solvent is used for forming the dispersed phase, the solidifcation of the droplets may be effected by cooling the system using the temperature difference stated above.

Preferably, the "one phase" change as usable for forming an emulsion can also be utilised for solidifying the catalytically active contents within the droplets of an emulsion system by, again, effecting a temperature change in the dispersed system, whereby the solvent used in the droplets becomes miscible with the continuous phase, preferably a fluorous continuous phase as defined above, so that the droplets become impoverished of the solvent and the solidifying components remaining in the "droplets" start to solidify. Thus the immisciblity can be adjusted with respect to the solvents and conditions (temperature) to control the solidification step.

The miscibility of e.g. organic solvents with fluorous solvents can be found from the literature and be chosen accordingly by a skilled person. Also the critical temperatures needed for the phase change are available from the literature or can be determined using methods known in the art, e. g. the Hildebrand-Scatchard-Theorie. Reference is also made to the articles of A. Enders and G. and of Pierandrea Lo Nostro cited above.

Thus according to the invention, the entire or only part of the droplet may be converted to a solid form. The size of the "solidified" droplet may be smaller or greater than that of the original droplet, e. g. if the amount of the monomer used for the prepolymerisation is relatively large.

The solid catalyst particles recovered can be used, after an optional washing step, in a polymerisation process of propylene. Alternatively, the separated and optionally washed solid particles can be dried to remove any solvent present in the particles before use in the polymerisation step. The separation and optional washing steps can be effected in a known manner, e. g. by filtration and subsequent washing of the solids with a suitable solvent.

The droplet shape of the particles may be substantially maintained. The formed particles may have an average size range of 1 to 500 µm, e.g. 5 to 500 µm, advantageously 5 to 200 µm or 10 to 150 µm. Even an average size range of 5 to 60 µm is possible. The size may be chosen depending on the polymerisation the catalyst is used for. Advantageously, the particles are essentially spherical in shape, they have a low porosity and a low surface area.

The formation of solution can be effected at a temperature of 0-100° C., e.g. at 20-80° C. The dispersion step may be effected at −20° C.-100° C., e.g. at about −10-70° C., such as at −5 to 30° C., e.g. around 0° C.

To the obtained dispersion an emulsifying agent as defined above, may be added to improve/stabilise the droplet formation. The solidification of the catalyst component in the droplets is preferably effected by raising the temperature of the mixture, e.g. from 0° C. temperature up to 100° C., e.g. up to 60-90° C., gradually. E.g. in 1 to 180 minutes, e.g. 1-90 or 5-30 minutes, or as a rapid heat change. Heating time is dependent on the size of the reactor.

During the solidification step, which is preferably carried out at about 60 to 100° C., preferably at about 75 to 95° C., (below the boiling point of the solvents) the solvents may preferably be removed and optionally the solids are washed with a wash solution, which can be any solvent or mixture of solvents such as those defined above and/or used in the art, preferably a hydrocarbon, such as pentane, hexane or heptane, suitably heptane. The washed catalyst can be dried or it can be slurried into an oil and used as a catalyst-oil slurry in polymerisation process.

All or part of the preparation steps can be done in a continuous manner. Reference is made to WO2006/069733 describing principles of such a continuous or semicontinuous preparation methods of the solid catalyst types, prepared via emulsion/solidification method.

Catalyst Off-Line Prepolymerisation

The use of the heterogeneous catalysts, where no external support material is used (also called "self-supported" catalysts) might have, as a drawback, a tendency to dissolve to some extent in the polymerisation media, i.e. some active catalyst components might leach out of the catalyst particles during slurry polymerisation, whereby the original good morphology of the catalyst might be lost. These leached catalyst components are very active possibly causing problems during polymerisation. Therefore, the amount of leached components should be minimized, i.e. all catalyst components should be kept in heterogeneous form.

Furthermore, the self-supported catalysts generate, due to the high amount of catalytically active species in the catalyst system, high temperatures at the beginning of the polymerisation which may cause melting of the product material. Both effects, i.e. the partial dissolving of the catalyst system and the heat generation, might cause fouling, sheeting and deterioration of the polymer material morphology.

In order to minimise the possible problems associated with high activity or leaching, it is possible to "offline prepolymerise" the catalyst before using it in polymerisation process.

It has to be noted that off line prepolymerisation in this regard is part of the catalyst preparation process, being a step carried out after a solid catalyst is formed. The catalyst offline prepolymerisation step is not part of the actual polymerisation process configuration comprising a prepolymerisation step. After the catalyst off line prepolymerisation step, the solid catalyst can be used in polymerisation.

Catalyst "offline prepolymerisation" takes place following the solidification step of the liquid-liquid emulsion process. Pre-polymerisation may take place by known methods described in the art, such as that described in WO 2010/052263, WO 2010/052260 or WO 2010/052264. Preferable embodiments of this aspect of the invention are described herein.

As monomers in the catalyst off-line prepolymerisation step preferably alpha-olefins are used. Preferable $C_2$-$C_{10}$ olefins, such as ethylene, propylene, 1-butene, 1-pentene, 1-hexene, 4-methyl-1-pentene, 1-heptene, 1-octene, 1-nonene 1-decene, styrene and vinylcyclohexene are used. Most preferred alpha-olefins are ethylene and propylene, especially propylene.

The catalyst off-line prepolymerisation may be carried out in gas phase or in an inert diluent, typically oil or fluorinated hydrocarbon, preferably in fluorinated hydrocarbons or mixture of fluorinated hydrocarbons. Preferably perfluorinated hydrocarbons are used. The melting point of such (per) fluorinated hydrocarbons is typically in the range of 0 to 140° C., preferably 30 to 120° C., like 50 to 110° C.

Where the catalyst off line prepolymerisation is done in fluorinated hydrocarbons, the temperature for the pre-polymerisation step is below 70° C., e.g. in the range of −30 to 70° C., preferably 0-65° C. and more preferably in the range 20 to 55° C. Pressure within the reaction vessel is preferably higher than atmospheric pressure to minimize the eventual leaching of air and/or moisture into the catalyst vessel. Preferably the pressure is in the range of at least 1 to 15 bar, preferably 2 to bar. The reaction vessel is preferably kept in an inert atmosphere, such as under nitrogen or argon or similar atmosphere.

Off line prepolymerisation is continued until the desired pre-polymerisation degree, defined as weight of polymer matrix/weight of solid catalyst before pre-polymerisation step, is reached. The degree is below 25, preferably 0.5 to 10.0, more preferably 1.0 to 8.0, most preferably 2.0 to 6.0.

Use of the off-line catalyst prepolymerisation step offers the advantage of minimising leaching of catalyst components and thus local overheating.

After offline prepolymerisation, the catalyst can be isolated and stored.

Polymerisation

The catalysts according to the invention are especially suited to the formation of propylene homopolymers and propylene copolymers, like propylene copolymers with ethylene or C4 to C10 alpha olefins or mixtures thereof, like propylene random copolymers with ethylene, however, especially propylene homopolymers and propylene heterophasic copolymers.

Polymerization in the method of the invention may be effected in one or more, e.g. 1, 2 or 3, polymerization reactors, using conventional polymerization techniques, e.g. gas phase, slurry or bulk polymerization or combinations thereof, like a combination of a slurry and at least one gas phase reactor. Heterophasic propylene polymers are typically produced in a reactor configuration comprising a slurry and two gas phase reactors.

In case of propylene polymerisation for slurry reactors, the reaction temperature will generally be in the range 60 to 110° C. (e.g. 60-90° C.), the reactor pressure will generally be in the range 5 to 80 bar (e.g. 20-60 bar), and the residence time will generally be in the range 0.1 to 5 hours (e.g. 0.3 to 2 hours). The monomer is usually used as reaction medium.

For gas phase reactors, the reaction temperature used will generally be in the range 60 to 115° C. (e.g. 70 to 110° C.), the reactor pressure will generally be in the range 10 to 25 bar, and the residence time will generally be 0.5 to 8 hours (e.g. 0.5 to 4 hours). The gas used will be the monomer optionally as mixture with a non-reactive gas such as nitrogen or propane. In addition to actual polymerisation steps and reactors, the process can contain any additional polymerisation steps, like prepolymerisation step, and any further post-reactor handling steps as known in the art.

Generally the quantity of catalyst used will depend upon the nature of the catalyst, the reactor types and conditions and the properties desired for the polymer product. As is well known in the art hydrogen can be used for controlling the molecular weight of the polymer.

The metallocene catalysts of the invention are able to provide polymers of high molecular weight Mw, as indicated by a low melt flow rate, and high melting temperature with good catalyst activity.

Polymers obtained with the metallocenes of the invention have normal particle morphologies.

It will be appreciated that the catalyst may be subject to prepolymerisation preceding the actual polymerisation step as known in the art Polymers It is a feature of the invention that the claimed catalysts enable the formation of polymers with high molecular weight. These features can be achieved at industrially relevant polymerisation temperatures, e.g. 60° C. or more. It is a preferred feature of the invention that the catalysts of the invention are used to polymerise propylene at a temperature of at least 60° C., preferably at least 65° C., such as at least 70° C.

Polypropylene Homopolymers

Polypropylene homopolymers made by the catalysts of the invention can be made with Mw (weight average molecular weight) values in the range of 40 to 2 000 kg/mol, preferably in the range of 50 to 1 500 kg/mol depending on the use and amount of hydrogen used as Mw regulating agent. The catalysts of the invention enable the formation of polypropylene homopolymers with high melting points. In a preferred embodiment the propylene homopolymer formed by the process of the invention has a melting point of more than 157° C., preferably more than 158° C., even 159° C. or more.

Propylene-Ethylene Copolymers

Propylene-ethylene copolymers made by the metallocenes of the invention can be made with Mw values in the range of 40 to 2,000 kg/mol, preferably in the range of 50 to 1,500 kg/mol depending on the amount of comonomer content and/or use and amount of hydrogen used as Mw regulating agent.

It is known that tensile and impact properties of a heterophasic PP/EPR reactor blend (polypropylene/ethylene-propylene rubber), for a given rubber comonomer composition, can be improved by increasing the molecular weight of the rubber phase. Typically metallocene catalysts produce hPP with relatively low $T_m$ of the hPP matrix, usually below 157° C. or even well below 154° C. It is known that a higher $T_m$ is beneficial for the material stiffness.

Metallocene catalysts with Hf as the transition metal of the present invention as defined in the claims produce EPR in gas phase having higher molecular weight (as measured by iV(EPR)>2 dL/g) and produce a homopolymer polypropylene matrix with higher melting point, e.g. ($T_m$ of at least 157° C.), compared to metallocenes of the prior art and compared to their zirconium analogues.

The catalysts based on these new metallocenes have very high activity and long lifetime, allowing the production of multi-reactor blend compositions. The quite high molecular weight of the rubber phase allows the use of hydrogen to increase gas phase activity and fine-tune the blend properties.

The polymers made by the catalysts of the invention are useful in all kinds of end articles such as pipes, films (cast, blown or BOPP films, such as for example BOPP for capacitor film), fibers, moulded articles (e.g. injection moulded, blow moulded, rotomoulded articles), extrusion coatings and so on.

The invention will now be illustrated by reference to the following non-limiting examples and figures.

ANALYTICAL TESTS

Figure 1:
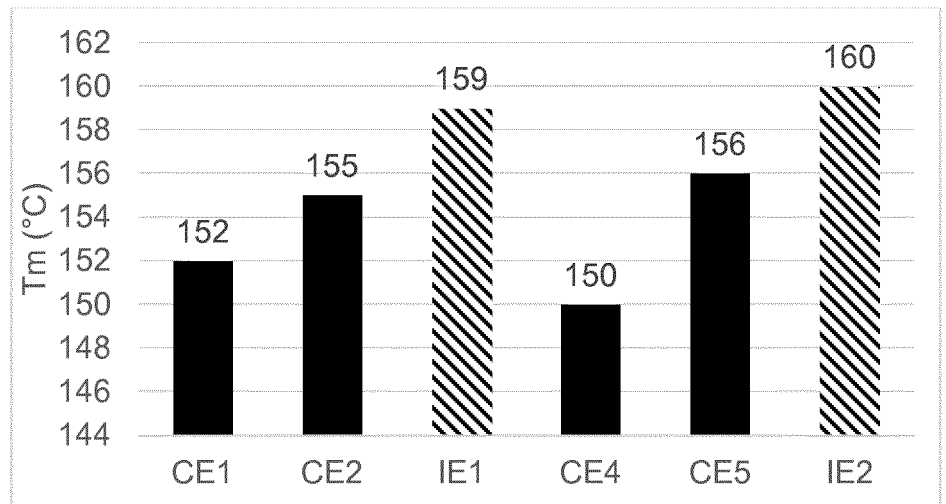
FIG. 1 illustrates polypropylene homopolymer melting temperatures for samples produced with the comparative and inventive catalysts CE1, CE2 and IE1; and CE4, CE5 and IE2. Inventive catalysts provide propylene homopolymer with at least roughly 4 degrees higher melting temperature than polymers produced using comparative catalysts.
Figure 2:
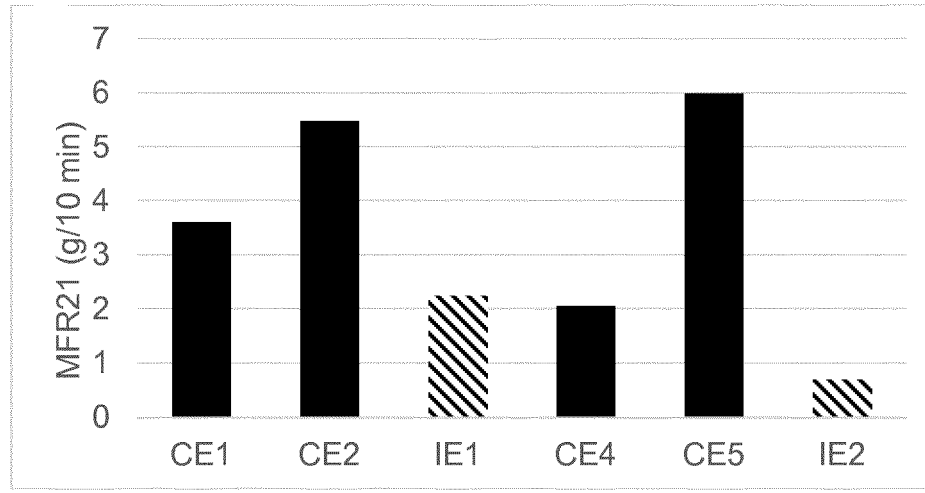
FIG. 2 illustrates $MFR_{21}$ results for the propylene homopolymer samples produced with the comparative and inventive catalysts CE1, CE2 and IE1; and CE4, CE5 and IE2. MFR values are clearly lower, indicating a higher molecular weight, for the polymers produced with the inventive catalysts than with the comparative catalysts.
Figure 3:
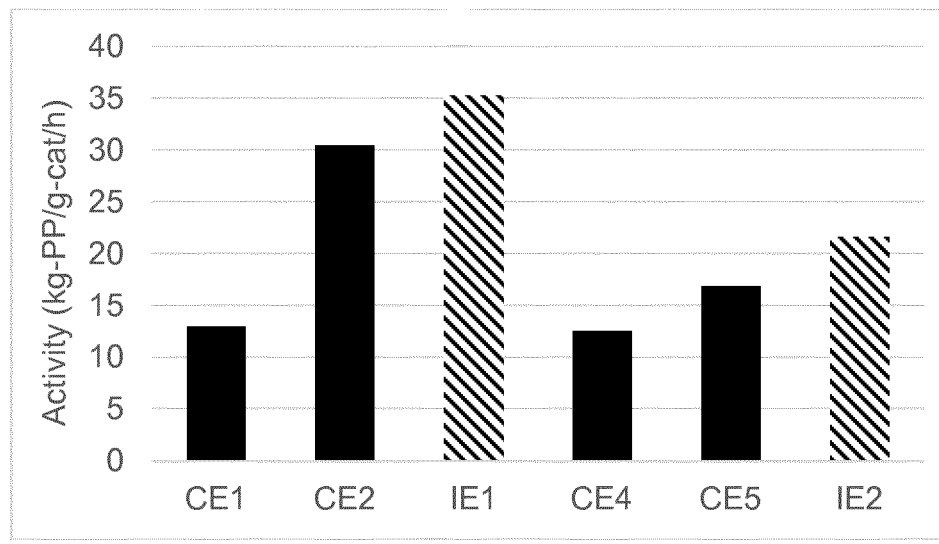
FIG. 3 illustrates activity of the catalysts in producing propylene homopolymer with the comparative and inventive catalysts CE1, CE2 and IE1; and CE4, CE5 and IE2. With inventive catalysts activity is higher than with related comparative examples.

Measurement Methods:
Al, Zr and Hf Determination (ICP-Method)

The elementary analysis of a catalyst was performed by taking a solid sample of mass, M, cooling over dry ice. Samples were diluted up to a known volume, V, by dissolving in nitric acid ($HNO_3$, 65%, 5% of V) and freshly deionised (DI) water (5% of V). The solution was then added to hydrofluoric acid (HF, 40%, 3% of V), diluted with DI water up to the final volume, V, and left to stabilise for two hours.

The analysis was run at room temperature using a Thermo Elemental iCAP 6300 Inductively Coupled Plasma-Optical Emission Spectrometer (ICP-OES) which was calibrated using a blank (a solution of 5% $HNO_3$, 3% HF in DI water), and 6 standards of 0.5 ppm, 1 ppm, 10 ppm, 50 ppm, 100 ppm and 300 ppm of Al, with 0.5 ppm, 1 ppm, 5 ppm, 20 ppm, 50 ppm and 100 ppm of Hf and Zr in solutions of 5% HNO3, 3% HF in DI water.

Immediately before analysis the calibration is 'resloped' using the blank and 100 ppm Al, 50 ppm Hf, Zr standard, a quality control sample (20 ppm Al, 5 ppm Hf, Zr in a solution of 5% HNO3, 3% HF in DI water) is run to confirm the reslope. The QC sample is also run after every 5th sample and at the end of a scheduled analysis set.

The content of hafnium was monitored using the 282.022 nm and 339.980 nm lines and the content for zirconium using 339.198 nm line. The content of aluminium was monitored via the 167.079 nm line, when Al concentration in ICP sample was between 0-10 ppm (calibrated only to 100 ppm) and via the 396.152 nm line for Al concentrations above 10 ppm.

The reported values are an average of three successive aliquots taken from the same sample and are related back to the original catalyst by inputting the original mass of sample and the dilution volume into the software.

In the case of analysing the elemental composition of off-line prepolymerised catalysts, the polymeric portion is digested by ashing in such a way that the elements can be freely dissolved by the acids. The total content is calculated to correspond to the weight-% for the prepolymerised catalyst. In the examples as disclosed below no off-line prepolymerisation step was used.

DSC Analysis for Propylene Homopolymerisation Examples

Melting temperature $T_m$ was measured on approx. 5 mg samples with a Mettler-Toledo 822e differential scanning calorimeter (DSC), according to ISO11357-3 in a heat/cool/heat cycle with a scan rate of 10° C./min in the temperature range of +23 to +225° C. under a nitrogen flow rate of 50 ml $min^{-1}$. Melting temperature was taken as the endotherm peak, respectively in the second heating step. Calibration of the instrument was performed with $H_2O$, Lead, Tin, Indium, according to ISO 11357-1.

DSC Analysis, Main Melting Temperature ($T_m$), Heat of Melting ($H_m$), and Crystallization Temperature ($T_c$) for Heterophasic Propylene Copolymer Examples DSC analysis was measured with a Mettler TA Instrument Q2000 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C. Crystallization temperature (Tc) is determined from the cooling step, while main melting temperature (Tm) and heat of melting ($H_m$) are determined from the second heating step.

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The MFR is determined at 230° C. and may be determined at different loadings such as 2.16 kg ($MFR_2$) or 21.6 kg ($MFR_{21}$).

Intrinsic Viscosity

Intrinsic viscosity (iV) has been measured according to DIN ISO 1628/1, October 1999 (in Decalin at 135° C.).

Xylene Cold Soluble Fraction

The xylene cold solubles (XCS, wt %) were determined at 25° C. according to ISO 16152; 2005.

Crystex Analysis

Crystalline and Soluble Fractions Method

The crystalline (CF) and soluble fractions (SF) of the polypropylene (PP) compositions as well as the comonomer content and intrinsic viscosities of the respective fractions were analyzed by the CRYSTEX QC, Polymer Char (Valencia, Spain).

The crystalline and amorphous fractions are separated through temperature cycles of dissolution at 160° C., crystallization at 40° C. and re-dissolution in 1,2,4-trichlorobenzene (1,2,4-TCB) at 160° C. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the Ethylene content in Ethylene-Propylene copolymers. IR4 detector is calibrated with series of 8 EP copolymers with known Ethylene content in the range of 2 wt % to 69 wt % (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO 16152. XS calibration is achieved by testing various EP copolymers with XS content in the range 2-31 wt %.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

A defined volume of the sample solution is injected into the column filled with inert support where the crystallization of the sample and separation of the soluble fraction from the crystalline part is taking place. This process is repeated two times. During the first injection the whole sample is measured at high temperature, determining the IV[dl/g] and the C2[wt %] of the PP composition. During the second injection the soluble fraction (at low temperature) and the crystalline fraction (at high temperature) with the crystallization cycle are measured (Wt % SF, Wt % C2, IV). (EP means ethylene propylene copolymer. PP means polypropylene.)

The Crystex test is further described in WO2019/002345. We cross reference FIGS. 1a and b thereof.

Flexural Modulus

Flexural Modulus is determined according to ISO 178 at 23° C. on injection moulded test specimens as described in EN ISO 1873-2 (80×10×4 mm).

Charpy Notched Impact

Charpy notched impact strength (NIS) was determined according to ISO 179/1 eA at injection moulded test specimens as described in EN ISO 1873-2 (80×10×4 mm).

Dynamic Mechanical Thermal Analysis (DMTA)

Dynamic mechanical, thermal analysis (DMTA) were done according to ISO 6721-7. The measurements are done in torsion mode on compression moulded samples (40×10×1 mm$^3$) between −130° C. and +150° C. with, a heating rate of 2° C./min and a frequency of 1 Hz. The storage modulus at 23° C. (G') and glass transition temperature of EPR phase (tg1) and matrix (Tg2) are reported.

Examples

Metallocene Synthesis
Reagents 2,6-Dimethylaniline (Acros), 1-bromo-3,5-dimethylbenzene (Acros), 1-bromo-3,5-di-tert-butylbenzene (Acros), bis (2,6-diisopropylphenyl)imidazolium chloride (Aldrich), triphenylphosphine (Acros), NiCl$_2$(DME) (Aldrich), dichlorodimethylsilane (Merck), ZrCl$_4$ (Merck), HfCl$_4$, <1% Zr (Strem Chemicals), trimethylborate (Acros), Pd(OAc)$_2$ (Aldrich), NaBH$_4$ (Acros), 2.5 M nBuLi in hexanes (Chemetal), CuCN (Merck), magnesium turnings (Acros), silica gel 60, 40-63 μm (Merck), bromine (Merck), 96% sulfuric acid (Reachim), sodium nitrite (Merck), copper powder (Alfa), potassium hydroxide (Merck), K$_2$CO$_3$ (Merck), 12 M HCl (Reachim), TsOH (Aldrich), MgSO$_4$ (Merck), Na$_2$CO$_3$ (Merck), Na$_2$SO$_4$ (Akzo Nobel), methanol (Merck), diethyl ether (Merck), 1,2-dimethoxyethane (DME, Aldrich), 95% ethanol (Merck), dichloromethane (Merck), hexane (Merck), THF (Merck), and toluene (Merck) were used as received. Hexane, toluene and dichloromethane for organometallic synthesis were dried over molecular sieves 4 A (Merck). Diethyl ether, THF, and 1,2-dimethoxyethane for organometallic synthesis were distilled over sodium benzophenoneketyl. CDCl$_3$ (Deutero GmbH) and CD$_2$Cl$_2$ (Deutero GmbH) were dried over molecular sieves 4 A. 4-Bromo-6-tert-butyl-5-methoxy-2-methylindan-1-one was obtained as described in WO2013/007650.

Synthesis of MC CE1 (Comparative)

4-(4-tert-Butylphenyl)-1-methoxy-2-methyl-1,2,3,5,6,7-hexahydro-s-indacene

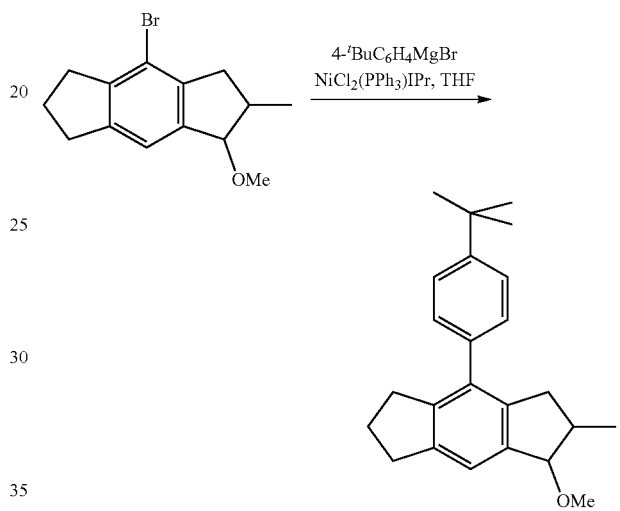

The precursor 4-bromo-1-methoxy-2-methyl-1,2,3,5,6,7-hexahydro-s-indacene was made according to the procedure described in WO2015/158790 A2 (pp 26-29).

To a mixture of 1.5 g (1.92 mmol, 0.6 mol. %) of NiCl$_2$(PPh$_3$)IPr and 89.5 g (318.3 mmol) of 4-bromo-1-methoxy-2-methyl-1,2,3,5,6,7-hexahydro-s-indacene, 500 ml (500 mmol, 1.57 equiv) of 1.0 M 4-tert-butyl phenyl magnesium bromide in THF was added. The resulting solution was refluxed for 3 h, then cooled to room temperature, and 1000 ml of 0.5 M HCl was added. Further on, this mixture was extracted with 1000 ml of dichloromethane, the organic layer was separated, and the aqueous layer was extracted with 250 ml of dichloromethane. The combined organic extract was evaporated to dryness to give a greenish oil. The title product was isolated by flash-chromatography on silica gel 60 (40-63 μm; eluent: hexanes-dichloromethane=3:1, vol., then 1:3, vol.). This procedure gave 107 g (ca. 100%) of 1-methoxy-2-methyl-4-(4-tert-butylphenyl)-1,2,3,5,6,7-hexahydro-s-indacene as a white solid mass.

Anal. calc. for C$_{24}$H$_{30}$O: C, 86.18; H, 9.04. Found: C, 85.99; H, 9.18.

$^1$H NMR (CDCl$_3$), syn-isomer: δ 7.42-7.37 (m, 2H), 7.25-7.20 (m, 3H), 4.48 (d, J=5.5 Hz, 1H), 3.44 (s, 3H), 2.99-2.47 (m, 7H), 2.09-1.94 (m, 2H), 1.35 (s, 9H), 1.07 (d, J=6.9 Hz, 3H); Anti-isomer: δ 7.42-7.37 (m, 2H), 7.25-7.19 (m, 3H), 4.39 (d, J=3.9 Hz, 1H), 3.49 (s, 3H), 3.09 (dd, J=15.9 Hz, J=7.5 Hz, 1H), 2.94 (t, J=7.3 Hz, 2H), 2.78 (tm, J=7.3 Hz, 2H), 2.51-2.39 (m, 1H), 2.29 (dd, J=15.9 Hz, J=5.0 Hz, 1H), 2.01 (quin, J=7.3 Hz, 2H), 1.36 (s, 9H), 1.11 (d, J=7.1 Hz, 3H). $^{13}$C{$^1$H} NMR(CDCl$_3$), syn-isomer: δ

149.31, 142.71, 142.58, 141.46, 140.03, 136.71, 135.07, 128.55, 124.77, 120.02, 86.23, 56.74, 39.41, 37.65, 34.49, 33.06, 32.45, 31.38, 25.95, 13.68; Anti-isomer: δ 149.34, 143.21, 142.90, 140.86, 139.31, 136.69, 135.11, 128.49, 124.82, 119.98, 91.53, 56.50, 40.12, 37.76, 34.50, 33.04, 32.40, 31.38, 25.97, 19.35.

4-(4-tert-Butylphenyl)-6-methyl-1,2,3,5-tetrahydro-s-indacene

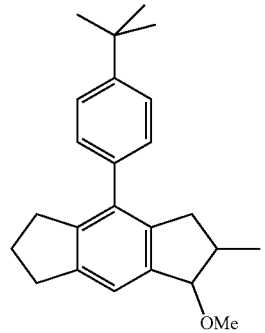

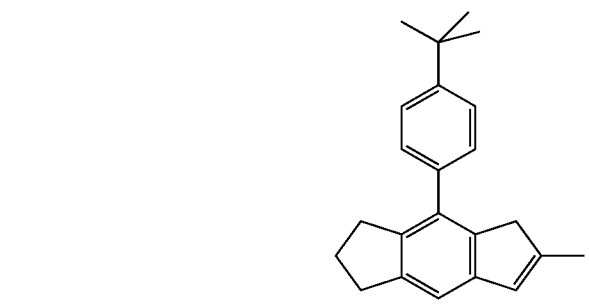

To a solution of 107 g 1-methoxy-2-methyl-4-(4-tert-butylphenyl)-1,2,3,5,6,7-hexahydro-s-indacene (prepared above) in 700 ml of toluene, 600 mg of TsOH was added, and the resulting solution was refluxed using Dean-Stark head for 10 min. After cooling to room temperature the reaction mixture was washed with 200 ml of 10% NaHCO₃. The organic layer was separated, and the aqueous layer was additionally extracted with 2×100 ml of dichloromethane. The combined organic extract was evaporated to dryness to give a red oil. The product was purified by flash-chromatography on silica gel 60 (40-63 μm; eluent: hexanes, then hexanes-dichloromethane=5:1, vol.) followed by vacuum distillation, b.p. 210-216° C./5-6 mm Hg. This procedure gave 77.1 g (80%) of 4-(4-tert-butylphenyl)-6-methyl-1,2,3,5-tetrahydro-s-indacene as a yellowish glassy material.

Anal. calc. for $C_{23}H_{26}$: C, 91.34; H, 8.66. Found: C, 91.47; H, 8.50.

¹H NMR (CDCl₃): δ 7.44-7.37 (m, 2H), 7.33-7.26 (m, 2H), 7.10 (s, 1H), 6.45 (br.s, 1H), 3.17 (s, 2H), 2.95 (t, J=7.3 Hz, 2H), 2.78 (t, J=7.3 Hz, 2H), 2.07 (s, 3H), 2.02 (quin, J=7.3 Hz, 2H), 1.37 (s, 9H). ¹³C{¹H} NMR (CDCl₃): δ 149.37, 145.54, 144.79, 142.91, 139.92, 138.05, 137.15, 134.06, 128.36, 127.02, 124.96, 114.84, 42.11, 34.53, 33.25, 32.16, 31.41, 25.96, 16.77.

2-methyl-[4-(4-tert-butylphenyl)-1,5,6,7-tetrahydro-s-indacen-1-yl](chloro)dimethylsilane

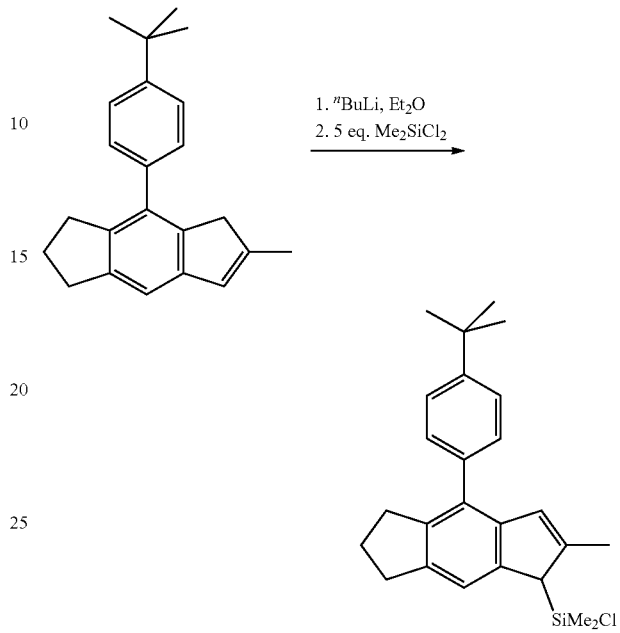

To a solution of 22.3 g (73.73 mmol) of 4-(4-tert-butyl phenyl)-6-methyl-1,2,3,5-tetrahydro-s-indacene in 300 ml of ether, cooled to −50° C., 30.4 ml (73.87 mmol) of 2.43 M ⁿBuLi in hexanes was added in one portion. The resulting mixture was stirred overnight at room temperature, then the resulting suspension with a large amount of precipitate was cooled to −78° C. (wherein the precipitate was substantially dissolved to form an orange solution), and 47.6 g (369 mmol, 5 equiv.) of dichlorodimethylsilane was added in one portion. The obtained solution was stirred overnight at room temperature and then filtered through a glass frit (G4). The filtrate was evaporated to dryness to give 28.49 g (98%) of 2-methyl-[4-(4-tert-butylphenyl)-1,5,6,7-tetrahydro-s-indacen-1-yl](chloro) dimethylsilane as a colorless glass which was used without further purification.

¹H NMR (CDCl₃): δ 7.50-7.45 (m, 2H), 7.36 (s, 1H), 7.35-7.32 (m, 2H), 6.60 (s, 1H), 3.60 (s, 1H), 3.10-2.82 (m, 4H), 2.24 (s, 3H), 2.08 (quin, J=7.3 Hz, 2H), 1.42 (s, 9H), 0.48 (s, 3H), 0.22 (s, 3H). ¹³C{¹H} NMR (CDCl₃): δ 149.27, 144.41, 142.15, 141.41, 139.94, 139.83, 136.85, 130.19, 129.07, 126.88, 124.86, 118.67, 49.76, 34.55, 33.27, 32.32, 31.44, 26.00, 17.6

2-methyl-4-(4-tert-butylphenyl)-5-methoxy-6-tert-butyl-indan-1-one

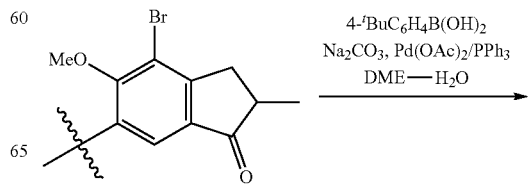

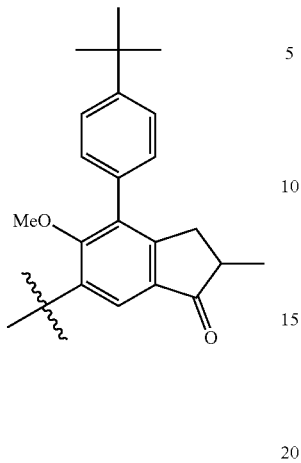

A mixture of 31.1 g (100 mmol) of 2-methyl-4-bromo-5-methoxy-6-tert-butyl-indan-1-one, 25.0 g (140 mmol) of 4-tert-butylphenylboronic acid, 29.4 g (280 mmol) of $Na_2CO_3$, 1.35 g (6.00 mmol, 6 mol. %) of $Pd(OAc)_2$, and 3.15 g (12.0 mmol, 12 mol. %) of $PPh_3$ in 130 ml of water and 380 ml of DME was refluxed for 6 h in argon atmosphere. The formed mixture was evaporated to dryness. To the residue 500 ml of dichloromethane and 500 ml of water were added. The organic layer was separated, the aqueous layer was additionally extracted with 100 ml of dichloromethane. The combined organic extract was dried over $Na_2SO_4$, evaporated to dryness, and the crude product was isolated using flash chromatography on silica gel 60 (40-63 μm; eluent: hexanes-dichloromethane=2:1, vol.). This crude product was recrystallized from n-hexane to give 29.1 g (81%) of a white solid.

Anal. calc. for $C_{25}H_{32}O_2$: C, 82.37; H, 8.85. Found: C, 82.26; H, 8.81.

$^1$H NMR (CDCl$_3$): δ 7.74 (s, 1H, 7-H in indenyl), 7.48 (d, J=8.0 Hz, 2H, 2,6-H in C$_6$H$_4$$^t$Bu), 7.33 (d, J=8.0 Hz, 2H, 3,5-H in C$_6$H$_4$$^t$Bu), 3.27 (s, 3H, OMe), 3.15 (dd, J=17.3 Hz, J=7.7 Hz, 1H, 3-H in indan-1-on), 2.67-2.59 (m, 1H, 2-H in indan-1-on), 2.48 (dd, J=17.3 Hz, J=3.7 Hz, 3'-H in indan-1-on), 1.42 (s, 9H, feu in C$_6$H$_4$$^t$Bu), 1.38 (s, 9H, 6-feu in indan-1-on), 1.25 (d, J=7.3 Hz, 3H, 2-Me in indan-1-one).

2-methyl-5-tert-butyl-6-methoxy-7-(4-tert-butylphenyl)-1H-indene

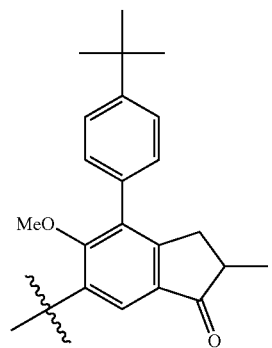

1. NaBH$_4$, THF—MeOH
2. TsOH, toluene
→

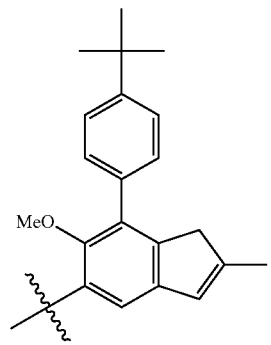

To a solution of 28.9 g (79.2 mmol) of 2-methyl-4-(4-tert-butylphenyl)-5-methoxy-6-tert-butyl-indan-1-one in 400 ml of THF cooled to 5° C. 5.00 g (132 mmol) of NaBH$_4$ was added. Further on, 100 ml of methanol was added dropwise to this mixture by vigorous stirring for ca. 7 h at 5° C. The resulting mixture was evaporated to dryness, and the residue wad partitioned between 500 ml of dichloromethane and 1000 ml of 0.5 M HCl. The organic layer was separated, the aqueous layer was additionally extracted with 100 ml of dichloromethane. The combined organic extract was evaporated to dryness to give a colorless oil. To a solution of this oil in 500 ml of toluene 1.0 g of TsOH was added. The formed mixture was refluxed with Dean-Stark head for 15 min and then cooled to room temperature using water bath. The resulting reddish solution was washed by 10% aqueous Na$_2$CO$_3$, the organic layer was separated, the aqueous layer was extracted with 2×100 ml of dichloromethane. The combined organic extract was dried over K$_2$CO$_3$ and then passed through short pad of silica gel 60 (40-63 μm). The silica gel pad was additionally washed with 50 ml of dichloromethane. The combined organic elute was evaporated to dryness to give a yellowish crystalline mass. The product was isolated by re-crystallization of this mass from 150 ml of hot n-hexane. Crystals precipitated at 5° C. were collected dried in vacuum. This procedure gave 23.8 g of white macrocrystalline 2-methyl-5-tert-butyl-6-methoxy-7-(4-tert-butylphenyl)-1H-indene. The mother liquor was evaporated to dryness and the residue was recrystallized from 20 ml of hot n-hexane in the same way. This procedure gave additional 2.28 g of the product. Thus, the total yield of the title product was 26.1 g (95%).

Anal. calc, for $C_{25}H_{32}O$: C, 86.15; H, 9.25. Found: C, 86.24; H, 9.40.

$^1$H NMR (CDCl$_3$): δ 7.44 (d, J=8.5 Hz, 2H, 2,6-H in C$_6$H$_4$$^t$Bu), 7.40 (d, J=8.5 Hz, 2H, 3,5-H in C$_6$H/BU), 7.21 (s, 1H, 4-H in indenyl), 6.43 (m, 1H, 3-H in indenyl), 3.20 (s, 3H, OMe), 3.15 (s, 2H, 1-H in indenyl), 2.05 (s, 3H, 2-Me in indenyl), 1.43 (s, 9H, 5-$^t$Bu in indenyl), 1.37 (s, 9H, $^t$Bu in C$_6$H$_4$$^t$Bu).

[2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

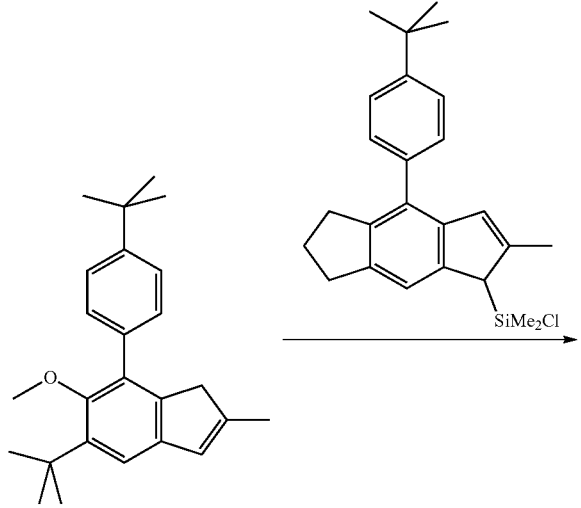

To a solution of 8.38 g (24.04 mmol) of 2-methyl-5-tert-butyl-7-(4-tert-butylphenyl)-6-methoxy-1H-indene in 150 ml of ether 9.9 ml (24.06 mmol) of 2.43 M $^n$BuLi in hexanes was added in one portion at −50° C. This mixture was stirred overnight at room temperature, then the resulting yellow solution with yellow precipitate was cooled to −50° C., and 150 mg of CuCN was added. The obtained mixture was stirred for 0.5 h at −25° C., then a solution of 9.5 g (24.05 mmol) of 2-methyl-[4-(4-tert-butylphenyl)-1,5,6,7-tetrahydro-s-indacen-1-yl](chloro)dimethylsilane in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure, and the residue was dried in vacuum at elevated temperature. This procedure gave 17.2 g (ca. 100%) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (ca. 95% purity by NMR spectroscopy, approx. 1:1 mixture of stereoisomers) as yellowish glassy solid which was used in the next step without additional purification.

$^1$H NMR (CDCl$_3$): δ 7.50 (s, 0.5H), 7.48-7.41 (m, 6H), 7.37-7.33 (m, 2.5H), 7.26 (s, 0.5H), 7.22 (s, 0.5H), 6.57 and 6.50 (2s, sum 2H), 3.71, 3.69, 3.67 and 3.65 (4s, sum 2H), 3.23 and 3.22 (2s, sum 3H), 3.03-2.80 (m, 4H), 2.20, 2.16 and 2.14 (3s, sum 6H), 2.08-1.99 (m, 2H), 1.43 and 1.41 (2s, sum 9H), 1.39 (s, 18H), −0.19, −0.20, −0.21 and −0.23 (4s, sum 6H). $^{13}$C{$^1$H} NMR (CDCl$_3$): δ 155.49, 155.46, 149.41, 149.14, 149.11, 147.48, 147.44, 146.01, 145.77, 143.95, 143.91, 143.76, 143.71, 142.14, 142.10, 139.52, 139.42, 139.34, 139.29, 139.20, 139.16, 137.10, 137.05, 137.03, 135.20, 130.05, 130.03, 129.73, 129.11, 127.25, 127.22, 126.20, 126.13, 125.98, 125.94, 125.05, 124.82, 120.59, 120.52, 118.51, 118.26, 60.51, 60.48, 47.31, 46.89, 46.72, 35.14, 34.55, 33.34, 33.28, 32.30, 31.47, 31.45, 31.24, 31.19, 26.02, 25.99, 17.95, 17.86.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride

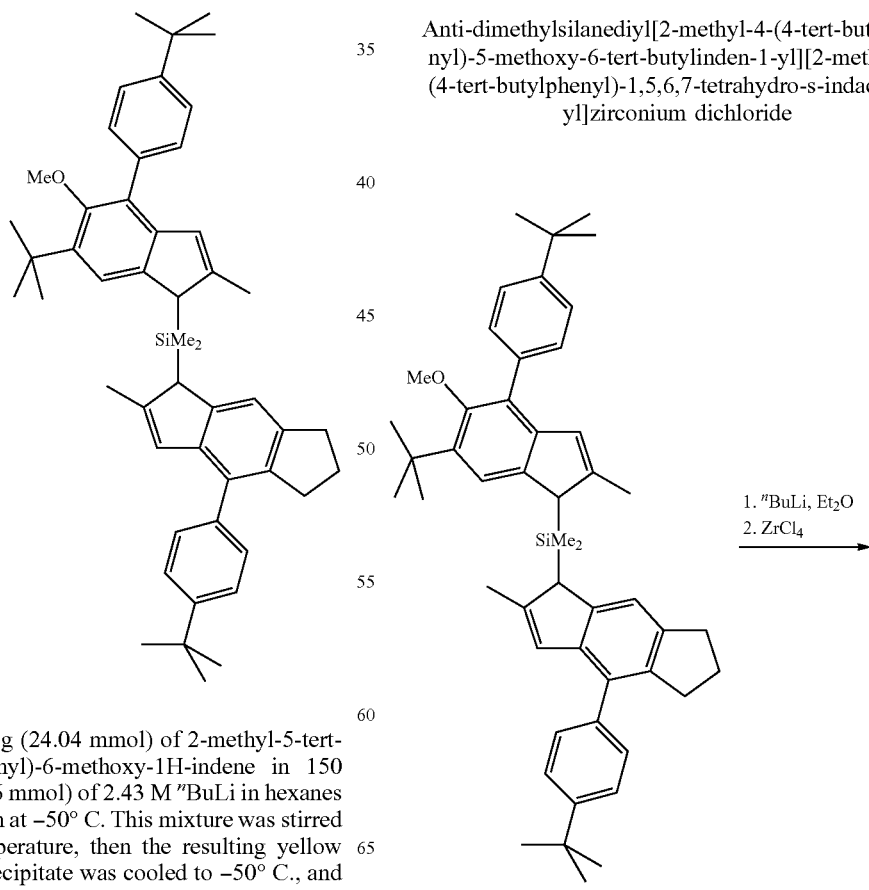

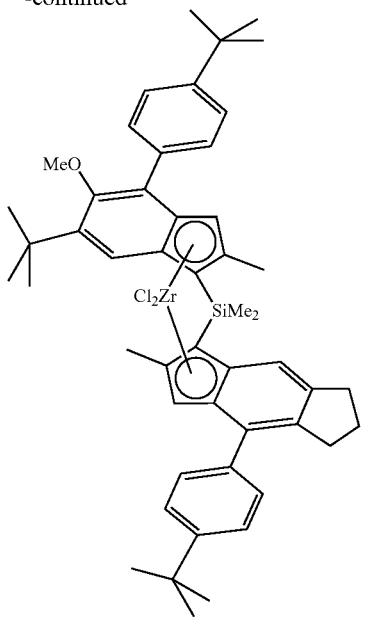

To a solution of 17.2 g (ca. 24.04 mol) of [2-methyl-4-(4-tert-butylphenyl)-5-methoxy-6-tert-butyl-1H-inden-1-yl][2-methyl-4-(4-tert-butyl phenyl)-1,5,6,7-tetrahydro-s-indacen-1-yl]dimethylsilane (prepared above) in 250 ml of ether, cooled to −50° C., 19.8 ml (48.11 mmol) of 2.43 M ″BuLi in hexanes was added in one portion. This mixture was stirred for 4 h at room temperature, then the resulting cherry-red solution was cooled to −60° C., and 5.7 g (24.46 mmol) of $ZrCl_4$ was added. The reaction mixture was stirred for 24 h at room temperature to give red solution with orange precipitate. This mixture was evaporated to dryness. The residue was heated with 200 ml of toluene, and the formed suspension was filtered through glass frit (G4). The filtrate was evaporated to 90 ml. Yellow powder precipitated from this solution overnight at room temperature was collected, washed with 10 ml of cold toluene, and dried in vacuum. This procedure gave 4.6 g (22%) of a ca. 4 to 1 mixture of anti- and syn-zirconocenes. The mother liquor was evaporated to ca. 40 ml, and 20 ml of n-hexane was added. Orange powder precipitated from this solution overnight at room temperature was collected and dried in vacuum. This procedure gave 6.2 g (30%) of a ca. 1 to 1 mixture of anti- and syn-zirconocenes. Thus, the total yield of anti- and syn-zirconocenes isolated in this synthesis was 10.8 g (52%). Pure anti-zirconocene was obtained after crystallization of the above-described 4.6 g sample of a ca. 4 to 1 mixture of anti- and syn-zirconocenes from 20 ml of toluene. This procedure gave 1.2 g of pure anti-zirconocene.

Anti-dimethylsilanediyl[2-methyl-4-(4-tert-butylphenyl)-5-methoxy-6-tert-butylinden-1-yl][2-methyl-4-(4-tert-butylphenyl)-1,5,6,7-tetrahydro-s-indacen-1-yl]zirconium dichloride:

Anal. calc, for $C_{50}H_{60}Cl_2OSiZr$: C, 69.25; H, 6.97. Found: C, 69.43; H, 7.15.

$^1$H NMR ($CDCl_3$): δ 7.59-7.38 (group of m, 10H), 6.74 (s, 1H), 6.61 (s, 1H), 3.37 (s, 3H), 3.08-2.90 (m, 3H), 2.86-2.78 (m, 1H), 2.20 (s, 3H), 2.19 (s, 3H), 2.10-1.92 (m, 2H), 1.38 (s, 9H), 1.33 (s, 18H), 1.30 (s, 3H), 1.29 (s, 3H). $^{13}C\{^1H\}$ NMR ($CDCl_3$): δ 159.94, 150.05, 149.86, 144.79, 144.01, 143.20, 135.50, 135.41, 133.87, 133.73, 133.62, 132.82, 132.29, 129.23, 128.74, 126.95, 126.87, 125.36, 125.12, 122.93, 121.68, 121.32, 120.84, 117.90, 81.65, 81.11, 62.57, 35.74, 34.58, 33.23, 32.17, 31.37, 31.36, 30.32, 26.60, 18.39, 18.30, 2.65, 2.57[1].

[1] Resonance originated from one carbon atom was not found because of overlapping with some other signal.

Synthesis of MC-CE2 (Comparative)

4-Bromo-2,6-dimethylaniline

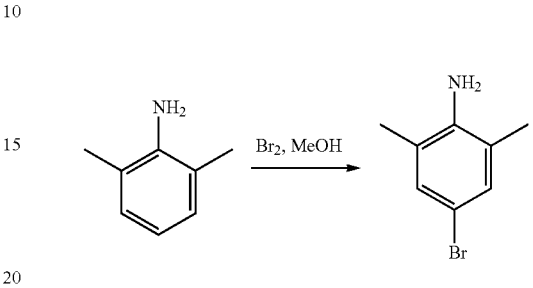

159.8 g (1.0 mol) of bromine was slowly (over 2 h) added to a stirred solution of 121.2 g (1.0 mol) of 2,6-dimethylaniline in 500 ml of methanol. The resulting dark-red solution was stirred overnight at room temperature, then poured into a cold solution of 140 g (2.5 mol) of potassium hydroxide in 1100 ml of water.

The organic layer was separated, and the aqueous one was extracted with 500 ml of diethyl ether. The combined organic extract was washed with 1000 ml of water, dried over $K_2CO_3$, and evaporated in vacuum to give 202.1 g of 4-bromo-2,6-dimethylaniline (purity ca. 90%) as dark-red oil which crystallized upon standing at room temperature. This material was further used without additional purification.

$^1$H NMR ($CDCl_3$): δ 7.04 (s, 2H), 3.53 (br.s, 2H), 2.13 (s, 6H).

1-Bromo-3,5-dimethylbenzene

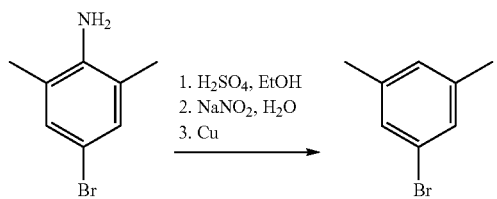

97 ml (1.82 mol) of 96% sulfuric acid was added dropwise to a solution of 134.7 g (ca. 673 mmol) of 4-bromo-2,6-dimethylaniline (prepared above, purity ca. 90%) in 1400 ml of 95% ethanol cooled to −10° C., at a such a rate to maintain the reaction temperature below 7° C. After the addition was complete, the solution was stirred at room temperature for 1 h. Then, the reaction mixture was cooled in an ice-bath, and a solution of 72.5 g (1.05 mol) of sodium nitrite in 150 ml of water was added dropwise over ca. 1 h. The formed solution was stirred at the same temperature for 30 min. Then the cooling bath was removed, and 18 g of copper powder was added. Upon completion of the rapid evolution of nitrogen additional portions (ca. 5 g each, ca. 50 g in total) of copper powder were added with 10 min intervals until gas evolution ceased completely. The reaction mixture was stirred at room temperature overnight, then filtered through a glass frit (G3), diluted with two-fold volume of water, and the crude product was extracted with 4×150 ml of dichloromethane. The combined extract was dried over K₂CO₃, evaporated to dryness, and then distilled in vacuum (b.p. 60-63° C./5 mm Hg) to give a yellowish liquid. This product was additionally purified by flash-chromatography on silica gel 60 (40-63 μm; eluent: hexane) and distilled once again (b.p. 51-52° C./3 mm Hg) to give 63.5 g (51%) of 1-bromo-3,5-dimethylbenzene as a colorless liquid.

¹H NMR (CDCl₃): δ 7.12 (s, 2H), 6.89 (s, 1H), 2.27 (s, 6H). ¹³C{¹H} NMR (CDCl₃): δ 139.81, 129.03, 128.61, 122.04, 20.99.

(3,5-Dimethylphenyl)boronic acid

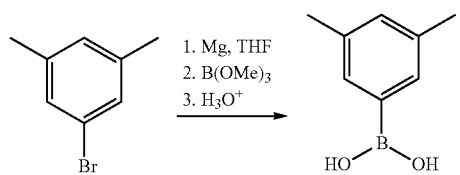

A solution of 3,5-dimethylphenylmagnesium bromide obtained from a solution of 190.3 g (1.03 mol) of 1-bromo-3,5-dimethylbenzene in 1000 ml of THF and 32 g (1.32 mol, 28% excess) of magnesium turnings was cooled to −78° C., and 104 g (1.0 mol) of trimethylborate was added in one portion. The resulting heterogeneous mixture was stirred overnight at room temperature. The boronic ester was hydrolyzed by careful addition of 1200 ml of 2 M HCl. 500 ml of diethyl ether was added, the organic layer was separated, and the aqueous layer was additionally extracted with 2×500 ml of diethyl ether. The combined organic extract was dried over Na₂SO₄ and then evaporated to dryness to give white mass. The latter was triturated with 200 ml of n-hexane, filtered through glass frit (G3), and the precipitate was dried in vacuo. This procedure gave 114.6 g (74%) of (3,5-dimethylphenyl)boronic acid.

Anal. calc. for C₈H₁₁BO₂: C, 64.06; H, 7.39. Found: C, 64.38; H, 7.72.

¹H NMR (DMSO-d₆): δ 7.38 (s, 2H), 7.00 (s, 1H), 3.44 (very br.s, 2H), 2.24 (s, 6H).

2-methyl-4-(3,5-dimethylphenyl)-5-methoxy-6-tert-butyl-indan-1-one

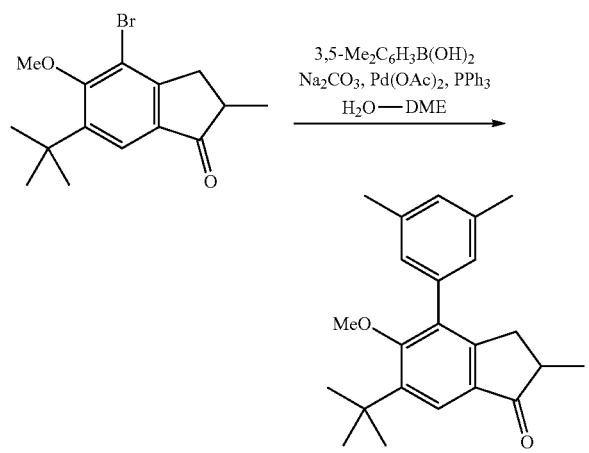

A mixture of 49.14 g (157.9 mmol) of 2-methyl-4-bromo-5-methoxy-6-tert-butylindan-1-one, 29.6 g (197.4 mmol, 1.25 eq.) of (3,5-dimethylphenyl)boronic acid, 45.2 g (427 mmol) of Na₂CO₃, 1.87 g (8.3 mmol, 5 mol. %) of Pd(OAc)₂, 4.36 g (16.6 mmol, 10 mol. %) of PPh₃, 200 ml of water, and 500 ml of 1,2-dimethoxyethane was refluxed for 6.5 h. DME was evaporated on a rotary evaporator, 600 ml of water and 700 ml of dichloromethane were added to the residue. The organic layer was separated, and the aqueous one was additionally extracted with 200 ml of dichloromethane. The combined extract was dried over K₂CO₃ and then evaporated to dryness to give a black oil. The crude product was purified by flash chromatography on silica gel 60 (40-63 μm, hexane-dichloromethane=1:1, vol., then, 1:3, vol.) to give 48.43 g (91%) of 2-methyl-4-(3,5-dimethylphenyl)-5-methoxy-6-tert-butylindan-1-one as a brownish oil.

Anal. calc. for C₂₃H₂₈O₂: C, 82.10; H, 8.39. Found: C, 82.39; H, 8.52.

¹H NMR (CDCl₃): δ 7.73 (s, 1H), 7.02 (s, 3H), 7.01 (s, 3H), 3.32 (s, 3H), 3.13 (dd, J=17.5 Hz, J=7.8 Hz, 1H), 2.68-2.57 (m, 1H), 2.44 (dd, J=17.5 Hz, J=3.9 Hz), 2.36 (s, 6H), 1.42 (s, 9H), 1.25 (d, J=7.5 Hz, 3H). ¹³C{¹H} NMR (CDCl₃): δ 208.90, 163.50, 152.90, 143.32, 138.08, 136.26, 132.68, 130.84, 129.08, 127.18, 121.30, 60.52, 42.17, 35.37, 34.34, 30.52, 21.38, 16.40.

2-methyl-5-tert-butyl-6-methoxy-7-(3,5-dimethylphenyl)-1H-indene

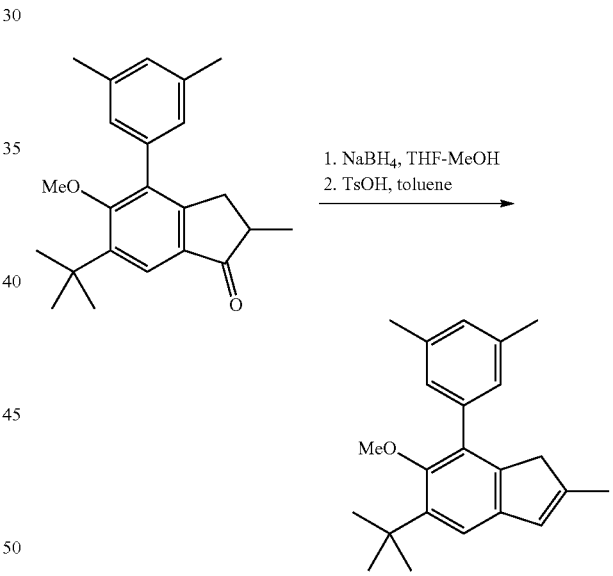

8.2 g (217 mmol) of NaBH₄ was added to a solution of 48.43 g (143.9 mmol) of 2-methyl-4-(3,5-dimethylphenyl)-5-methoxy-6-tert-butylindan-1-one in 300 ml of THF cooled to 5° C. Then, 150 ml of methanol was added dropwise to this mixture by vigorous stirring for ca. 7 h at 5° C. The resulting mixture was evaporated to dryness, and the residue was partitioned between 500 ml of dichloromethane and 500 ml of 2 M HCl. The organic layer was separated, the aqueous layer was additionally extracted with 100 ml of dichloromethane. The combined organic extract was evaporated to dryness to give a slightly yellowish oil. To a solution of this oil in 600 ml of toluene 400 mg of TsOH was added, this mixture was refluxed with Dean-Stark head for 10 min and then cooled to room temperature using a water bath. The formed solution was washed by 10% Na₂CO₃, the organic layer was separated, the aqueous layer was extracted with 150 ml of dichloromethane. The combined organic extract was dried over K$_2$CO$_3$ and then passed through a short layer of silica gel 60 (40-63 μm). The silica gel layer was additionally washed by 100 ml of dichloromethane. The combined organic elute was evaporated to dryness, and the resulting oil was dried in vacuum at elevated temperature. This procedure gave 45.34 g (98%) of 2-methyl-5-tert-butyl-6-methoxy-7-(3,5-dimethylphenyl)-1H-indene which was used without additional purification.

Anal. calc, for C$_{23}$H$_{28}$O: C, 86.20; H, 8.81. Found: C, 86.29; H, 9.07.

$^1$H NMR (CDCl$_3$): δ 7.20 (s, 1H), 7.08 (br.s, 1H), 6.98 (br.s, 1H), 6.42 (m, 1H), 3.25 (s, 3H), 3.11 (s, 2H), 2.36 (s, 6H), 2.06 (s, 3H), 1.43 (s, 9H). $^{13}$C{$^1$H} NMR (CDCl$_3$): δ 154.20, 145.22, 141.78, 140.82, 140.64, 138.30, 137.64, 131.80, 128.44, 127.18, 126.85, 116.98, 60.65, 42.80, 35.12, 31.01, 21.41, 16.65.

[2-methyl-4-(3,5-dimethylphenyl)-5-methoxy-6-tert-Butyl-1H-inden-1-yl](chloro)dimethylsilane

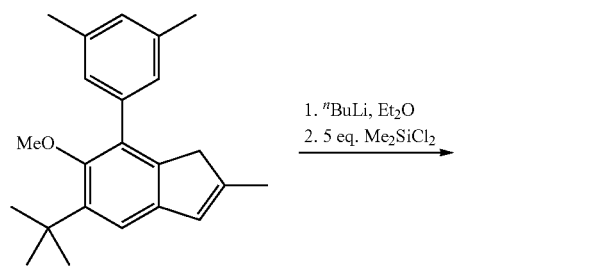

To a solution of 9.0 g (28.08 mmol) of 2-methyl-5-tert-butyl-6-methoxy-7-(3,5-di methyl phenyl)-1H-indene in 150 ml of ether, cooled to −50° C., 11.6 ml (28.19 mmol) of 2.43 M $^n$BuLi in hexanes was added in one portion. The resulting mixture was stirred for 6 h at room temperature, then the obtained yellow suspension was cooled to −60° C., and 18.1 g (140.3 mmol, 5 equiv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-Butyl-1H-inden-1-yl](chloro)dimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}$C{$^1$H} NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

1-methoxy-2-methyl-4-(3,5-Dimethylphenyl)-1,2,3,5,6,7-hexahydro-s-indacene

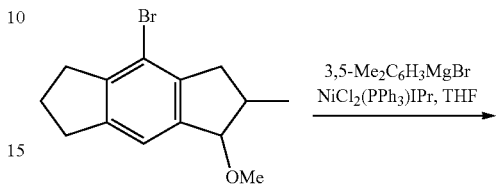

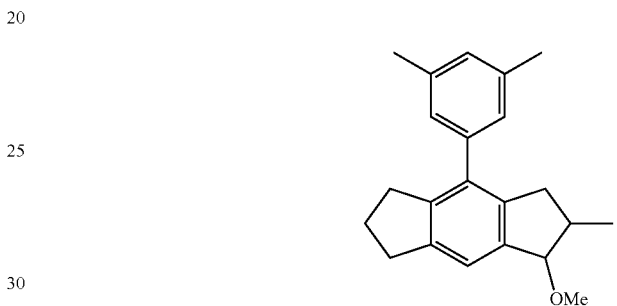

To a mixture of 2.0 g (2.56 mmol, 1.8 mol. %) of NiCl$_2$(PPh$_3$)IPr and 40.0 g (142.3 mmol) of 4-bromo-1-methoxy-2-methyl-1,2,3,5,6,7-hexahydro-s-indacene, 200 ml (200 mmol, 1.4 eq) of 3,5-dimethylphenylmagnesium bromide 1.0 M in THF was added. The resulting solution was refluxed for 3 h, then cooled to room temperature, and 400 ml of water followed by 500 ml of 1.0 M HCl solution were added. Further on, this mixture was extracted with 600 ml of dichloromethane, the organic layer was separated, and the aqueous layer was extracted with 2×100 ml of dichloromethane. The combined organic extract was evaporated to dryness to give a slightly greenish oil. The product was isolated by flash-chromatography on silica gel 60 (40-63 μm; eluent: hexanes-dichloromethane=2:1, vol., then 1:2, vol.). This procedure gave 43.02 g (99%) of 1-methoxy-2-methyl-4-(3,5-dimethylphenyl)-1,2,3,5,6,7-hexahydro-s-indacene as a colorless thick oil as a mixture of two diastereoisomers.

Anal. calc, for C$_{22}$H$_{26}$O: C, 86.23; H, 8.55. Found: C, 86.07; H, 8.82.

$^1$H NMR (CDCl$_3$), Syn-isomer: δ 7.21 (s, 1H), 6.94 (br.s, 1H), 6.90 (br.s, 2H), 4.48 (d, J=5.5 Hz, 1H), 3.43 (s, 3H), 2.94 (t, J=7.5 Hz, 2H), 2.87-2.65 (m, 3H), 2.63-2.48 (m, 2H), 2.33 (s, 6H), 2.02 (quin, J=7.5 Hz, 2H), 1.07 (d, J=6.7 Hz, 3H); Anti-isomer: δ 7.22 (s, 1H), 6.94 (br.s, 1H), 6.89 (br.s, 2H), 4.38 (d, J=4.0 Hz, 1H), 3.48 (s, 3H), 3.06 (dd, J=16.0 Hz, J=7.5 Hz, 1H), 2.93 (t, J=7.3 Hz, 2H), 2.75 (td, J=7.3 Hz, J=3.2 Hz, 2H), 2.51-2.40 (m, 1H), 2.34 (s, 6H), 2.25 (dd, J=16.0 Hz, J=5.0 Hz, 1H), 2.01 (quin, J=7.3 Hz, 2H), 1.11 (d, J=7.1 Hz, 3H). $^{13}$C{$^1$H} NMR (CDCl$_3$), Syn-isomer: δ 142.69, 142.49, 141.43, 139.97, 139.80, 137.40, 135.46, 128.34, 126.73, 120.09, 86.29, 56.76, 39.43, 37.59, 33.11, 32.37, 25.92, 21.41, 13.73; Anti-isomer: δ

143.11, 142.72, 140.76, 139.72, 139.16, 137.37, 135.43, 128.29, 126.60, 119.98, 91.53, 56.45, 40.06, 37.65, 33.03, 32.24, 25.88, 21.36, 19.36.

[2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane 4-(3,5-Dimethylphenyl)-6-methyl-1,2,3,5-tetrahydro-s-indacene

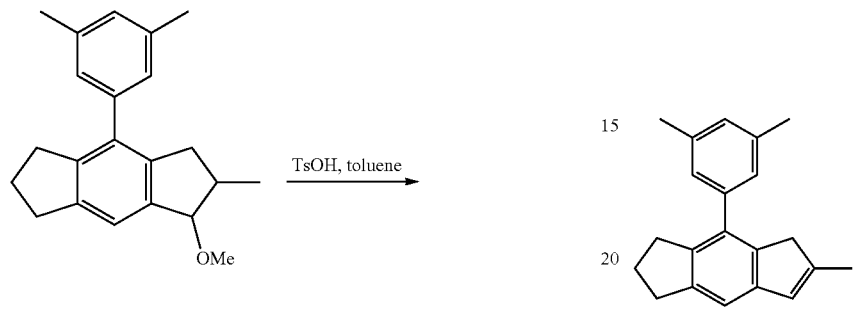

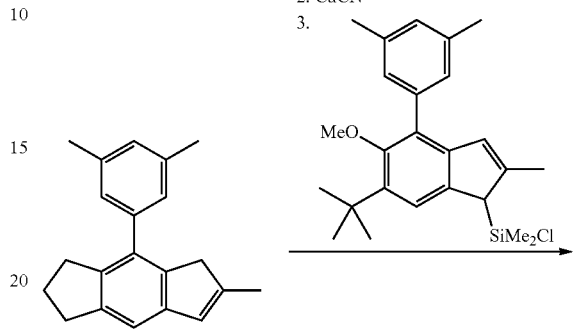

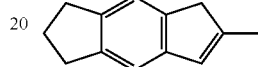

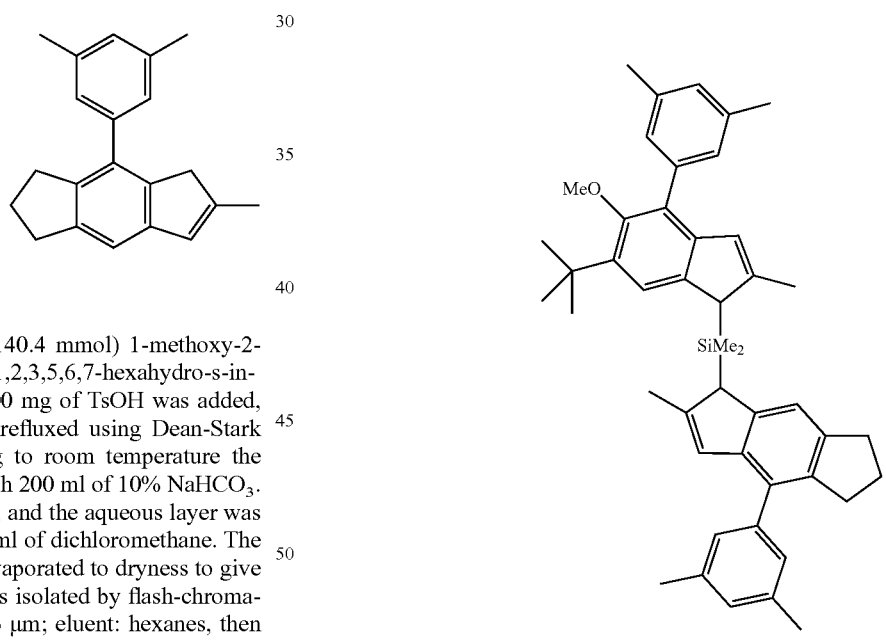

To the solution of 43.02 g (140.4 mmol) 1-methoxy-2-methyl-4-(3,5-dimethylphenyl)-1,2,3,5,6,7-hexahydro-s-indacene in 600 ml of toluene, 200 mg of TsOH was added, and the resulting solution was refluxed using Dean-Stark head for 15 min. After cooling to room temperature the reaction mixture was washed with 200 ml of 10% NaHCO$_3$. The organic layer was separated, and the aqueous layer was additionally extracted with 300 ml of dichloromethane. The combined organic extract was evaporated to dryness to give light orange oil. The product was isolated by flash-chromatography on silica gel 60 (40-63 µm; eluent: hexanes, then hexanes-dichloromethane=10:1, vol.). This procedure gave 35.66 g (93%) of 4-(3,5-dimethylphenyl)-6-methyl-1,2,3,5-tetrahydro-s-indacene as a slightly yellowish oil which spontaneously solidified to form a white mass.

Anal. calc. for $C_{21}H_{22}$: C, 91.92; H, 8.08. Found: C, 91.78; H, 8.25.

$^1$H NMR (CDCl$_3$): δ 7.09 (s, 1H), 6.98 (br.s, 2H), 6.96 (br.s, 1H), 6.44 (m, 1H), 3.14 (s, 2H), 2.95 (t, J=7.3 Hz, 2H), 2.76 (t, J=7.3 Hz, 2H), 2.35 (s, 6H), 2.07 (s, 3H), 2.02 (quin, J=7.3 Hz, 2H). $^{13}$C{$^1$H} NMR (CDCl$_3$): δ 145.46, 144.71, 142.81, 140.17, 139.80, 137.81, 137.50, 134.33, 128.35, 127.03, 126.48, 114.83, 42.00, 33.23, 32.00, 25.87, 21.38, 16.74.

To a solution of 7.71 g (28.1 mmol) of 4-(3,5-dimethylphenyl)-6-methyl-1,2,3,5-tetrahydro-s-indacene in a mixture of 150 ml of ether and 20 ml of THF 11.6 ml (28.19 mmol) of 2.43 M $^n$BuLi in hexanes was added in one portion at −50° C. This mixture was stirred for 6 h at room temperature, then the resulting orange solution was cooled to −50° C., and 150 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl](chloro)dimethylsilane (prepared above, ca.

28.08 mmol) in 150 ml of ether was added in one portion. This mixture was stirred overnight at room temperature, then filtered through a pad of silica gel 60 (40-63 μm), which was additionally washed by 2×50 ml of dichloromethane. The combined filtrate was evaporated under reduced pressure to give a yellow oil. The product was isolated by flash-chromatography on silica gel 60 (40-63 μm; eluent: hexanes-dichloromethane=10:1, vol., then 5:1, vol.). This procedure gave 11.95 g (65%) of [2-methyl-4-(3,5-dimethylphenyl)-5-methoxy-6-tert-Butyl-1H-inden-1-yl][2-methyl-4-(3,5-dimethylphenyl)-1,5,6,7-tetrahydro-s-indacen-1-yl]dimethylsilane (as ca. 1:1 mixture of stereoisomers) as a yellowish glassy solid.

Anal. calc. for $C_{46}H_{54}OSi$: C, 84.87; H, 8.36. Found: C, 85.12; H, 8.59.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}$C{$^1$H} NMR (CDCl$_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride

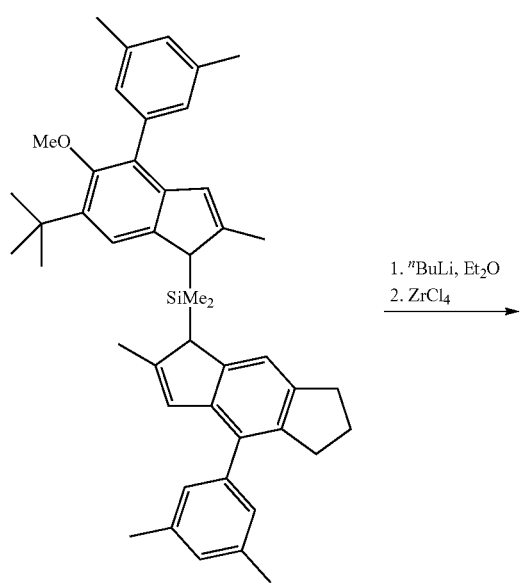

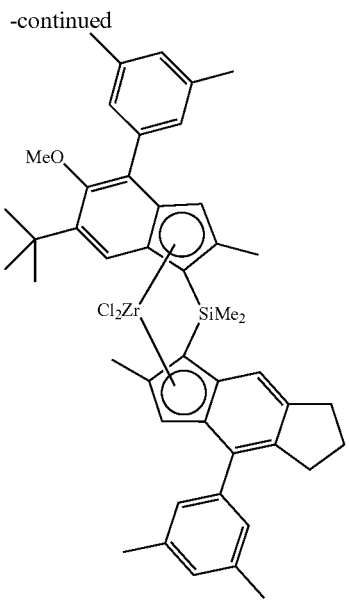

To a solution of 11.95 g (18.36 mol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 200 ml of ether, cooled to −50° C., 15.1 ml (35.7 mmol) of 2.43 M $^n$BuLi in hexanes was added in one portion. This mixture was stirred for 3 h at room temperature, then the resulting red solution was cooled to −78° C., and 4.28 g (18.37 mmol) of ZrCl$_4$ was added. The reaction mixture was stirred for 24 h at room temperature to give light red solution with orange precipitate. This mixture was evaporated to dryness. The residue was treated with 250 ml of hot toluene, and the formed suspension was filtered through glass frit (G4). The filtrate was evaporated to 40 ml. Red powder precipitated from this solution overnight at room temperature was collected, washed with 10 ml of cold toluene, and dried in vacuum. This procedure gave 0.6 g of syn-zirconocene. The mother liquor was evaporated to ca. 35 ml, and 15 ml of n-hexane was added to the warm solution. The red powder precipitated from this solution overnight at room temperature was collected and dried in vacuum. This procedure gave 3.49 g syn-zirconocene. The mother liquor was evaporated to ca. 20 ml, and 30 ml of n-hexane was added to the warm solution. The yellow powder precipitated from this solution overnight at room temperature was collected and dried in vacuum. This procedure gave 4.76 g anti-zirconocene as a solvate with toluene (×0.6 toluene) contaminated with ca. 2% of syn-isomer. Thus, the total yield of syn- and anti-zirconocenes isolated in this synthesis was 8.85 g (59%).

Anti-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride Anal. calc. for $C_{46}H_{52}Cl_2OSiZr×0.6C_7H_8$: C, 69.59; H, 6.61. Found: C, 69.74; H, 6.68.

$^1$H NMR (CDCl$_3$): δ 1.41 (s, 1H), 7.40 (s, 1H), 7.37-7.03 (m, 4H), 6.95 (s, 2H), 6.71 (s, 1H), 6.55 (s, 1H), 3.43 (s, 3H), 3.03-2.96 (m, 2H), 2.96-2.87 (m, 1H), 2.87-2.76 (m, 1H), 2.34 and 2.33 (2s, sum 12H), 2.19 and 2.18 (2s, sum 6H), 2.06-1.94 (m, 2H), 1.38 (s, 9H), 1.28 (s, 3H), 1.27 (s, 3H). $^{13}$C{$^1$H} NMR (CDCl$_3$): δ 159.73, 144.59, 143.99, 143.00, 138.26, 137.84, 137.59, 136.80, 135.35, 133.85, 133.63, 132.95, 132.52, 128.90, 128.80, 127.40, 126.95, 126.87, 126.65, 122.89, 121.61, 121.53, 120.82, 117.98, 81.77, 81.31, 62.62, 35.73, 33.20, 32.12, 30.37, 26.49, 21.47, 21.38, 18.40, 18.26, 2.64, 2.54.

Syn-dimethylsilanediyl[2-methyl-4-(3,5-dimethylphenyl)-5-methoxy-6-tert-butylinden-1-yl][2-methyl-4-(3,5-dimethylphenyl)-1,5,6,7-tetrahydro-s-indacen-1-yl]zirconium dichloride Anal. calc, for $C_{46}H_{52}Cl_2OSiZr$: C, 68.11; H, 6.46. Found: C, 68.37; H, 6.65.
$^1$H NMR (CDCl$_3$): δ 7.51 (s, 1H), 7.39 (s, 1H), 7.36-6.99 (m, 4H), 6.95 (s, 2H), 6.60 (s, 1H), 6.44 (s, 1H), 3.27 (s, 3H), 2.91-2.75 (m, 4H), 2.38 and 2.34 (2s, sum 18H), 1.99-1.87 (m, 1H), 1.87-1.74 (m, 1H), 1.42 (s, 3H), 1.36 (s, 9H), 1.19 (s, 3H). $^{13}$C{$^1$H} NMR (CDCl$_3$): δ 158.74, 143.41, 142.84, 142.31, 138.30, 137.77, 137.55, 136.85, 135.87, 135.73, 134.99, 134.75, 131.64, 128.83, 128.76, 127.97, 127.32, 126.82, 126.22, 123.91, 121.35, 121.02, 120.85, 118.56, 83.47, 83.08, 62.32, 35.53, 33.33, 31.96, 30.33, 26.53, 21.45 (two resonances), 18.56, 18.43, 2.93, 2.65.

Synthesis of metallocene MC-IE1 (Inventive) 2-methyl-[4-(4-tert-butylphenyl)-1,5,6,7-tetrahydro-s-indacen-1-yl]chlorodimethylsilane

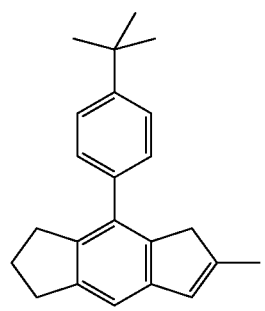

1. $^n$BuLi, Et$_2$O
2. 5 eq. Me$_2$SiCl$_2$

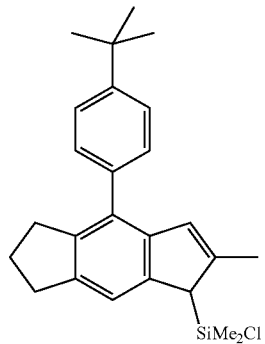

BuLi in hexanes (2.43 M, 30.4 ml, 73.87 mmol) was added in one portion to a solution of 22.3 g (73.73 mmol) of 4-(4-tert-butylphenyl)-6-methyl-1,2,3,5-tetrahydro-s-indacene in 300 ml of ether, cooled to −50° C. The resulting mixture was stirred overnight at room temperature, then the resulting suspension with a large amount of precipitate was cooled to −78° C. (wherein the precipitate was substantially dissolved to form an orange solution) and 47.6 g (369 mmol, 5 equiv.) of dichlorodimethylsilane was added in one portion. The obtained solution was stirred overnight at room temperature and then filtered through a glass frit (G4). The filtrate was evaporated to dryness to give 28.49 g (98%) of 2-methyl-[4-(4-tert-butylphenyl)-1,5,6,7-tetrahydro-s-indacen-1-yl]chlorodimethyl silane as a colorless glass which was used without further purification.
$^1$H NMR (CDCl$_3$): δ 7-50-7.45 (m, 2H), 7.36 (s, 1H), 7.35-7.32 (m, 2H), 6.60 (s, 1H), 3.60 (s, 1H), 3.10-2.82 (m, 4H), 2.24 (s, 3H), 2.08 (quin, J=7.3 Hz, 2H), 1.42 (s, 9H), 0.48 (s, 3H), 0.22 (s, 3H). $^{13}$C{$^1$H} NMR (CDCl$_3$): δ 149.27, 144.41, 142.15, 141.41, 139.94, 139.83, 136.85, 130.19, 129.07, 126.88, 124.86, 118.67, 49.76, 34.55, 33.27, 32.32, 31.44, 26.00, 17.6

[2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane

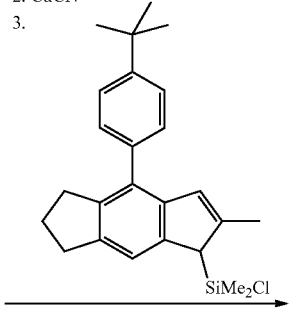

1. $^n$BuLi, Et$_2$O
2. CuCN
3.

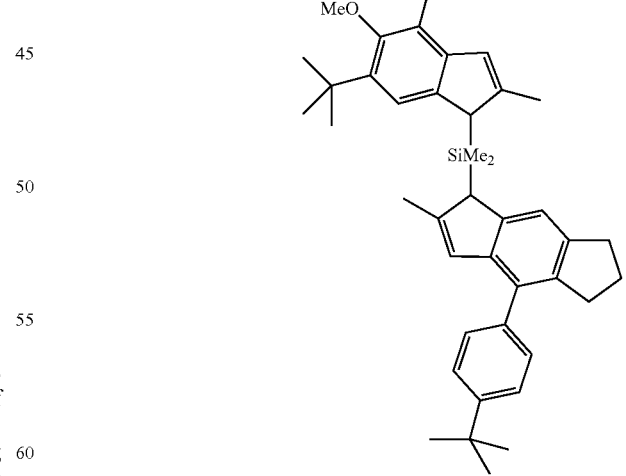

$^n$BuLi in hexanes (2.43 M, 9.6 ml, 23.33 mmol) was added in one portion to a solution of 8.12 g (23.3 mmol) of 2-methyl-5-tert-butyl-7-(4-tert-buty 1 phenyl)-6-methoxy-1H-indene in 150 ml of ether at −50° C. This mixture was stirred overnight at room temperature, then the resulting yellow suspension was cooled to −50° C., and 150 mg of CuCN was added. The obtained mixture was stirred for 0.5 h at −25° C., then a solution of 9.2 g (23.29 mmol) of [2-methyl-4-(4-tert-butylphenyl)-1,5,6,7-tetrahydro-s-indacen-1-yl]chlorodimethylsilane in a mixture of 100 ml of ether and ml of THF was added in one portion. This mixture was stirred overnight at room temperature, then filtered through a pad of silica gel 60 (40-63 μm). The precipitate was additionally washed with 2×50 ml of dichloromethane. The combined filtrate was evaporated under reduced pressure, and the residue was dried under vacuum at elevated temperature. This procedure gave 16.6 g (ca. 100%) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (ca. 95% purity by NMR, approx. 1:1 mixture of stereoisomers) as yellowish glass which was further used without an additional purification.

$^1$H NMR (CDCl$_3$): δ 7.50 (s, 0.5H), 7.48-7.41 (m, 6H), 7.37-7.33 (m, 2.5H), 7.26 (s, 0.5H), 7.22 (s, 0.5H), 6.57 and 6.50 (2s, sum 2H), 3.71, 3.69, 3.67 and 3.65 (4s, sum 2H), 3.23 and 3.22 (2s, sum 3H), 3.03-2.80 (m, 4H), 2.20, 2.16 and 2.14 (3s, sum 6H), 2.08-1.99 (m, 2H), 1.43 and 1.41 (2s, sum 9H), 1.39 (s, 18H), −0.19, −0.20, −0.21 and −0.23 (4s, sum 6H). $^{13}$C{$^1$H} NMR (CDCl$_3$): δ 155.49, 155.46, 149.41, 149.14, 149.11, 147.48, 147.44, 146.01, 145.77, 143.95, 143.91, 143.76, 143.71, 142.14, 142.10, 139.52, 139.42, 139.34, 139.29, 139.20, 139.16, 137.10, 137.05, 137.03, 135.20, 130.05, 130.03, 129.73, 129.11, 127.25, 127.22, 126.20, 126.13, 125.98, 125.94, 125.05, 124.82, 120.59, 120.52, 118.51, 118.26, 60.51, 60.48, 47.31, 46.89, 46.72, 35.14, 34.55, 33.34, 33.28, 32.30, 31.47, 31.45, 31.24, 31.19, 26.02, 25.99, 17.95, 17.86.

Anti-dimethylsilanediyl[2-methyl-4-(4-tert-butyl phenyl)-5-methoxy-6-tert-butyl-inden-1-yl][2-methyl-4-(4-tert-butylphenyl)-1,5,6,7-tetrahydro-s-indacen-1-yl]hafnium dichloride

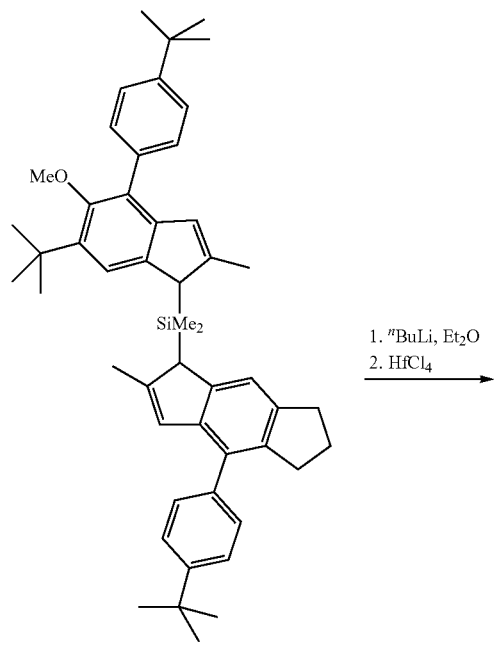

1. $^n$BuLi, Et$_2$O
2. HfCl$_4$

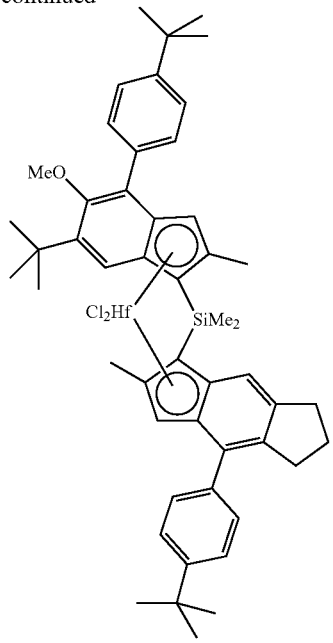

BuLi in hexanes (2.43 M, 19.2 ml, 46.7 mmol) was added in one portion to a solution of 16.6 g (23.3 mol) of [2-methyl-4-(4-tert-butylphenyl)-5-methoxy-6-tert-butyl-1H-inden-1-yl][2-methyl-4-(4-tert-butylphenyl)-1,5,6,7-tetrahydro-s-indacen-1-yl]dimethylsilane (prepared above) in 250 ml of ether, cooled to −50° C. This mixture was stirred overnight at room temperature, then the resulting cherry red solution was cooled to −60° C., and 7.46 g (23.29 mmol) of HfCl$_4$ was added. The reaction mixture was stirred for 24 h at room temperature to give an orange suspension. This suspension was filtered through glass frit (G4), and the precipitate was washed with 30 ml of ether. On the evidence of NMR spectroscopy, this precipitate was pure anti-hafnocene dichloride (and LiCl), while the filtrate included a mixture of syn- and anti-hafnocene dichlorides in a ca. 77/23 ratio (in favor to syn-) contaminated with some other impurities. The precipitate was dissolved in 100 ml of hot toluene, and the formed suspension was filtered from LiCl through glass frit (G4). The filtrate was evaporated to ca. 20 ml, and 40 ml of n-hexane was added. Yellow solid precipitated at room temperature was filtered off (G3), washed with 15 ml of cold n-hexane, and then dried in vacuum. This procedure gave 4.70 g (21%) of pure anti-complex. The mother liquor was evaporated to ca. 15 ml, and 40 ml of n-hexane was added. Yellow precipitate formed was filtered off (G3) and then dried under vacuum. This procedure gave 3.60 g (16%) of a ca. 4/1 mixture of syn- and anti-hafnocenes (in favor of syn-). Thus, the total yield of anti- and syn-hafnocenes isolated in this synthesis was 8.3 g (37%).

Anti-dimethylsilanediyl[2-methyl-4-(4-tert-butylphenyl)-5-methoxy-6-tert-butyl-inden-1-yl][2-methyl-4-(4-tert-butylphenyl)-1,5,6,7-tetrahydro-s-indacen-1-yl]hafnium dichloride Anal. calc. for C$_{50}$H$_{60}$Cl$_2$HfOSi: C, 62.92; H, 6.34. Found: C, 63.11; H, 6.58.

$^1$H NMR (CDCl$_3$): δ 7.59-7.36 (m, 10H), 6.65 (s, 1H), 6.52 (s, 1H), 3.35 (s, 3H), 3.15-2.91 (m, 3H), 2.91-2.79 (m, 1H), 2.27 (s, 6H), 2.10-1.88 (m, 2H), 1.38 (s, 9H), 1.33 (s,

18H), 1.28 (2s, 6H). $^{13}C\{^1H\}$ NMR (CDCl$_3$): δ 159.75, 150.01, 149.82, 144.36, 143.58, 143.04, 135.53, 133.86, 133.07, 132.80, 132.26, 131.87, 131.20, 129.23, 128.74, 126.52, 125.34, 125.10, 121.31, 120.85, 119.82, 119.47, 117.81, 82.78, 82.20, 62.56, 35.68, 34.58, 33.13, 32.12, 31.37, 30.36, 26.67, 18.26, 18.15, 2.63, 2.55.

Synthesis of metallocene MC-IE2 (Inventive)

[2-methyl-4-(3,5-dimethylphenyl)-5-methoxy-6-tert-butyl-1H-inden-1-yl]chlorodimethylsilane

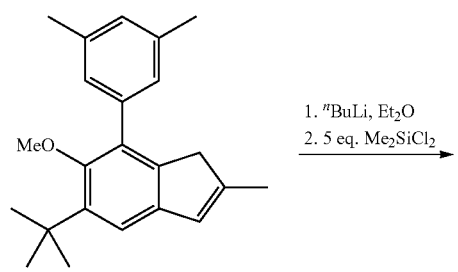

[2-methyl-4-(3,5-dimethylphenyl)-5-methoxy-6-tert-butyl-inden-1-yl][2-methyl-4-(3,5-dimethylphenyl)-1,5,6,7-tetrahydro-s-indacen-1-yl]dimethylsilane

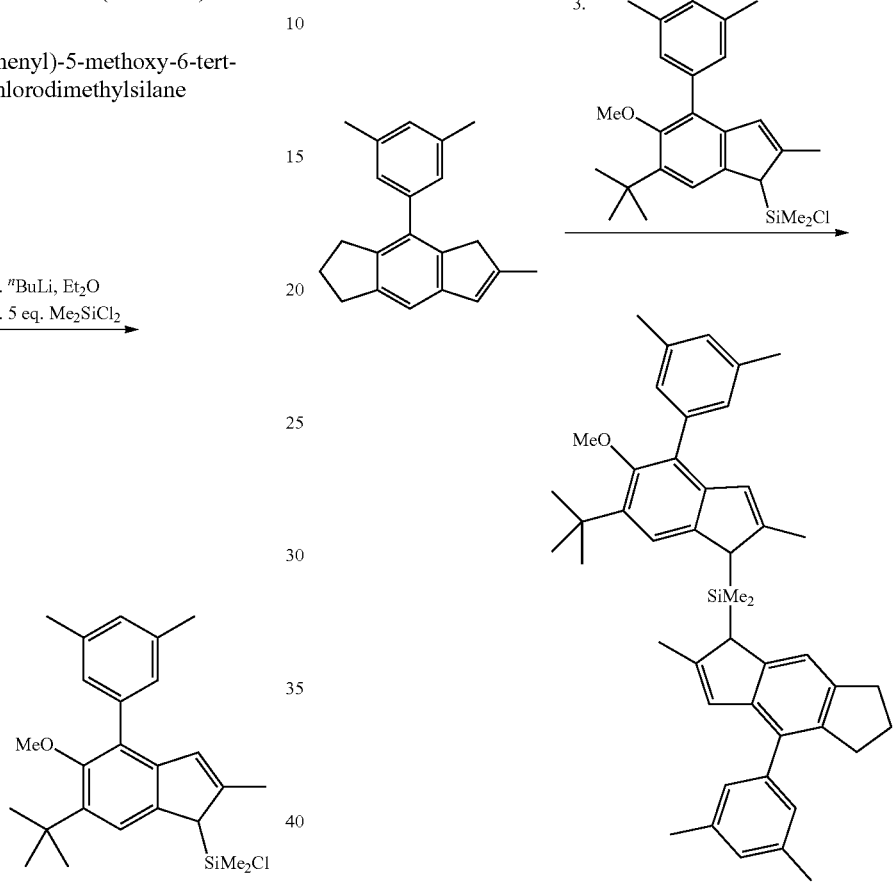

$^n$BuLi in hexanes (2.43 M, 25.2 ml, 61.24 mmol) was added in one portion to a solution of 19.66 g (61.35 mmol) of 2-methyl-5-tert-butyl-6-methoxy-7-(3,5-dimethylphenyl)-1H-indene in 300 ml of ether cooled to −50° C. The resulting mixture was stirred for 4 h at room temperature, then the resulting yellow suspension was cooled to −60° C., and 40.0 ml (42.8 g, 331.6 mmol, 5.4 eqv.) of dichlorodimethylsilane was added in one portion. The obtained solution was stirred overnight at room temperature and then filtered through a glass frit (G3). The filtrate was evaporated to dryness to give [2-methyl-4-(3,5-dimethylphenyl)-5-methoxy-6-tert-butyl-1H-inden-1-yl]chlorodimethylsilane as a slightly yellowish oil which was further used without an additional purification.

$^1$H NMR (CDCl$_3$): δ 7.38 (s, 1H), 7.08 (s, 2H), 6.98 (s, 1H), 6.43 (s, 1H), 3.53 (s, 1H), 3.25 (s, 3H), 2.37 (s, 6H), 2.19 (s, 3H), 1.43 (s, 9H), 0.43 (s, 3H), 0.17 (s, 3H). $^{13}C\{^1H\}$ NMR (CDCl$_3$): δ 155.78, 145.88, 143.73, 137.98, 137.56, 137.49, 136.74, 128.32, 127.86, 127.55, 126.64, 120.86, 60.46, 49.99, 35.15, 31.16, 21.41, 17.55, 1.11, −0.58.

$^n$BuLi in hexanes (2.43 M, 25.2 ml, 61.24 mmol) was added in one portion to a solution of 16.83 g (61.33 mmol) of 4-(3,5-dimethylphenyl)-6-methyl-1,2,3,5-tetrahydro-s-indacene in a mixture of 300 ml of ether and 40 ml of THF, cooled to −50° C. This mixture was stirred overnight at room temperature, then the resulting reddish solution was cooled to −50° C., and 300 mg of CuCN was added. The obtained mixture was stirred for 0.5 h at −25° C., then a solution of [2-methyl-4-(3,5-dimethylphenyl)-5-methoxy-6-tert-butyl-1H-inden-1-yl]chlorodimethylsilane (prepared above, ca. 61.24 mmol) in 150 ml of ether was added in one portion. This mixture was stirred overnight at room temperature, then filtered through a pad of silica gel 60 (40-63 μm), which was additionally washed with 2×50 ml of dichloromethane. The combined filtrate was evaporated under reduced pressure, and the residue was dried in vacuum at elevated temperature. This procedure gave 39.22 g (98%) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (a ca. 3:2 mixture of stereoisomers) as a reddish glass.

$^1$H NMR (CDCl$_3$): δ 7.48 and 7.33 (2s, sum 1H), 7.26-7.18 (m, 1H), 7.16-7.07 (m, 2H), 7.04-6.95 (m, 4H), 6.51 and 6.45 (2s, sum 2H), 3.69 and 3.65 (2s, sum 2H), 3.28 and 3.26 (2s, sum 3H), 3.01-2.74 (m, 4H), 2.38 ad 2.37 (2s, sum 12H), 2.20 and 2.15 (2s, sum 6H), 2.09-1.97 (m, 2H), 1.43 and 1.42 (2s, sum 9H), −0.17, −0.18, −0.19 and −0.24 (4s, sum 6H). $^{13}C\{^1H\}$ NMR (CDCl$_3$): δ 155.29, 147.45, 147.39, 145.99, 145.75, 143.93, 143.90, 143.72, 143.69, 142.06, 142.01, 140.08, 140.06, 139.46, 139.37, 139.26, 139.03, 139.00, 138.24, 137.50, 137.34, 137.07, 136.99, 130.39, 128.23, 128.14, 127.92, 127.50, 127.46, 127.26, 126.12, 126.05, 125.99, 125.94, 120.55, 120.51, 118.46, 118.27, 60.49, 47.33, 46.86, 46.76, 35.14, 33.33, 33.28, 32.18, 31.26, 31.21, 25.95, 25.91, 21.44, 17.96, 17.88, −5.27, −5.39, −5.50, −5.82.

Anti-dimethylsilanediyl[2-methyl-4-(3,5-dimeth-ylphenyl)-5-methoxy-6-tert-butyl-inden-1-yl][2-methyl-4-(3,5-di methyl phenyl)-1,5,6,7-tetrahydro-s-indacen-1-yl]hafnium dichloride

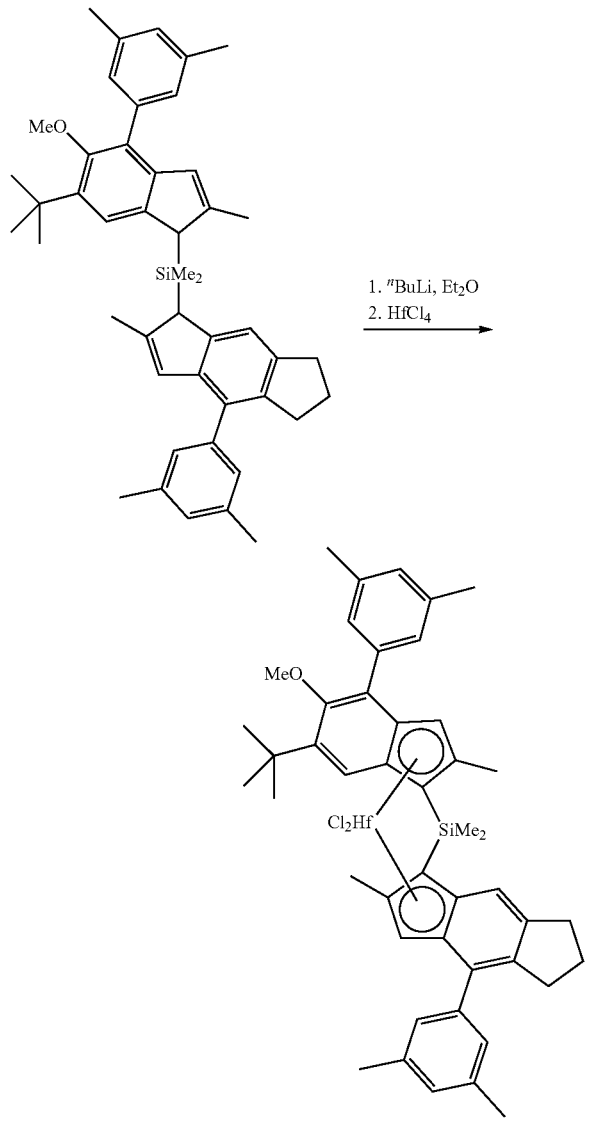

"BuLi in hexanes (2.43 M, 49.6 ml, 120.5 mmol) was added in one portion to a solution of 39.22 g (60.25 mmol) of [2-methyl-4-(3,5-dimethylphenyl)-5-methoxy-6-tert-butyl-1H-inden-1-yl][2-methyl-4-(3,5-dimethylphenyl)-1,5,6,7-tetrahydro-s-indacen-1-yl]dimethylsilane (prepared above) in 400 ml of ether, cooled to −50° C. This mixture was stirred overnight at room temperature. The resulting red solution was then cooled to −78° C., and 19.3 g (60.26 mmol) of HfCl$_4$ was added. The reaction mixture was stirred for 24 h at room temperature to give an orange suspension. The precipitate was filtered off (G4), then washed with 30 ml of cold ether. On the evidence of NMR spectroscopy, this precipitate was pure syn-hafnocene dichloride (with LiCl), while the filtrate included a ca. 4/1 mixture of anti- and syn-hafnocene dichlorides (in favor to anti-) contaminated with some other impurities. The precipitate was dissolved in 150 ml of hot toluene, and the formed suspension was filtered to remove LiCl through glass frit (G4). The filtrate was evaporated to ca. 45 ml. Orange sold material precipitated overnight at room temperature was filtered off (G3) and then dried in vacuum. This procedure gave 8.1 g (15%) of pure syn-complex. The mother liquor was evaporated almost to dryness, and the residue was triturated with 20 ml of n-hexane to give 2.6 g (4.8%) of syn-hafnocene dichloride as an orange powder. The ether mother liquor was evaporated to ca. 60 ml, the precipitated yellow powder was filtered off (G4), washed with 20 ml of cold (0° C.) ether, and then dried under vacuum. This procedure gave 10.2 g (19%) of pure anti-hafnocene dichloride. Thus, the total yield of anti- and syn-hafnocene dichlorides isolated in this synthesis was 20.9 g (39%).

Anti-dimethylsilanediyl[2-methyl-4-(3,5-dimeth-ylphenyl)-5-methoxy-6-tert-butyl-inden-1-yl][2-methyl-4-(3,5-dimethylphenyl)-1,5,6,7-tetrahydro-s-indacen-1-yl]hafnium dichloride Anal. calc. for $C_{46}H_{52}Cl_2OSiHf$: C, 61.50; H, 5.83. Found: C, 61.38; H, 6.15.
$^1H$ NMR (CDCl$_3$): δ 7.51 (s, 1H), 7.43 (s, 1H), 7.34-7.02 (br.m, 4H), 6.94 (s, 2H), 6.61 (s, 1H), 6.46 (s, 1H), 3.42 (s, 3H), 3.11-2.79 (m, 4H), 2.33 (s, 6H), 2.32 (s, 6H), 2.27 (s, 6H), 2.07-1.92 (m, 2H), 1.38 (s, 9H), 1.27 (s, 3H), 1.26 (s, 3H). $^{13}C\{^1H\}$ NMR (CDCl$_3$): δ 159.55, 144.17, 143.58, 142.84, 138.38, 137.82, 137.57, 136.94, 133.09, 132.67, 132.40, 132.11, 131.23, 128.84, 128.76, 127.40, 126.88, 126.53, 124.97, 121.28, 120.84, 119.76, 119.71, 117.90, 82.92, 82.40, 62.62, 35.68, 33.11, 32.07, 30.43, 26.56, 21.46, 21.38, 18.26, 18.12, 2.63, 2.53.

Syn-dimethylsilanediyl[2-methyl-4-(3,5-dimeth-ylphenyl)-5-methoxy-6-tert-butyl-inden-1-yl][2-methyl-4-(3,5-dimethylphenyl)-1,5,6,7-tetrahydro-s-indacen-1-yl]hafnium dichloride Anal. calc, for $C_{46}H_{52}Cl_2OSiHf$: C, 61.50; H, 5.83. Found: C, 61.59; H, 6.06.
$^1H$ NMR (CDCl$_3$): δ 7.53 (s, 1H), 7.41 (s, 1H), 7.29-7.06 (m, 4H), 6.94 (s, 2H), 6.50 (s, 1H), 6.35 (s, 1H), 3.26 (s, 3H), 2.95-2.77 (m, 4H), 2.49 (s, 3H), 2.46 (s, 3H), 2.33 (2s, sum 12H), 1.99-1.86 (m, 1H), 1.86-1.73 (m, 1H), 1.40 (s, 3H), 1.37 (s, 9H), 1.18 (s, 3H). $^{13}C\{^1H\}$ NMR (CDCl$_3$): δ 158.61, 143.03, 142.46, 142.16, 138.42, 137.73, 137.52, 136.98, 135.33, 134.60, 133.69, 132.53, 131.19, 128.79, 128.71, 127.34, 126.85, 126.00, 125.76, 121.95, 121.45, 119.12, 118.91, 118.55, 84.66, 84.26, 62.31, 35.48, 33.25, 31.94, 30.40, 26.60, 21.44, 18.44, 18.31, 2.93, 2.61

Summary of Metallocene Examples Used in the Examples

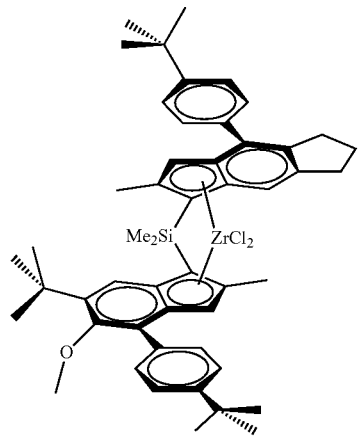

MC-CE1 rac-anti-
dimethylsilanediyl[2-
methyl-4-(4′-tert-
butylphenyl)-1,5,6,7-
tetrahydro-s-indacen-1-
yl][2-methyl-4-(4′-tert-
butylphenyl)-5-methoxy-
6-tert-butylinden-1-
yl]zirconium dichloride

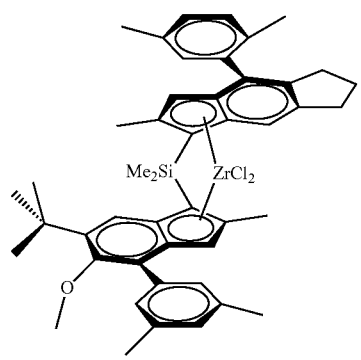

MC-CE2 rac-anti-dimethylsilanediyl
[2-methyl-4-(3′,5′-dimethylphenyl)-1,5,6,7-
tetrahydro-s-indacen-1-yl][2-
methyl-4-(3′,5′-
dimethylphenyl)-5-methoxy-
6-tert-butylinden-1-yl]
zirconium dichloride

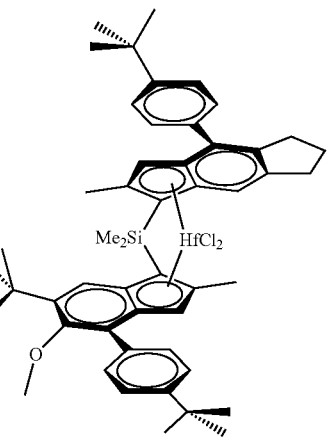

MC-IE1 rac-anti-
dimethylsilanediyl[2-
methyl-4-(4′-tert-
butylphenyl)-1,5,6,7-
tetrahydro-s-indacen-1-
yl][2-methyl-4-(4′-tert-
butylphenyl)-5-methoxy-
6-tert-butylinden-1-
yl]hafnium dichloride

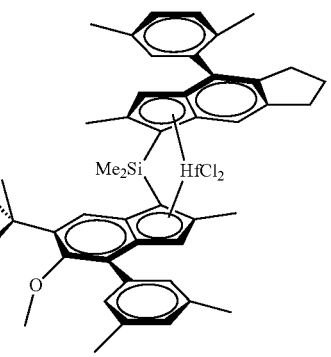

MC-IE2 rac-anti-
dimethylsilanediyl[2-
methyl-4-(3′,5′-dimethyl
phenyl)-1,5,6,7-tetrahydro-s-
indacen-1-yl][2-methyl-4-
(3′,5′-dimethylphenyl)-5-
methoxy-6-tert-butylinden-
1-yl]hafnium dichloride Catalyst Preparation Examples
Materials Inventive metallocenes MC-IE1 and MC-IE2; and comparative metallocenes MC-CE1 and MC-CE2 as described above were used in preparing catalysts.

MAO was used as a 30 wt-% solution in toluene. Trityl tetrakis(pentafluorophenyl)borate (Boulder Chemicals) was used as purchased. As surfactants were used perfluoroalkylethyl acrylate esters (CAS number 65605-70-1) purchased from the Cytonix corporation, dried over activated molecular sieves (2 times) and degassed by argon bubbling prior to use (S1) or 1H,1H-Perfluoro(2-methyl-3-oxahexan-1-ol) (CAS 26537-88-2) purchased from Unimatec, dried over activated molecular sieves (2 times) and degassed by argon bubbling prior to use (S2). Hexadecafluoro-1,3-dimethylyclohexane (PFC) (CAS number 335-27-3) was obtained from commercial sources and dried over activated molecular sieves (2 times) and degassed by argon bubbling prior to use. Propylene is provided by Borealis and adequately purified before use. Triethylaluminum was purchased from Crompton and used in pure form. Hydrogen is provided by AGA and purified before use.

All the chemicals and chemical reactions were handled under an inert gas atmosphere using Schlenk and glovebox techniques, with oven-dried glassware, syringes, needles or cannulas.

Catalyst Example CE1 (Comparative)

Inside the glovebox, 85.9 mg of dry and degassed surfactant S2 was mixed with 2 mL of MAO in a septum bottle and left to react overnight. The following day, 43.9 mg MC-CE1 (0,076 mmol, 1 equivalent) was dissolved with 4 mL of the MAO solution in another septum bottle and left to stir inside the glovebox.

After 60 minutes, 4 mL of the MAO-metallocene solution and 1 mL of the surfactant solution were successively added into a 50 mL emulsification glass reactor containing 40 mL of PFC at −10° C. and equipped with an overhead stirrer (stirring speed=600 rpm). Total amount of MAO is 5 mL (450 equivalents). A red emulsion formed immediately and stirred during 15 minutes at 0° C./600 rpm. Then the emulsion was transferred via a 2/4 teflon tube to 100 mL of hot PFC at 90° C., and stirred at 600 rpm until the transfer is completed, then the speed was reduced to 300 rpm. After 15 minutes stirring, the oil bath was removed and the stirrer turned off. The catalyst was left to settle up on top of the PFC and after 45 minutes the solvent was siphoned off. The remaining red catalyst was dried during 2 hours at 50° C. over an argon flow. 0.62 g of a red free flowing powder was obtained.

Catalyst Example CE2 (Comparative)

Inside the glovebox, surfactant S2 solution (28.8 mg of dry and degassed S2 dilute in 0.2 mL toluene) was added dropwise to 5 mL of 30 wt.-% Chemtura MAO. The solutions were left under stirring for 10 minutes. Then, 98.7 mg of metallocene MC-CE1 was added to MAO/surfactant. After 60 minutes stirring, 104.9 mg of trityl tetrakis(pentafluorophenyl) borate was added.

After 60 minutes stirring, the surfactant-MAO-metallocene-borate solution were added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.90 g of a red free flowing powder was obtained.

Catalyst Example CE3 (Comparative, No B-Cocatalyst)

Inside the glovebox, surfactant S2 solution (28.8 mg of dry and degassed S2 dilute in 0.2 mL toluene) was added dropwise to 5 mL of 30 wt.-% Chemtura MAO. The solutions were left under stirring for 10 minutes. Then, 48.3 mg of metallocene MC-IE1 was added to MAO/surfactant.

After 60 minutes stirring, the surfactant-MAO-metallocene solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.80 g of a yellow free flowing powder was obtained.

Catalyst Example IE1 (Inventive)

Inside the glovebox, surfactant S2 solution (28.8 mg of dry and degassed S2 dilute in 0.2 mL toluene) was added dropwise to 5 mL of 30 wt.-% Chemtura MAO. The solutions were left under stirring for 10 minutes. Then, 108.7 mg of metallocene MC-IE1 was added to MAO/surfactant. After 60 minutes, 106.0 mg of trityl tetrakis(pentafluorophenyl) borate was added. The mixture was left to react at room temperature inside the glovebox for 60 min.

Then, the surfactant-MAO-metallocene-borate solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.75 g of a yellow free flowing powder was obtained.

Catalyst Example CE4 (Comparative)

Inside the glovebox, 86.8 mg of dry and degassed S2 were mixed with 2 mL of 30 wt.-% Chemtura MAO in a septum bottle and left to react overnight. The following day, 41.1 mg of Metalloene MC-CE2 (0,051 mmol, 1 equivalent) were dissolved with 4 mL of the 30 wt.-% Chemtura MAO solution in another septum bottle and left to stir inside the glovebox.

After 60 minutes, 1 mL of the surfactant solution and the 4 mL of the MAO-metallocene solution were successively added into a 50 mL emulsification glass reactor containing 40 mL of PFC at −10° C. and equipped with an overhead stirrer (stirring speed=600 rpm). Total amount of MAO is 5 mL (300 equivalents). A red emulsion formed immediately and stirred during 15 minutes at −10° C./600 rpm. Then the emulsion was transferred via a 2/4 teflon tube to 100 mL of hot PFC at 90° C., and stirred at 600 rpm until the transfer is completed, and then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.54 g of a red free flowing powder was obtained.

Catalyst Example CE5 (Comparative)

Inside the glovebox, surfactant S2 solution (28.8 mg of dry and degassed S2 dilute in 0.2 mL toluene) was added dropwise to 5 mL of 30 wt.-% Chemtura MAO. The solutions were left under stirring for 10 minutes. Then, 92.3 mg of metallocene MC-CE2 was added to MAO/surfactant. After 60 minutes stirring, 106 mg of trityl tetrakis(pentafluorophenyl)borate was added.

After 60 minutes stirring, the surfactant-MAO-metallocene-borate solution were added into a 50 mL emulsification glass reactor containing 40 mL of PFC at −10° C. and equipped with an overhead stirrer (stirring speed=600 rpm). A red emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.6 g of a red free flowing powder was obtained.

Catalyst Example IE2 (Inventive)

Inside the glovebox, surfactant S2 solution (28.8 mg of dry and degassed S2 dilute in 0.2 mL toluene) was added dropwise to 5 mL of 30 wt.-% Chemtura MAO. The solutions were left under stirring for 10 minutes. Then, 102.23 mg of metallocene MC-IE2 was added to MAO/surfactant. After 60 minutes, 104.9 mg of trityl tetrakis(pentafluorophenyl)borate was added. The mixture was left to react at room temperature inside the glovebox for 60 min.

Then, the surfactant-MAO-metallocene-borate solution were added into a 50 mL emulsification glass reactor containing 40 mL of PFC at −10° C. and equipped with an overhead stirrer (stirring speed=600 rpm). A yellow emulsion formed immediately and stirred during 15 minutes at −10° C./600 rpm. Then the emulsion was transferred via a 2/4 Teflon tube to 100 mL of hot PFC at 90° C. and stirred at 600 rpm until the transfer is completed. Then the speed was reduced to 300 rpm. After 15 minutes stirring, the oil bath was removed and the stirrer turned off. The catalyst was left to settle up on top of the PFC and after 35 minutes the solvent was siphoned off. The remaining catalyst was dried during 2 hours at 50° C. over an argon flow. 0.67 g of a yellow free flowing powder was obtained.

Catalyst results are disclosed in Table 1

TABLE 1

| Catalyst | MC | ICP Al (wt.-%) | ICP Hf (wt.-%) | ICP Zr (wt.-%) | Al/M* (mol/mol) |
|---|---|---|---|---|---|
| Cat-CE1 | MC-CE1 | 37.0 | | 0.26 | 481 |
| Cat-CE2 | MC-CE1 | 30.2 | | 0.55 | 185 |
| Cat-CE3 | MC-IE1 | 30.6 | 0.53 | | 382 |
| Cat-IE1 | MC-IE1 | 29.4 | 1.07 | | 182 |
| Cat-CE4 | MC-CE2 | 37.0 | | 0.26 | 486 |
| Cat-CE5 | MC-CE2 | 31.9 | | 0.56 | 192 |
| Cat-IE2 | MC-IE2 | 31.4 | 1.19 | | 174 |

*M is Zr or Hf

Off-Line Pre-Polymerisation of Catalysts of Examples CE4, CE5 and IE2

The catalysts of examples CE4, CE5 and IE2 were pre-polymerised according to the following procedure: Off-line pre-polymerisation experiment was done in a 125 mL pressure reactor equipped with gas-feeding lines and an overhead stirrer. Dry and degassed perfluoro-1,3-dimethylcyclohexane (15 cm³) and the desired amount of the catalyst to be pre-polymerised were loaded into the reactor inside a glove box and the reactor was sealed. The reactor was then taken out from the glove box and placed inside a water cooled bath kept at 25° C. The overhead stirrer and the feeding lines were connected and stirring speed set to 450 rpm. The experiment was started by opening the propylene feed into the reactor. The total pressure in the reactor was raised to about 5 barg and held constant by propylene feed via mass flow controller until the target degree of polymerisation was reached. The reaction was stopped by flashing the volatile components. Inside glove box, the reactor was opened and the content poured into a glass vessel. The perfluoro-1,3-dimethylcyclohexane was evaporated until a constant weight was obtained to yield the off-line pre-polymerised catalyst.

The off-line pre-polymerised catalysts are marked as pCE4, pCE5 and pIE2 and pre-polymerisation degrees (DP) thereof are disclosed in Table 2.

The pre-polymerisation degree (DP) is defined as weight of polymer matrix/weight of solid catalyst before the off-line pre-polymerisation step.

The composition of the catalysts (before off-line pre-polymerisation) can determined by ICP. The metallocene (MC) content of the off-line pre-polymerised catalysts can be calculated from the ICP data as follows:

$$\frac{Al}{Zr}(mol/mol) = \frac{Al(wt\ \%,\ ICP)/26{,}98}{Zr(wt\ \%,\ ICP)/91{,}22} \quad \text{Equation 1}$$

$$Zr(mol\ \%) = \frac{100}{\frac{Al}{Zr}(mol/mol) + 1} \quad \text{Equation 2}$$

$$MC(\text{wt }\%, \text{before off-line prepol cat}) = \quad \text{Equation 3}$$

$$\frac{100 \times (Zr,\ mol\ \% \times MwMC)}{Zr,\ mol\ \% \times MwMC + (100 - Zr,\ mol\ \%) \times MwMAO}$$

$$MC(\text{wt }\%, \text{off-line prepolym cat}) = \quad \text{Equation 4}$$

$$\frac{MC(\text{wt }\%, \text{before off-line prepol cat})}{DP + 1}$$

TABLE 2

| Off-line prepolymerised catalyst | pCE4 | pCE5 | pIE2 |
|---|---|---|---|
| Pre-polymerisation degree, g/g | 3.15 | 5.47 | 3.62 |
| Metallocene content, wt % in off-line prepolymerised catalyst | 0.68 | 1.05 | 1.76 |

Polymerisation Examples

Homopolymerisation of Propylene

The polymerisations were performed in a 5 L reactor. 200 μl of triethylaluminum (TEA) was fed as a scavenger in 5 mL of dry and degassed pentane. The desired amount of hydrogen was then loaded (1 mmol) and 1100 g of liquid propylene was fed into the reactor. The temperature was set to 20° C. The desired amount of catalyst in 5 mL of PFC is flushed into the reactor with a nitrogen overpressure. After 5 minutes prepolymerisation, the temperature is raised to 70° C. over a period of 15 minutes. The polymerisation is stopped after 60 minutes by venting the reactor and flushing with nitrogen before the polymer is collected.

The catalyst activities were calculated on the basis of the 60 minute (homopolymerisation of propylene) period according to the following formula:

Catalyst Activity (kg–$PP$/g–$Cat$/h) =

$$\frac{\text{amount of polymer produced (kg)}}{\text{catalyst loading (g)} \times \text{polymerisation time (h)}}$$

Polymerisation results are disclosed in table 3. Polymerisation examples are marked as P-CEn/P-IEn.

TABLE 3

Homopolymerisation results and polymer analysis

| Homo-polymerisation Example | Catalyst | Catalyst (mg) | Polymer (g) | Activity (kg-PP/g-cat/h) | MFR$_{21}$ (g/10 min) | $T_m$ (° C.) | $T_c$ (° C.) |
|---|---|---|---|---|---|---|---|
| P-CE1 | Cat-CE1 | 11.1 | 144.4 | 13.0 | 3.61 | 152.1 | 108.0 |
| P-CE2 | Cat-CE2 | 5.9 | 179.9 | 30.5 | 5.5 | 155.1 | 109.8 |
| P-CE3 | Cat-CE3 | 26.3 | 87.7 | 3.3 | 0.55 | 155.4 | 109.2 |
| P-IE1 | Cat-IE1 | 8.7 | 307.4 | 35.3 | 2.26 | 158.8 | 112.1 |
| P-CE4 | Cat-CE4 | 10.9 | 136.9 | 12.6 | 2.06 | 150.1 | 108.3 |
| P-CE5 | Cat-CE5 | 5.8 | 98.3 | 16.9 | 5.99 | 156.3 | 112.1 |
| P-IE2 | Cat-IE2 | 10.9 | 236.6 | 21.7 | 0.703 | 160.3 | 112.1 |

As can be seen from the homopolymerisation results the inventive catalysts have clearly higher Tm compared to the comparative examples with similar ligand structure of the metallocene complex, but with Zr as the metal; or with Hf, but not using boron cocatalyst. Further, activity is on a higher level in inventive examples.

Copolymerisation of Propylene with Ethylene

Step 1: Prepolymerisation and Bulk Homopolymerisation

A 21.2 L stainless-steel reactor containing 0.4 barg propylene was filled with 3950 g propylene. Triethylaluminum was injected into the reactor by additional 240 g propylene. The solution was stirred at 20° C. and 250 rpm for at least 20 min. The catalyst was injected as described in the following: The desired amount of solid, off-line prepolymerised catalyst was loaded into a 5 ml stainless steel vial inside a glovebox and a second 5 ml vial containing 4 ml n-heptane pressurized with 10 bars of nitrogen was added on top of the first vial. This catalyst feeder system was mounted on a port on top of the autoclave. In experiments P-pCE5 and P-pIE2-2, immediately afterwards 2 NL of H2 was dosed via mass flow controller in one minute. The valve between the two vials was opened and the solid catalyst was contacted with heptane under nitrogen pressure for 2 s, then flushed into the reactor with 240 g propylene. The prepolymerisation was run for 10 min. At the end of the prepolymerisation step the temperature was raised to 80° C. When the internal reactor temperature has reached 71° C. 1.5 NL (procedures 1 and 2) or 2.0 NL of H2 (procedure 3) was added via mass flow controller in three minutes. The reactor temperature was held constant at 80° C. throughout the polymerisation. The polymerisation time was measured starting when the internal reactor temperature reached 2° C. below the set polymerisation temperature.

Step 2: Gas Phase Homopolymerisation

After the bulk step was completed, the stirrer speed was reduced to 50 rpm and the pressure was reduced to 23 bar-g by venting the monomer. Afterwards the stirrer speed was set to 180 rpm, the reactor temperature to 80° C. and the pressure to 24 bar-g. 2.0 NL of hydrogen was added via flow controller in 4 minutes. During the gas phase homopolymerisation, both pressure and temperature have been held constant via mass flow controller (feeding propylene) and thermostat for 40 minutes.

Step 3: Gas Phase Ethylene-Propylene Copolymerisation

After the gas phase homopolymerisation step (Step 2) was completed, the stirrer speed was reduced to 50 rpm and the pressure was reduced down to 0.3 bar-g by venting the monomers. Then triethylaluminum (0.80 ml of a 0.62 mol/l solution in heptane) was injected into the reactor by additional 250 g propylene through a steel vial, except in experiment P-pIE2-2 in which no TEA was added in this step. The pressure was then again reduced down to 0.3 bar-g by venting the monomers. The stirrer speed was set to 180 rpm and the reactor temperature was set to 70° C. (85° C. in experiment P-pIE2-2). Then the reactor pressure was increased to 20 bar-g by feeding a C3/C2 gas mixture (C2/C3=0.56 wt/wt). The temperature was held constant by thermostat and the pressure was held constant by feeding via mass flow controller a C3/C2 gas mixture of composition corresponding to the target polymer composition, until the set time for this step had expired.

Then the reactor was cooled down to about 30° C. and the volatile components vented out. After purging the reactor 3 times with N2 and one vacuum/N2 cycle, the product was taken out and dried overnight in a fume hood. 100 g of the polymer is additivated with 0.5 wt % Irganox B225 (solution in acetone) and dried overnight in a hood followed by one hour in a vacuum drying oven at 60° C.

The copolymerisation conditions are shown in Table 4 and copolymerisation results in Table 5.

TABLE 4

Copolymerisation conditions

| Copolymerisation example | Catalyst | Catalyst amount* mg | bulk T ° C. | bulk H2 NL | bulk Time min | GP1 P barg | GP1 T ° C. | GP1 Time Min | GP1 H2 NL | GP2 P barg | GP2 T ° C. | GP2 Time min |
|---|---|---|---|---|---|---|---|---|---|---|---|---|
| P-pCE4 | pCE4 | 162 | 80 | 2.0 | 40 | 24 | 80 | 40 | 2.0 | 20 | 70 | 90 |
| P-pCE5 | pCE5 | 87 | 80 | 1.5 | 40 | 24 | 80 | 40 | 2.0 | 20 | 70 | 120 |
| P-pIE2-1 | pIE2 | 82 | 80 | 2.0 | 40 | 24 | 80 | 40 | 2.0 | 20 | 70 | 120 |
| P-pIE2-2 | pIE2 | 143 | 80 | 2.0 | 40 | 24 | 80 | 40 | 2.0 | 20 | 85 | 120 |

*Amount of Off-line prepolymerised catalyst

TABLE 5

Copolymerisation results

| | P-pCE4 | P-pCE5 | P-pIE2-1 | P-pIE2-2 |
|---|---|---|---|---|
| $iV_{whole}$/dL/g | 1.9 | 2.6 | 2.5 | 2.6 |
| $iV_{Matrix}$/dL/g | 1.8 | 2.7 | 2.3 | 2.6 |
| $T_m$ matrix/° C. | 149 | 156 | 157 | 158 |
| Overall productivity/ kg/$g_{cat}$* | 22 | 129 | 32 | 75 |
| Overall productivity/ kg/$g_{metallocene}$ | 790 | 1980 | 390 | 920 |
| GP2 EPR activity/ kg/$g_{cat}$* | 4 | 10.1 | 6.4 | 4.0 |
| Soluble fraction$_{(Crystex)}$/wt % | 29 | 15 | 14 | 7 |
| C2(XS)$_{Crystex}$/wt % | 20.3 | 20.8 | 17.8 | 17.2 |
| $iV_{EPR}$/dL/g | 2.29 | 1.94 | 3.12 | 2.21 |

*catalyst amount before the off-line prepolymerisation

Table 5 shows that the catalyst pIE2 produces heterophasic copolymers with higher $T_m$ and having the rubber phase with a higher molecular weight (indicated by $iV_{EPR}$/dL/g) compared to the Zr analogues. In addition, high iV(EPR) can be obtained also at a polymerisation temperature as high as 85° C.

The materials from P-pIE2-1 and P-pCE5 were compounded with 1500 ppm of B225 and 500 ppm of calcium stearate on TSE 16 respectively, with melt temperature of 210° C. and throughput of 2 kg/h. The products after compounding were named as IE1-prod (for P-pIE2-1 base) and CE2-prod (for P-pCE5 base). The properties are listed in Table 6.

As can be seen, IE1 gives higher flexural modulus and impact strength at 0 and −20° C.

TABLE 6

Stiffness/impact balance of IE-prod and CE-prod.

| | | IE1-prod | CE2-prod |
|---|---|---|---|
| Flexural modulus | MPa | 1109 | 1002 |
| NIS/0° C. | kj/m2 | 4.97 | 4.14 |
| NIS/−20° C. | kj/m2 | 2.11 | 1.35 |
| Tg1 | ° C. | −36.3 | −39.7 |
| Tg2 | ° C. | 1.4 | 0.6 |
| G' | MPa | 615 | 572 |

The invention claimed is:

1. A process for the preparation of a propylene polymer, the process comprising:
   polymerizing propylene optionally with ethylene and/or a C4-10 alpha olefin in the presence of a catalyst;
   wherein the catalyst comprises:
   (i) a complex;
   (ii) a cocatalyst of an aluminum compound; and
   (iii) a cocatalyst of a boron compound;
   wherein the complex is of formula (I):

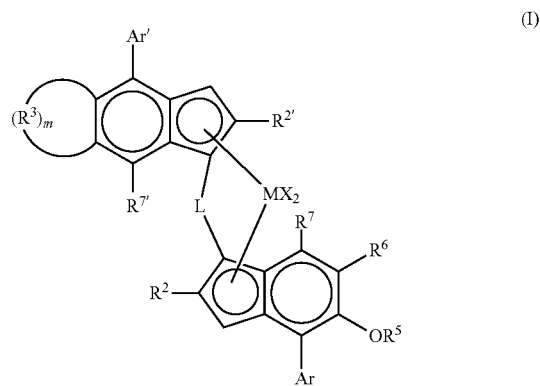

wherein:
M is Hf
each X is a sigma ligand;
L is an alkylene group or a bridge of formula -(ER$^8$$_2$)$_y$—;
   y is 1 or 2;
   E is C or Si; and
   each R$^8$ is independently a C$_1$-C$_{20}$-hydrocarbyl, tri(C$_1$-C$_{20}$-alkyl)silyl, C$_6$-C$_{20}$-aryl, C$_7$-C$_{20}$-arylalkyl, or C$_7$-C$_{20}$-alkylaryl;
Ar and Ar' are each independently an aryl or heteroaryl group optionally substituted by 1 to 3 R$^1$ or R$^{1'}$ groups respectively;
R$^1$ and R$^{1'}$ are each independently a linear or branched C$_1$-C$_6$-alkyl group, C$_{7-20}$ arylalkyl group, C$_{7-20}$ alkylaryl group, or C$_{6-20}$ aryl group,
   with the proviso that when there are four or more R$^1$ and R$^{1'}$ groups present in total, then one or more of R$^1$ and/or R$^{1'}$ is other than tert butyl;
R$^2$ and R$^{2'}$ are each independently a CH$_2$—R$^9$ group, with R$^9$ being H, linear or branched C$_{1-6}$-alkyl group, C$_{3-8}$ cycloalkyl group, or C$_{6-10}$ aryl group;
each R$^3$ is a —CH$_2$—, —CHRx-, or C(Rx)$_2$- group wherein Rx is C1-4 alkyl;
m is 2-6;
R$^5$ is a linear or branched C$_1$-C$_6$-alkyl group, C$_{7-20}$ arylalkyl, C$_{7-20}$ alkylaryl group, or C$_6$-C$_{20}$-aryl group;
R$^6$ is a C(R$^{10}$)$_3$ group, with R$^{10}$ being a linear or branched C$_1$-C$_6$ alkyl group; and
R$^7$ and R$^{7'}$ are each independently H or a linear or branched C$_1$-C$_6$-alkyl group.

2. The process of claim 1, wherein the complex is of formula (Ia):

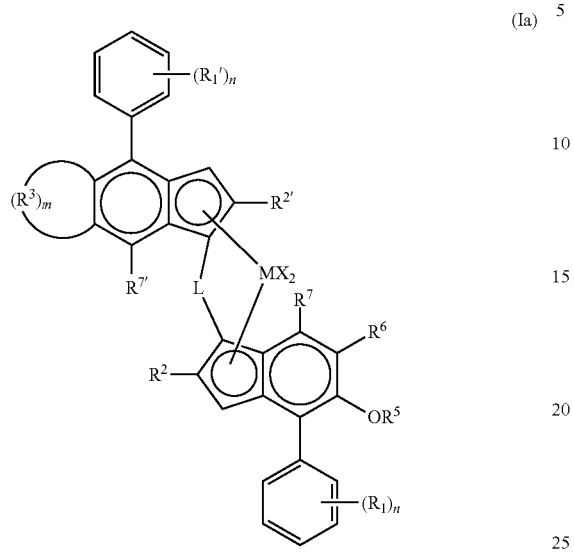

(Ia)

wherein:

M is Hf;

each X is a sigma ligand;

L is an alkylene group or a bridge of formula $-(ER^8{}_2)_y-$;

y is 1 or 2;

E is C or Si; and each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl, or $C_7$-$C_{20}$-alkylaryl;

each n is independently 0, 1, 2 or 3;

$R^1$ and $R^{1'}$ are each independently a linear or branched $C_1$-$C_6$-alkyl group, $C_{7-20}$ arylalkyl group, $C_{7-20}$ alkylaryl group, or $C_{6-20}$ aryl group, with the proviso that when there are four or more $R^1$ and $R^{1'}$ groups present in total, then one or more of $R^1$ and/or $R^{1'}$ is other than tert butyl;

$R^2$ and $R^{2'}$ are each independently a $CH_2$—$R^9$ group, with $R^9$ being H, linear or branched $C_{1-6}$-alkyl group, $C_{3-8}$ cycloalkyl group, or $C_{6-10}$ aryl group;

each $R^3$ is a —$CH_2$—, —CHRx-, or C(Rx)$_2$- wherein Rx is $C_{1-4}$ alkyl;

m is 2-6;

$R^5$ is a linear or branched $C_1$-$C_6$-alkyl group, $C_{7-20}$ arylalkyl, $C_{7-20}$ alkylaryl group, or $C_6$-$C_{20}$-aryl group;

$R^6$ is a $C(R^{10})_3$ group, with $R^{10}$ being a linear or branched $C_1$-$C_6$ alkyl group; and $R^7$ and $R^{7'}$ are each independently H or a linear or branched $C_1$-$C_6$-alkyl group.

3. The process of claim 2, wherein L is of formula —$SiR^8{}_2$—, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl, or $C_7$-$C_{20}$-alkylaryl.

4. The process of claim 1, wherein the complex is of formula (Ib):

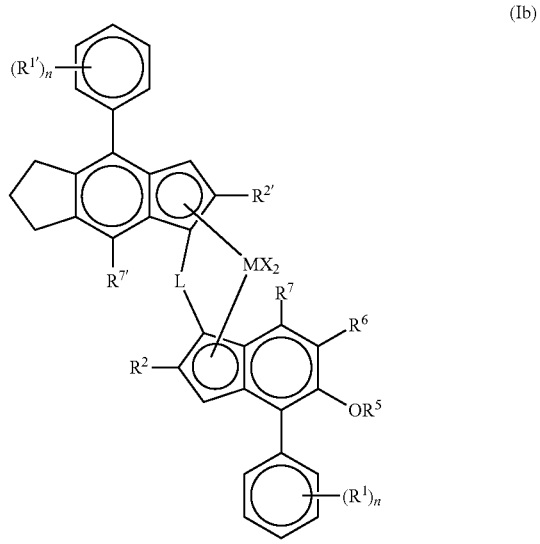

(Ib)

wherein

M is Hf;

each X is a sigma ligand;

L is an alkylene bridge or a bridge of the formula —$SiR^8{}_2$—, wherein each $R^8$ is independently a $C_1$-$C_{20}$-hydrocarbyl, tri($C_1$-$C_{20}$-alkyl)silyl, $C_6$-$C_{20}$-aryl, $C_7$-$C_{20}$-arylalkyl, or $C_7$-$C_{20}$-alkylaryl;

each n is independently 0, 1, 2 or 3;

$R^1$ and $R^{1'}$ are each independently a linear or branched $C_1$-$C_6$-alkyl group, $C_{7-20}$ arylalkyl, $C_{7-20}$ alkylaryl group, or $C_{6-20}$ aryl group, with the proviso that when there are four or more $R^1$ and $R^{1'}$ groups present in total, then one or more of $R^1$ and $R^{1'}$ is other than tert butyl;

$R^2$ and $R^{2'}$ are each independently a $CH_2$—$R^9$ group, with $R^9$ being H, linear or branched $C_{1-6}$-alkyl group, $C_{3-8}$ cycloalkyl group, or $C_{6-10}$ aryl group;

$R^5$ is a linear or branched $C_1$-$C_6$-alkyl group, $C_{7-20}$ arylalkyl, $C_{7-20}$ alkylaryl group, or $C_6$-$C_{20}$-aryl group;

$R^6$ is a $C(R^{10})_3$ group, with $R^{10}$ being a linear or branched $C_1$-$C_6$ alkyl group; and $R^7$ and $R^{7'}$ are each independently H or a linear or branched $C_1$-$C_6$-alkyl group.

5. The process of claim 4, wherein each n is 1 or 2.

6. The process of claim 1, wherein the complex is of formula (II):

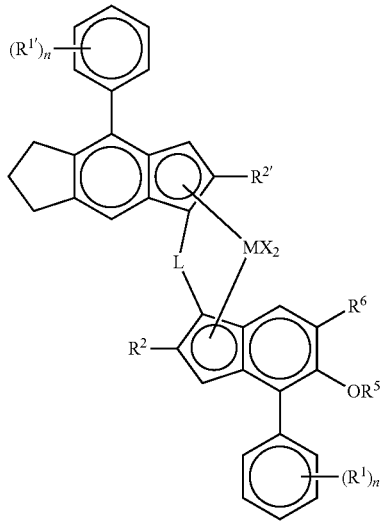

(II)

wherein

M is Hf;

X is a sigma ligand;

L is an alkylene bridge or a bridge of the formula wherein each $R^8$ is independently $C_1$-$C_6$-alkyl, $C_{3-8}$ cycloalkyl, or $C_6$-aryl group;

each n is independently 1 or 2;

$R^1$ and $R^{1'}$ are each independently a linear or branched $C_1$-$C_6$-alkyl group, with the proviso that when there are four $R^1$ and $R^{1'}$ groups present, then one or more of $R^1$ and/or $R^{1'}$ is not tert butyl;

$R^2$ and $R^{2'}$ are each independently a $CH_2$—$R^9$ group, with $R^9$ being H or linear or branched $C_{1-6}$-alkyl group;

$R^5$ is a linear or branched $C_1$-$C_6$-alkyl group; and $R^6$ is a $C(R^{10})_3$ group, with $R^{10}$ being a linear or branched $C_1$-$C_6$ alkyl group.

7. The process of claim 1, wherein the complex is of formula (III):

(III)

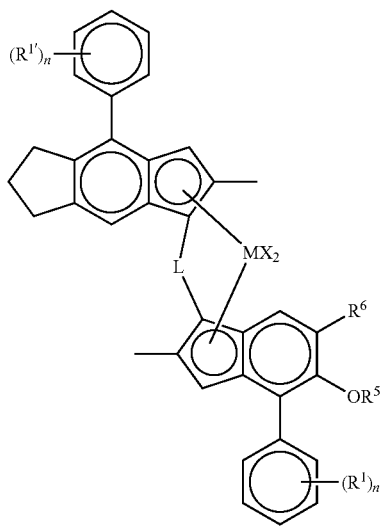

wherein

M is Hf;

each X is a sigma ligand;

L is —$SiR^8_2$—, wherein each $R^8$ is $C_{1-6}$ alkyl or $C_{3-8}$ cycloalkyl;

each n is independently 1 or 2;

$R^1$ and $R^{1'}$ are each independently a linear or branched $C_1$-$C_6$-alkyl group, with the proviso that when there are four $R^1$ and $R^{1'}$ groups present, then one or more of $R^1$ and/or $R^{1'}$ is not tert butyl;

$R^5$ is a linear or branched $C_1$-$C_6$-alkyl group; and $R^6$ is a $C(R^{10})_3$ group, with $R^{10}$ being a linear or branched $C_1$-$C_6$ alkyl group.

8. The process of claim 1, wherein the complex is of formula (IV):

(IV)

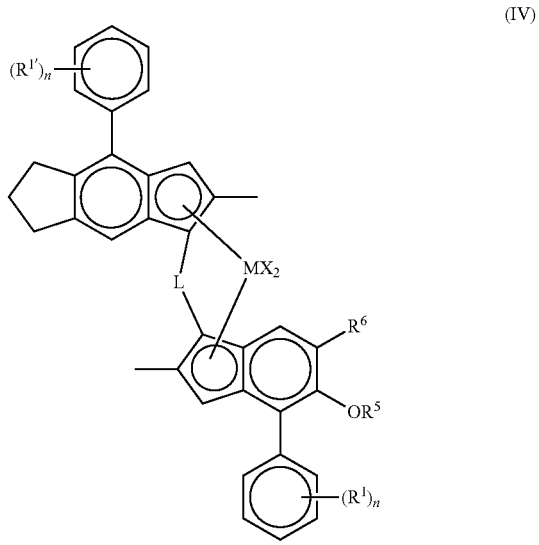

wherein

M is Hf;

each X is a hydrogen atom, a halogen atom, $C_{1-6}$ alkoxy group, $C_{1-6}$ alkyl, phenyl, or benzyl group;

L is —$SiR^8_2$—, wherein each $R^8$ is $C_{1-4}$ alkyl or $C_{5-6}$ cycloalkyl;

each n is independently 1 or 2;

$R^1$ and $R^{1'}$ are each independently a linear or branched $C_1$-$C_6$-alkyl group, with the proviso that when there are four $R^1$ and $R^{1'}$ groups present, then one or more of $R^1$ and/or $R^{1'}$ is not tert butyl;

$R^5$ is a linear or branched $C_1$-$C_6$-alkyl group; and $R^6$ is a $C(R^{10})_3$ group, with $R^{10}$ being a linear or branched $C_1$-$C_6$ alkyl group.

9. The process of claim 1, wherein the complex is of formula (V):

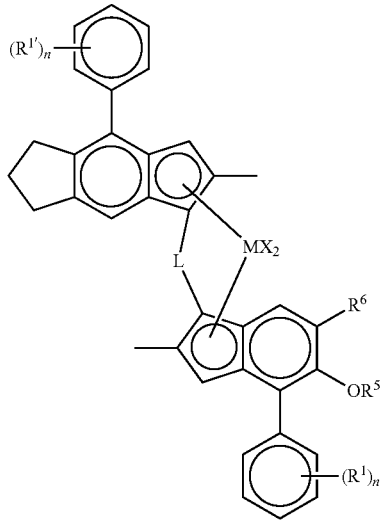

(V)

wherein

M is Hf;

X is a hydrogen atom, a halogen atom, $C_{1-6}$ alkoxy group, $C_{1-6}$ alkyl, phenyl, or benzyl group;

L is —$SiMe_2$;

each n is independently 1 or 2;

$R^1$ and $R^{1'}$ are each independently a linear or branched $C_1$-$C_6$-alkyl group, with the proviso that when there are four $R^1$ and $R^{1'}$ groups present, then one or more of $R^1$ and/or $R^{1'}$ is not tert butyl, $R^5$ is a linear or branched $C_1$-$C_4$-alkyl group; and $R^6$ is a $C(R^{10})_3$ group, with $R^{10}$ being a linear or branched $C_1$-$C_4$ alkyl group.

10. The process of claim 1, wherein the complex is of formula (VI):

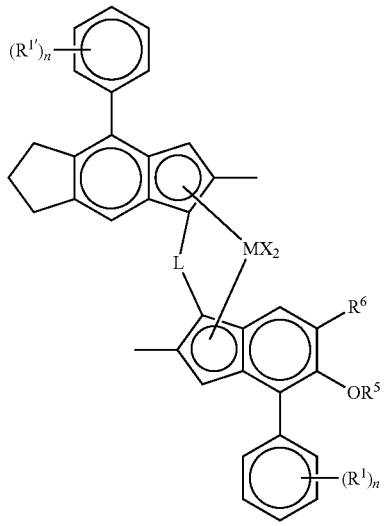

(VI)

wherein

M is Hf;

X is a hydrogen atom, a halogen atom, $C_{1-6}$ alkoxy group, $C_{1-6}$ alkyl, phenyl, or benzyl group;

L is —$SiMe_2$;

each n is independently 1 or 2;

$R^1$ and $R^{1'}$ are each independently a linear or branched $C_1$-$C_6$-alkyl group, with the proviso that when there are four $R^1$ and $R^{1'}$ groups present, then one or more of $R^1$ and/or $R^{1'}$ is not tert butyl;

$R^5$ is a linear $C_1$-$C_4$-alkyl group; and $R^6$ is tert butyl.

11. The process of claim 1, wherein the complex is of formula (VII):

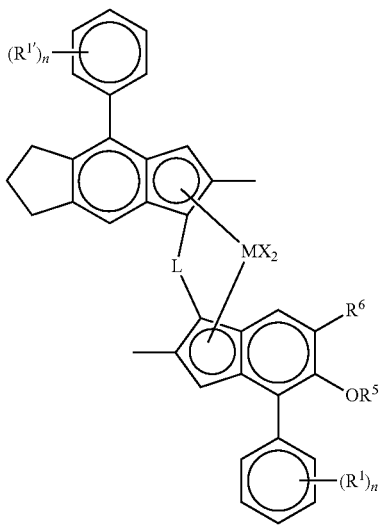

(VII)

wherein

M is Hf;

X is a hydrogen atom, a halogen atom, $C_{1-6}$ alkoxy group, $C_{1-6}$ alkyl, phenyl, or benzyl group;

L is —$SiMe_2$;

each n is independently 1 or 2;

$R^1$ and $R^{1'}$ are each independently a linear or branched $C_1$-$C_4$-alkyl group, with the proviso that when there are four $R^1$ and $R^{1'}$ groups present, then one or more of $R^1$ and/or $R^{1'}$ is not tert butyl;

$R^5$ is methyl; and $R^6$ is tert butyl.

12. The process of claim 1, wherein the complex is of formula (VIII):

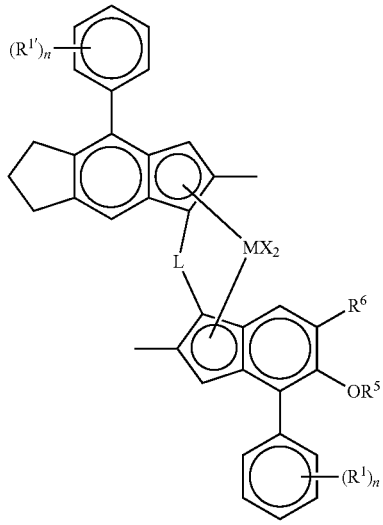

wherein
M is Hf;
X is Cl;
L is —SiMe$_2$;
each n is independently 1 or 2;
R$^1$ and R$^{1'}$ are each independently methyl or tert butyl, with the proviso that when there are four R$^1$ and R$^{1'}$ groups present, then one or more of R$^1$ and/or R$^{1'}$ is not tert butyl, R$^5$ is methyl; and
R$^6$ is tert butyl.

13. The process of claim 1, wherein at least one of the C(4) or C(4') phenyl rings is 3,5-dimethyl phenyl.

14. The process of claim 1, wherein at least one of the C(4) or C(4') phenyl rings is 4-(tert-butyl)-phenyl.

15. The process of claim 1, wherein R$^1$, R$^{1'}$, and each value of n are selected such that the C(4) or C(4') phenyl rings are 3,5-dimethyl phenyl, 3,5-ditertbutylphenyl, and/or 4-(tert-butyl)-phenyl.

16. The process of claim 1, wherein the catalyst is in solid form.

17. The process of claim 1, wherein the catalyst is supported on an external carrier or is in solid particulate form free from an external carrier.

18. A process for the manufacture of the catalyst of claim 1, said process comprising:
    contacting complex (i), cocatalyst (ii), and cocatalyst (iii) to provide a catalyst solution;
    forming a liquid/liquid emulsion system by dispersing the catalyst solution in a solvent in the form of dispersed droplets; and
    solidifying said dispersed droplets to form solid particles of said catalyst.

19. The process of claim 1, wherein the cocatalyst (ii) of an aluminum compound is an aluminoxane; wherein the cocatalyst (iii) of a boron compound is a borate; or a combination thereof.

20. The process of claim 1, wherein each X is independently a hydrogen atom, halogen atom, C$_{1-6}$ alkoxy group, C$_{1-6}$ alkyl, phenyl, or benzyl group.

* * * * *